United States Patent
Ganuza et al.

(10) Patent No.: US 12,492,391 B2
(45) Date of Patent: Dec. 9, 2025

(54) COGNATE FOLDASE CO-EXPRESSION

(71) Applicant: Novozymes A/S, Bagsvaerd (DK)

(72) Inventors: Ane Quesada Ganuza, Vitoria (ES); Michael Dolberg Rasmussen, Vallensbæk (DK); Allan Kent Nielsen, Copenhagen (DK)

(73) Assignee: Novozymes A/S, Bagsvaerd (DK)

( * ) Notice: Subject to any disclaimer, the term of this patent is extended or adjusted under 35 U.S.C. 154(b) by 658 days.

(21) Appl. No.: 17/426,048

(22) PCT Filed: Jan. 22, 2020

(86) PCT No.: PCT/EP2020/051505
§ 371 (c)(1),
(2) Date: Jul. 27, 2021

(87) PCT Pub. No.: WO2020/156903
PCT Pub. Date: Aug. 6, 2020

(65) Prior Publication Data
US 2022/0112478 A1 Apr. 14, 2022

(30) Foreign Application Priority Data

Jan. 30, 2019 (EP) .................... 19154510

(51) Int. Cl.
| C12N 9/90 | (2006.01) |
| C12N 9/26 | (2006.01) |
| C12N 9/42 | (2006.01) |
| C12N 15/75 | (2006.01) |

(52) U.S. Cl.
CPC ............. *C12N 9/90* (2013.01); *C12N 9/2414* (2013.01); *C12N 9/2434* (2013.01); *C12N 15/75* (2013.01); *C12Y 302/01001* (2013.01); *C12Y 302/01023* (2013.01); *C12Y 502/01008* (2013.01)

(58) Field of Classification Search
None
See application file for complete search history.

(56) References Cited

U.S. PATENT DOCUMENTS

| 2016/0115463 A1 | 4/2016 | Andersen |
| 2022/0112478 A1* | 4/2022 | Ganuza .................. C12P 21/02 |

FOREIGN PATENT DOCUMENTS

| CN | 101010424 A | 8/2007 |
| CN | 101541968 A | 9/2009 |
| CN | 101903519 A | 12/2010 |
| CN | 102533838 A | 7/2012 |
| CN | 105339499 A | 2/2016 |
| CN | 105755033 A | 7/2016 |
| CN | 108779154 A | 11/2018 |
| WO | 1994019471 A1 | 9/1994 |
| WO | 2005123914 A1 | 12/2005 |
| WO | 2008065200 A1 | 6/2008 |
| WO | 2009094084 A1 | 7/2009 |
| WO | 2014206829 A1 | 12/2014 |
| WO | 2017112733 A1 | 6/2017 |

OTHER PUBLICATIONS

Accession BBW95771. May 21, 2015 (Year: 2015).*
Chica et al. Curr Opin Biotechnol. Aug. 2005; 16(4):378-84. (Year: 2005).*
Singh et al. Curr Protein Pept Sci. 2017, 18, 1-11 (Year: 2017).*
Accession P00692. Jul. 21, 1986 (Year: 1986).*
Chen et al., 2015, Micro Cell Fac 14(1), 1-15.
Chen et al., 2014, Biotechnology Letters 12, 899-906.
Pan, 2017, Chinese Excellent Doctoral Dissertation 2007, 1-80—Incl EnAb.

* cited by examiner

*Primary Examiner* — Christian L Fronda
(74) *Attorney, Agent, or Firm* — Eric J. Fechter

(57) ABSTRACT

The present invention relates to means and methods for optimizing expression of a heterologous polypeptide of interest in Gram-positive host cells by co-expression with a foldase that is cognate to the heterologous polypeptide of interest.

25 Claims, 1 Drawing Sheet
Specification includes a Sequence Listing.

COGNATE FOLDASE CO-EXPRESSION

CROSS-REFERENCE TO RELATED APPLICATIONS

This application is a 35 U.S.C. 371 national application of PCT/EP2020/051505, filed Jan. 22, 2020, which claims priority or the benefit from European Patent Application No. 19154510.2, filed Jan. 30, 2019. The contents of these applications are fully incorporated herein by reference.

REFERENCE TO A SEQUENCE LISTING

This application contains a Sequence Listing in computer readable form, which is incorporated herein by reference.

FIELD OF THE INVENTION

The present invention relates to means and methods for optimizing expression of a heterologous polypeptide of interest in Gram-positive host cells by co-expression with a foldase that is cognate to the heterologous polypeptide of interest.

BACKGROUND OF THE INVENTION

Within industrial biotechnology, there is a continuous need for improving production yield and thereby process profitability in the production of enzymes and other industrially relevant proteins. A successful strategy has been to employ production host cells that over-express the gene encoding the target protein, e.g., by using multicopy strains containing several gene copies or enhancing the activity of the gene by modifying its control sequences. To fully leverage the beneficial effects of gene over-expression, it would be desirable to increase the secretory capacity of the production host cell in order to overcome any bottlenecks in the secretory machinery.

Foldases are proteins that assist in folding of other proteins. Over-expression of foldases in a production host cell may provide an enhanced folding of a given protein of interest, which in turn is likely to result in enhanced secretion of correctly folded protein of interest and thereby an improved production yield.

PrsA is an extracytoplasmic foldase identified in various Gram-positive bacteria, including the industrially relevant *Bacillus licheniformis*. PrsA exists as a dimeric lipoprotein anchored in the outer leaflet of the cell membrane, where it aids folding of proteins secreted via the conserved SecA-YEG pathway.

Co-expression with PrsA was shown to improve expression of polypeptides in Gram-positive host cells (WO 1994/019471).

SUMMARY OF THE INVENTION

The present invention is based on the surprising and inventive finding that cultivation of Gram-positive host cells co-expressing a heterologous polypeptide of interest with a foldase that is cognate to the heterologous polypeptide of interest provides on par or improved expression of the heterologous polypeptide of interest as well as on par or reduced secretion stress when compared to co-expression of the same heterologous polypeptide of interest with a non-cognate foldase.

In a first aspect, the present invention relates to a nucleic acid construct comprising:

a) a first heterologous promoter operably linked to at least one polynucleotide encoding a foldase; and
b) a second heterologous promotor operably linked to at least one polynucleotide encoding a polypeptide of interest;
wherein the foldase and the polypeptide of interest are from the same Gram-positive species.

In a second aspect, the present invention relates to an expression vector comprising a nucleic acid construct of the first aspect.

In a third aspect, the present invention relates to a Gram-positive host cell comprising in its genome a nucleic acid construct according to the first aspect and/or an expression vector according to the second aspect.

In a fourth aspect, the present invention relates to a method for producing a polypeptide of interest, the method comprising:

a) providing a Gram-positive host cell of the third aspect;
b) cultivating said host cell under conditions conducive for expression of the foldase and the polypeptide of interest; and, optionally
c) recovering the polypeptide of interest.

DEFINITIONS

Figure 1:
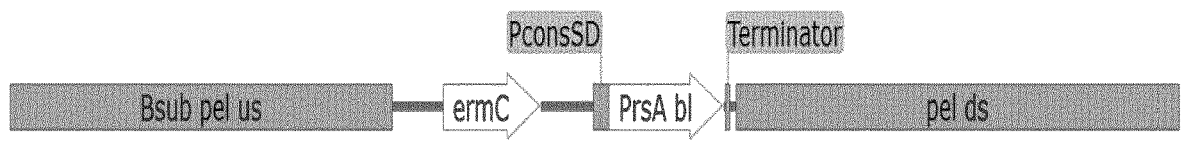
FIG. 1 shows a schematic view of a DNA construct used for integration of a prsA gene (exemplified by PrsA from *B. licheniformis*) in the pel locus strain of AN2.

Foldase: The term "foldase" means an enzyme having foldase activity. Foldases are proteins that facilitate folding of polypeptides into a functional three-dimensional structure, and/or prevent aggregation of unfolded polypeptides into non-functional structures and any subsequent proteolytic degradation. PrsA is an example of a foldase in Gram-positive bacteria. PrsA is a dimer consisting of two monomers that forms two domains; a peptidylprolyl isomerase (PPIase, E.C. 5.2.1.8) domain that interconverts the cis and trans isomers of peptidyl-prolyl bonds, and a chaperone domain that assists polypeptide folding (Jakob et al., 2015, *J. Biol. Chem.* 290(6): 3278-3292). In *Bacillus licheniformis* PrsA monomers, the PPIase domain consists of amino acids 115 to 205 of SEQ ID NO: 9, and the chaperone domain consists of amino acids 1 to 114 and 206 of 267 of SEQ ID NO: 9. A crystal structure of PrsA from *B. subtilis* is provided in Jakob et al., supra.

Allelic variant: The term "allelic variant" means any of two or more alternative forms of a gene occupying the same chromosomal locus. Allelic variation arises naturally through mutation, and may result in polymorphism within populations. Gene mutations can be silent (no change in the encoded polypeptide) or may encode polypeptides having altered amino acid sequences. An allelic variant of a polypeptide is a polypeptide encoded by an allelic variant of a gene.

cDNA: The term "cDNA" means a DNA molecule that can be prepared by reverse transcription from a mature, spliced, mRNA molecule obtained from a eukaryotic or prokaryotic cell. cDNA lacks intron sequences that may be present in the corresponding genomic DNA. The initial, primary RNA transcript is a precursor to mRNA that is processed through a series of steps, including splicing, before appearing as mature spliced mRNA.

Coding sequence: The term "coding sequence" means a polynucleotide, which directly specifies the amino acid sequence of a polypeptide. The boundaries of the coding sequence are generally determined by an open reading frame, which begins with a start codon such as ATG, GTG, or TTG and ends with a stop codon such as TAA, TAG, or TGA. The coding sequence may be a genomic DNA, cDNA, synthetic DNA, or a combination thereof.

Cognate: The term "cognate" means from the same species.

Control sequences: The term "control sequences" means nucleic acid sequences necessary for expression of a polynucleotide encoding a mature polypeptide of the present invention. Each control sequence may be native (i.e., from the same gene) or foreign (i.e., from a different gene) to the polynucleotide encoding the polypeptide or native or foreign to each other. Such control sequences include, but are not limited to, a leader, polyadenylation sequence, propeptide sequence, promoter, signal peptide sequence, and transcription terminator. At a minimum, the control sequences include a promoter, and transcriptional and translational stop signals. The control sequences may be provided with linkers for the purpose of introducing specific restriction sites facilitating ligation of the control sequences with the coding region of the polynucleotide encoding a polypeptide.

Expression: The term "expression" includes any step involved in the production of a polypeptide including, but not limited to, transcription, post-transcriptional modification, translation, post-translational modification, and secretion.

Expression vector: The term "expression vector" means a linear or circular DNA molecule that comprises a polynucleotide encoding a polypeptide and is operably linked to control sequences that provide for its expression.

Heterologous: The term "heterologous" means foreign, i.e., from a different gene or from a different organism.

In the context of the present invention, the term "heterologous polypeptide of interest" means a polypeptide of interest that is foreign (i.e., from a different species) to the host cell expressing the polypeptide of interest.

In the context of the present invention, the term "heterologous promoter" means a promoter that is foreign (i.e., from a different gene) to the polynucleotide to which it is operably linked.

In the context of the present invention, the term "heterologous to the Gram-positive host cell" means foreign (i.e., from a different species) to the Gram-positive host cell.

Host cell: The term "host cell" means any cell type that is susceptible to transformation, transfection, transduction, or the like with a nucleic acid construct or expression vector comprising a polynucleotide of the present invention. The term "host cell" encompasses any progeny of a parent cell that is not identical to the parent cell due to mutations that occur during replication.

Isolated: The term "isolated" means a substance in a form or environment that does not occur in nature.

Mature polypeptide: The term "mature polypeptide" means a polypeptide in its final form following translation and any post-translational modifications, such as N-terminal processing, C-terminal truncation, glycosylation, phosphorylation, etc. It is known in the art that a host cell may produce a mixture of two of more different mature polypeptides (i.e., with a different C-terminal and/or N-terminal amino acid) expressed by the same polynucleotide. It is also known in the art that different host cells process polypeptides differently, and thus, one host cell expressing a polynucleotide may produce a different mature polypeptide (e.g., having a different C-terminal and/or N-terminal amino acid) as compared to another host cell expressing the same polynucleotide.

Nucleic acid construct: The term "nucleic acid construct" means a nucleic acid molecule, either single- or double-stranded, which is isolated from a naturally occurring gene or is modified to contain segments of nucleic acids in a manner that would not otherwise exist in nature or which is synthetic, which comprises one or more control sequences.

Operably linked: The term "operably linked" means a configuration in which a control sequence is placed at an appropriate position relative to the coding sequence of a polynucleotide such that the control sequence directs expression of the coding sequence.

Secretion stress: The term "secretion stress" means the stress experienced by a Gram-positive host cell upon co-expression of a heterologous polypeptide of interest with a foldase that is cognate to the heterologous polypeptide of interest. Secretion stress may be determined by the activity of the secretion stress-inducible promoter HtrA ($P_{HtrA}$) as described in Examples 5-7 below. A reduction in secretion stress may be determined relative to the secretion stress experienced by a Gram-positive host cell of the same species co-expressing the heterologous polypeptide of interest with a foldase that is non-cognate to the heterologous polypeptide of interest.

Sequence identity: The relatedness between two amino acid sequences or between two nucleotide sequences is described by the parameter "sequence identity".

For purposes of the present invention, the sequence identity between two amino acid sequences is determined using the Needleman-Wunsch algorithm (Needleman and Wunsch, 1970, *J. Mol. Biol.* 48: 443-453) as implemented in the Needle program of the EMBOSS package (EMBOSS: The European Molecular Biology Open Software Suite, Rice et al., 2000, *Trends Genet.* 16: 276-277), preferably version 5.0.0 or later. The parameters used are gap open penalty of 10, gap extension penalty of 0.5, and the EBLOSUM62 (EMBOSS version of BLOSUM62) substitution matrix. The output of Needle labeled "longest identity" (obtained using the -nobrief option) is used as the percent identity and is calculated as follows:

(Identical Residues×100)/(Length of Alignment−
Total Number of Gaps in Alignment)

For purposes of the present invention, the sequence identity between two deoxyribonucleotide sequences is determined using the Needleman-Wunsch algorithm (Needleman and Wunsch, 1970, supra) as implemented in the Needle program of the EMBOSS package (EMBOSS: The European Molecular Biology Open Software Suite, Rice et al., 2000, supra), preferably version 5.0.0 or later. The parameters used are gap open penalty of 10, gap extension penalty of 0.5, and the EDNAFULL (EMBOSS version of NCBI NUC4.4) substitution matrix. The output of Needle labeled "longest identity" (obtained using the -nobrief option) is used as the percent identity and is calculated as follows:

(Identical Deoxyribonucleotides×100)/(Length of
Alignment−Total Number of Gaps in Alignment)

Variant: The term "variant" means a polypeptide comprising an alteration, i.e., a substitution, insertion, and/or deletion, at one or more (e.g., several) positions compared to the corresponding parent polypeptide. A substitution means replacement of the amino acid occupying a position with a different amino acid; a deletion means removal of the amino acid occupying a position; and an insertion means adding one or more (e.g., several) amino acids, e.g., 1-5 amino acids, adjacent to the amino acid occupying a position.

Yield: The term "yield" means the expression yield or the activity yield of a heterologous polypeptide of interest upon co-expression of this polypeptide with a foldase that is cognate to the heterologous polypeptide of interest according to the methods of the present invention. Alpha-amylase activity yield of a polypeptide of interest may be determined according to Example 4 below. For other enzyme activities, activity assays are known in the art and readily available to the skilled person The term "improved yield" means a relative improvement in expression yield or activity yield of a heterologous polypeptide of interest upon co-expression with foldase that is cognate to the heterologous polypeptide of interest in a Gram-positive host cell compared to the expression yield or activity yield of the same heterologous polypeptide of interest upon co-expression with a foldase that is non-cognate to the heterologous polypeptide of interest in a Gram-positive host cell of the same species. In one embodiment, the yield is on par or improved, e.g., at least 100%, at least 101%, at least 102%, at least 103%, at least 104%, at least 105%, at least 110%, at least 120%, at least 130%, at least 140%, at least 150%, at least 175%, at least 200%, at least 250%, at least 300%, at least 400%, at least 500%, or more.

SEQUENCE LISTING

SEQ ID NO:1: DNA sequence of *B. amyloliquefaciens* PrsA.
SEQ ID NO:2: *B. amyloliquefaciens* PrsA including signal peptide.
SEQ ID NO:3: *B. amyloliquefaciens* PrsA mature polypeptide.
SEQ ID NO:4: DNA sequence of *B. amyloliquefaciens* amylase (AmyQ).
SEQ ID NO:5: *B. amyloliquefaciens* amylase including signal peptide.
SEQ ID NO:6: *B. amyloliquefaciens* amylase mature polypeptide.
SEQ ID NO:7: DNA sequence of *B. licheniformis* PrsA.
SEQ ID NO:8: *B. licheniformis* PrsA including signal peptide.
SEQ ID NO:9: *B. licheniformis* PrsA mature polypeptide.
SEQ ID NO:10: DNA sequence of *B. licheniformis* amylase (AmyL).
SEQ ID NO:11: *B. licheniformis* amylase including signal peptide.
SEQ ID NO:12: *B. licheniformis* amylase mature polypeptide.
SEQ ID NO:13: DNA sequence of *B.* sp. NSP9.1 PrsA.
SEQ ID NO:14: *B.* sp. NSP9.1 PrsA including signal peptide.
SEQ ID NO:15: *B.* sp. NSP9.1 PrsA mature polypeptide.
SEQ ID NO:16: DNA sequence of *B.* sp. NSP9.1 amylase.
SEQ ID NO:17: *B.* sp. NSP9.1 amylase including signal peptide.
SEQ ID NO:18: *B.* sp. NSP9.1 amylase mature polypeptide.
SEQ ID NO:19: DNA sequence of *B. sonorensis* L12 PrsA.
SEQ ID NO:20: *B. sonorensis* L12 PrsA including signal peptide.
SEQ ID NO:21: *B. sonorensis* L12 PrsA mature polypeptide.
SEQ ID NO:22: DNA sequence of *B. sonorensis* L12 amylase.
SEQ ID NO:23: *B. sonorensis* L12 amylase including signal peptide.
SEQ ID NO:24: *B. sonorensis* L12 amylase mature polypeptide.
SEQ ID NO:25: DNA sequence of *B. subtilis* PrsA.
SEQ ID NO:26: *B. subtilis* PrsA including signal peptide.
SEQ ID NO:27: *B. subtilis* PrsA mature polypeptide.
SEQ ID NO:28: DNA sequence of *B. subtilis* amylase (AmyE).
SEQ ID NO:29: *B. subtilis* amylase including signal peptide.
SEQ ID NO:30: *B. subtilis* amylase mature polypeptide.
SEQ ID NO:31: DNA sequence of sigF gene.
SEQ ID NO:32: DNA sequence of sigF Δ297 bp.
SEQ ID NO:33: SOE PCR product for integration of a gene coding for PrsA from *B. licheniformis* in pel locus of AN2, AQG91.
SEQ ID NO:34: SOE PCR product for integration of a gene coding for AmyL of *B. licheniformis* in amyE locus of AN2, AQG91.
SEQ ID NO:35: SOE PCR product for integration of the $P_{htrA}$-lacZ cassette in the xyl locus of *B. subtilis*.

DETAILED DESCRIPTION OF THE INVENTION

The present invention relates to means and methods for optimizing expression of heterologous polypeptides in Gram-positive host cells.

The present invention is based on the surprising and inventive finding that cultivation of Gram-positive host cells co-expressing a heterologous polypeptide of interest with a foldase, e.g., PrsA, that is cognate to the heterologous polypeptide of interest provides on par or even improved expression of the heterologous polypeptide of interest. In addition, co-expression of a heterologous polypeptides of interest with a cognate foldase also provides on par or reduced secretion stress when compared to co-expression of the heterologous polypeptide of interest with a non-cognate foldase. Thus, co-expression of heterologous polypeptides of interest together with a cognate foldase provides a hitherto unknown option for optimizing polypeptide expression in Gram-positive host cells, which is highly desirable within industrial biotechnology.

Nucleic Acid Constructs

In a first aspect, the present invention relates to a nucleic acid construct comprising:
a) a first heterologous promoter operably linked to at least one polynucleotide encoding a foldase; and
b) a second heterologous promotor operably linked to at least one polynucleotide encoding a polypeptide of interest;
wherein the foldase and the polypeptide of interest are from the same Gram-positive species.

The nucleic acid constructs of the invention comprise at least one (i.e., one or more, e.g., 1, 2, 3, 4, 5, 6, 7, 8, 9, 10, or more) polynucleotide encoding a polypeptide of interest. In some embodiments, the nucleic acid constructs of the invention comprise two or more polynucleotides encoding two or more polypeptides of interest, wherein the two or more polypeptides of interest are the same or different polypeptide(s) of interest.

The polypeptide of interest may be any polypeptide. Preferably, the polypeptide of interest is secreted.

In a preferred embodiment, the polypeptide of interest comprises an enzyme; preferably the enzyme is selected from the group consisting of hydrolase, isomerase, ligase, lyase, oxidoreductase, or transferase; more preferably an aminopeptidase, amylase, carbohydrase, carboxypeptidase, catalase, cellobiohydrolase, cellulase, chitinase, cutinase, cyclodextrin glycosyltransferase, deoxyribonuclease, endoglucanase, esterase, alpha-galactosidase, beta-galactosidase, glucoamylase, alpha-glucosidase, beta-glucosidase, invertase, laccase, lipase, mannosidase, mutanase, nuclease, oxidase, pectinolytic enzyme, peroxidase, phosphodiesterase, phytase, polyphenoloxidase, proteolytic enzyme, ribonuclease, transglutaminase, xylanase, and beta-xylosidase; most preferably the polypeptide of interest is an amylase.

The nucleic acid constructs of the invention comprise polynucleotides that encode a foldase and a polypeptide of interest, wherein said foldase and said polypeptide of interest are selected from the same Gram-positive species. In a preferred embodiment, the foldase and the polypeptide of interest are selected from the same Bacillus species; preferably the Bacillus species is selected from the group consisting of Bacillus alkalophilus, Bacillus altitudinis, Bacillus amyloliquefaciens, B. amyloliquefaciens subsp. plantarum, Bacillus brevis, Bacillus circulans, Bacillus clausii, Bacillus coagulans, Bacillus firmus, Bacillus sp. NSP9.1, Bacillus lautus, Bacillus lentus, Bacillus licheniformis, Bacillus megaterium, Bacillus methylotrophicus, Bacillus pumilus, Bacillus safensis, Bacillus sonorensis L12, Bacillus stearothermophilus, Bacillus subtilis, and Bacillus thuringiensis cells; most preferably Bacillus species is selected from the group consisting of Bacillus amyloliquefaciens, Bacillus licheniformis, Bacillus sp. NSP9.1, Bacillus sonorensis L12, and Bacillus subtilis.

Although the foldase and polypeptide of interest are selected from the same species, the skilled person will acknowledge the naturally occurring sequence variance of polynucleotide and polypeptide sequences within the same species.

In a preferred embodiment, the foldase has a sequence identity of at least 80%, e.g., at least 85%, at least 90%, at least 91%, at least 92%, at least 93%, at least 94%, at least 95%, at least 96%, at least 97%, at least 98%, at least 99%, or 100%, to SED ID NO:3, and the polypeptide of interest is from B. amyloliquefaciens. Preferably, the polypeptide of interest is an amylase; more preferably the polypeptide of interest has a sequence identity of at least 80%, e.g., at least 85%, at least 90%, at least 91%, at least 92%, at least 93%, at least 94%, at least 95%, at least 96%, at least 97%, at least 98%, at least 99%, or 100%, to SEQ ID NO:6. Most preferably, the polypeptide of interest comprises or consists of SEQ ID NO:6.

In a preferred embodiment, the foldase has a sequence identity of at least 80%, e.g., at least 85%, at least 90%, at least 91%, at least 92%, at least 93%, at least 94%, at least 95%, at least 96%, at least 97%, at least 98%, at least 99%, or 100%, to SED ID NO:9, and the polypeptide of interest is from B. licheniformis. Preferably, the polypeptide of interest is an amylase; more preferably the polypeptide of interest has a sequence identity of at least 80%, e.g., at least 85%, at least 90%, at least 91%, at least 92%, at least 93%, at least 94%, at least 95%, at least 96%, at least 97%, at least 98%, at least 99%, or 100%, to SEQ ID NO:12. Most preferably, the polypeptide of interest comprises or consists of SEQ ID NO:12.

In a preferred embodiment, the foldase has a sequence identity of at least 80%, e.g., at least 85%, at least 90%, at least 91%, at least 92%, at least 93%, at least 94%, at least 95%, at least 96%, at least 97%, at least 98%, at least 99%, or 100%, to SED ID NO:15, and the polypeptide of interest is from B. sp. NSP9.1. Preferably, the polypeptide of interest is an amylase; more preferably the polypeptide of interest has a sequence identity of at least 80%, e.g., at least 85%, at least 90%, at least 91%, at least 92%, at least 93%, at least 94%, at least 95%, at least 96%, at least 97%, at least 98%, at least 99%, or 100%, to SEQ ID NO:18. Most preferably, the polypeptide of interest comprises or consists of SEQ ID NO:18.

In a preferred embodiment, the foldase has a sequence identity of at least 80%, e.g., at least 85%, at least 90%, at least 91%, at least 92%, at least 93%, at least 94%, at least 95%, at least 96%, at least 97%, at least 98%, at least 99%, or 100%, to SED ID NO:21, and the polypeptide of interest is from B. sonorensis L12. Preferably, the polypeptide of interest is an amylase; more preferably the polypeptide of interest has a sequence identity of at least 80%, e.g., at least 85%, at least 90%, at least 91%, at least 92%, at least 93%, at least 94%, at least 95%, at least 96%, at least 97%, at least 98%, at least 99%, or 100%, to SEQ ID NO:24. Most preferably, the polypeptide of interest comprises or consists of SEQ ID NO:24.

In a preferred embodiment, the foldase has a sequence identity of at least 80%, e.g., at least 85%, at least 90%, at least 91%, at least 92%, at least 93%, at least 94%, at least 95%, at least 96%, at least 97%, at least 98%, at least 99%, or 100%, to SED ID NO:27, and the polypeptide of interest is from B. subtilis. Preferably, the polypeptide of interest is an amylase; more preferably the polypeptide of interest has a sequence identity of at least 80%, e.g., at least 85%, at least 90%, at least 91%, at least 92%, at least 93%, at least 94%, at least 95%, at least 96%, at least 97%, at least 98%, at least 99%, or 100%, to SEQ ID NO:30. Most preferably, the polypeptide of interest comprises or consists of SEQ ID NO:30.

The nucleic acid constructs of the invention are operably linked to one or more control sequences that direct the expression of the polynucleotides in a suitable host cell under conditions compatible with the control sequences.

The polynucleotide may be manipulated in a variety of ways to provide for expression of the polypeptide. Manipulation of the polynucleotide prior to its insertion into a vector may be desirable or necessary depending on the expression vector. The techniques for modifying polynucleotides utilizing recombinant DNA methods are well known in the art.

The control sequence may be a promoter, a polynucleotide that is recognized by a host cell for expression of a polynucleotide encoding a polypeptide of the present invention. The promoter contains transcriptional control sequences that mediate the expression of the polypeptide. The promoter may be any polynucleotide that shows transcriptional activity in the host cell including variant, truncated, and hybrid promoters, and may be obtained from genes encoding extracellular or intracellular polypeptides either homologous or heterologous to the host cell.

Examples of suitable promoters for directing transcription of the nucleic acid constructs of the present invention in a bacterial host cell are the promoters obtained from the Bacillus amyloliquefaciens alpha-amylase gene (amyQ), Bacillus licheniformis alpha-amylase gene (amyL), Bacillus

*licheniformis* penicillinase gene (penP), *Bacillus stearothermophilus* maltogenic amylase gene (amyM), *Bacillus subtilis* levansucrase gene (sacB), *Bacillus subtilis* xylA and xylB genes, *Bacillus thuringiensis* cryIIIA gene (Agaisse and Lereclus, 1994, *Molecular Microbiology* 13: 97-107), *E. coli* lac operon, *E. coli* trc promoter (Egon et al., 1988, *Gene* 69: 301-315), *Streptomyces coelicolor* agarase gene (dagA), and prokaryotic beta-lactamase gene (Villa-Kamaroff et al., 1978, *Proc. Natl. Acad. Sci. USA* 75: 3727-3731), as well as the tac promoter (DeBoer et al., 1983, *Proc. Natl. Acad. Sci. USA* 80: 21-25). Further promoters are described in "Useful proteins from recombinant bacteria" in Gilbert et al., 1980, *Scientific American* 242: 74-94; and in Sambrook et al., 1989, supra. Examples of tandem promoters are disclosed in WO 99/43835.

Preferably, the first heterologous promotor and the second heterologous promoter are identical copies of the same heterologous promoter.

The control sequence may also be a transcription terminator, which is recognized by a host cell to terminate transcription. The terminator is operably linked to the 3'-terminus of the polynucleotide encoding the polypeptide. Any terminator that is functional in the host cell may be used in the present invention.

Preferred terminators for bacterial host cells are obtained from the genes for *Bacillus clausii* alkaline protease (aprH), *Bacillus licheniformis* alpha-amylase (amyL), and *Escherichia coli* ribosomal RNA (rrnB).

The control sequence may also be an mRNA stabilizer region downstream of a promoter and upstream of the coding sequence of a gene which increases expression of the gene.

Examples of suitable mRNA stabilizer regions are obtained from a *Bacillus thuringiensis* cryIIIA gene (WO 94/25612) and a *Bacillus subtilis* SP82 gene (Hue et al., 1995, *Journal of Bacteriology* 177: 3465-3471).

The control sequence may also be a signal peptide coding region that encodes a signal peptide linked to the N-terminus of a polypeptide and directs the polypeptide into the cell's secretory pathway. The 5'-end of the coding sequence of the polynucleotide may inherently contain a signal peptide coding sequence naturally linked in translation reading frame with the segment of the coding sequence that encodes the polypeptide. Alternatively, the 5'-end of the coding sequence may contain a signal peptide coding sequence that is foreign to the coding sequence. A foreign signal peptide coding sequence may be required where the coding sequence does not naturally contain a signal peptide coding sequence. Alternatively, a foreign signal peptide coding sequence may simply replace the natural signal peptide coding sequence in order to enhance secretion of the polypeptide. However, any signal peptide coding sequence that directs the expressed polypeptide into the secretory pathway of a host cell may be used.

Effective signal peptide coding sequences for bacterial host cells are the signal peptide coding sequences obtained from the genes for *Bacillus* NCI B 11837 maltogenic amylase, *Bacillus licheniformis* subtilisin, *Bacillus licheniformis* beta-lactamase, *Bacillus stearothermophilus* alpha-amylase, *Bacillus stearothermophilus* neutral proteases (nprT, nprS, nprM), and *Bacillus subtilis* prsA. Further signal peptides are described by Simonen and Palva, 1993, *Microbiological Reviews* 57: 109-137.

The control sequence may also be a propeptide coding sequence that encodes a propeptide positioned at the N-terminus of a polypeptide. The resultant polypeptide is known as a proenzyme or propolypeptide (or a zymogen in some cases). A propolypeptide is generally inactive and can be converted to an active polypeptide by catalytic or autocatalytic cleavage of the propeptide from the propolypeptide. The propeptide coding sequence may be obtained from the genes for *Bacillus subtilis* alkaline protease (aprE) and *Bacillus subtilis* neutral protease (nprT).

Where both signal peptide and propeptide sequences are present, the propeptide sequence is positioned next to the N-terminus of a polypeptide and the signal peptide sequence is positioned next to the N-terminus of the propeptide sequence.

It may also be desirable to add regulatory sequences that regulate expression of the polypeptide relative to the growth of the host cell. Examples of regulatory sequences are those that cause expression of the gene to be turned on or off in response to a chemical or physical stimulus, including the presence of a regulatory compound. Regulatory sequences in prokaryotic systems include the lac, tac, and trp operator systems.

Polynucleotides

The present invention also relates to polynucleotides encoding a foldase and polynucleotides encoding a polypeptide of interest, as described herein. In an embodiment, the polynucleotides encoding foldases and polypeptides of interest have been isolated.

The techniques used to isolate or clone a polynucleotide are known in the art and include isolation from genomic DNA or cDNA, or a combination thereof. The cloning of the polynucleotides from genomic DNA can be effected, e.g., by using the well-known polymerase chain reaction (PCR) or antibody screening of expression libraries to detect cloned DNA fragments with shared structural features. See, e.g., Innis et al., 1990, *PCR: A Guide to Methods and Application*, Academic Press, New York. Other nucleic acid amplification procedures such as ligase chain reaction (LCR), ligation activated transcription (LAT) and polynucleotide-based amplification (NASBA) may be used. The polynucleotides may be cloned from a strain of *Bacillus*, or a related organism and thus, for example, may be an allelic or species variant of the polypeptide encoding region of the polynucleotide.

Modification of a polynucleotide encoding a foldase or a polypeptide of interest of the present invention may be necessary for synthesizing polypeptides substantially similar to said polypeptides. The term "substantially similar" to the polypeptides refers to non-naturally occurring forms of the polypeptides.

Expression Vectors

The present invention also relates to recombinant expression vectors comprising a polynucleotide of the present invention, a promoter, and transcriptional and translational stop signals. The various nucleotide and control sequences may be joined together to produce a recombinant expression vector that may include one or more convenient restriction sites to allow for insertion or substitution of the polynucleotide encoding the polypeptide at such sites. Alternatively, the polynucleotide may be expressed by inserting the polynucleotide or a nucleic acid construct comprising the polynucleotide into an appropriate vector for expression. In creating the expression vector, the coding sequence is located in the vector so that the coding sequence is operably linked with the appropriate control sequences for expression.

The recombinant expression vector may be any vector (e.g., a plasmid or virus) that can be conveniently subjected to recombinant DNA procedures and can bring about expression of the polynucleotide. The choice of the vector will typically depend on the compatibility of the vector with the host cell into which the vector is to be introduced. The vector may be a linear or closed circular plasmid.

The vector may be an autonomously replicating vector, i.e., a vector that exists as an extrachromosomal entity, the replication of which is independent of chromosomal replication, e.g., a plasmid, an extrachromosomal element, a minichromosome, or an artificial chromosome. The vector may contain any means for assuring self-replication. Alternatively, the vector may be one that, when introduced into the host cell, is integrated into the genome and replicated together with the chromosome(s) into which it has been integrated. Furthermore, a single vector or plasmid or two or more vectors or plasmids that together contain the total DNA to be introduced into the genome of the host cell, or a transposon, may be used.

The vector preferably contains one or more selectable markers that permit easy selection of transformed, transfected, transduced, or the like cells. A selectable marker is a gene the product of which provides for biocide or viral resistance, resistance to heavy metals, prototrophy to auxotrophs, and the like.

Examples of bacterial selectable markers are *Bacillus licheniformis* or *Bacillus subtilis* dal genes, or markers that confer antibiotic resistance such as ampicillin, chloramphenicol, kanamycin, neomycin, spectinomycin, or tetracycline resistance.

The vector preferably contains an element(s) that permits integration of the vector into the host cell's genome or autonomous replication of the vector in the cell independent of the genome.

For integration into the host cell genome, the vector may rely on the polynucleotide's sequence encoding the polypeptide or any other element of the vector for integration into the genome by homologous or non-homologous recombination. Alternatively, the vector may contain additional polynucleotides for directing integration by homologous recombination into the genome of the host cell at a precise location(s) in the chromosome(s). To increase the likelihood of integration at a precise location, the integrational elements should contain a sufficient number of nucleic acids, such as 100 to 10,000 base pairs, 400 to 10,000 base pairs, and 800 to 10,000 base pairs, which have a high degree of sequence identity to the corresponding target sequence to enhance the probability of homologous recombination. The integrational elements may be any sequence that is homologous with the target sequence in the genome of the host cell. Furthermore, the integrational elements may be non-encoding or encoding polynucleotides. On the other hand, the vector may be integrated into the genome of the host cell by non-homologous recombination.

For autonomous replication, the vector may further comprise an origin of replication enabling the vector to replicate autonomously in the host cell in question. The origin of replication may be any plasmid replicator mediating autonomous replication that functions in a cell. The term "origin of replication" or "plasmid replicator" means a polynucleotide that enables a plasmid or vector to replicate in vivo.

Examples of bacterial origins of replication are the origins of replication of plasmids pUB110, pE194, pTA1060, and pAMβ1 permitting replication in *Bacillus*.

More than one copy of a polynucleotide of the present invention may be inserted into a host cell to increase production of a polypeptide. An increase in the copy number of the polynucleotide can be obtained by integrating at least one additional copy of the sequence into the host cell genome or by including an amplifiable selectable marker gene with the polynucleotide where cells containing amplified copies of the selectable marker gene, and thereby additional copies of the polynucleotide, can be selected for by cultivating the cells in the presence of the appropriate selectable agent.

The procedures used to ligate the elements described above to construct the recombinant expression vectors of the present invention are well known to one skilled in the art (see, e.g., Sambrook et al., 1989, supra).

Host Cells

The present invention also relates to recombinant host cells, comprising polynucleotides of the present invention operably linked to one or more control sequences that direct their expression. A nucleic acid construct and/or expression vector comprising the polynucleotides is introduced into a host cell so that the construct or vector is maintained as a chromosomal integrant or as a self-replicating extra-chromosomal vector as described earlier. The term "host cell" encompasses any progeny of a parent cell that is not identical to the parent cell due to mutations that occur during replication. The choice of a host cell will to a large extent depend upon the gene encoding the polypeptide and its source.

The host cell may be any cell useful in the recombinant production of a polypeptide of interest of the present invention, e.g., a Gram-positive cell.

The Gram-positive host cell may be any Gram-positive cell. Gram-positive host cells include, but are not limited to, any *Bacillus, Clostridium, Enterococcus, Lactobacillus, Lactococcus, Oceanobacillus, Staphylococcus, Streptococcus*, and *Streptomyces* cell.

The Gram-positive host cell may be any *Bacillus* cell including, but not limited to, *Bacillus alkalophilus, Bacillus altitudinis, Bacillus amyloliquefaciens, B. amyloliquefaciens* subsp. *plantarum, Bacillus brevis, Bacillus circulans, Bacillus clausii, Bacillus coagulans, Bacillus firmus, Bacillus* sp. NSP9.1, *Bacillus lautus, Bacillus lentus, Bacillus licheniformis, Bacillus megaterium, Bacillus methylotrophicus, Bacillus pumilus, Bacillus safensis, Bacillus sonorensis* L12, *Bacillus stearothermophilus, Bacillus subtilis*, and *Bacillus thuringiensis* cells. Preferably, the Gram-positive host cell is a *Bacillus* cell selected from the group consisting of *B. amyloliquefaciens, B. licheniformis, B.* sp. NSP9.1, *B. sonorensis* L12, and *B. subtilis*.

The Gram-positive host cell may also be any *Streptococcus* cell including, but not limited to, *Streptococcus equisimilis, Streptococcus pyogenes, Streptococcus uberis*, and *Streptococcus equi* subsp. *Zooepidemicus* cells.

The Gram-positive host cell may also be any *Streptomyces* cell including, but not limited to, *Streptomyces achromogenes, Streptomyces avermitilis, Streptomyces coelicolor, Streptomyces griseus*, and *Streptomyces lividans* cells.

The introduction of DNA into a *Bacillus* cell may be effected by protoplast transformation (see, e.g., Chang and Cohen, 1979, *Mol. Gen. Genet.* 168: 111-115), competent cell transformation (see, e.g., Young and Spizizen, 1961, *J. Bacteriol.* 81: 823-829, or Dubnau and Davidoff-Abelson, 1971, *J. Mol. Biol.* 56: 209-221), electroporation (see, e.g., Shigekawa and Dower, 1988, *Biotechniques* 6: 742-751), or conjugation (see, e.g., Koehler and Thorne, 1987, *J. Bacteriol.* 169: 5271-5278).

The introduction of DNA into a *Streptomyces* cell may be effected by protoplast transformation, electroporation (see, e.g., Gong et al., 2004, *Folia Microbiol.* (Praha) 49: 399-405), conjugation (see, e.g., Mazodier et al., 1989, *J. Bacteriol.* 171: 3583-3585), or transduction (see, e.g., Burke et al., 2001, *Proc. Natl. Acad. Sci. USA* 98: 6289-6294).

The introduction of DNA into a *Streptococcus* cell may be effected by natural competence (see, e.g., Perry and Kuramitsu, 1981, *Infect. Immun.* 32: 1295-1297), protoplast transformation (see, e.g., Catt and Jollick, 1991, *Microbios* 68: 189-207), electroporation (see, e.g., Buckley et al., 1999, *Appl. Environ. Microbiol.* 65: 3800-3804), or conjugation (see, e.g., Clewell, 1981, *Microbiol. Rev.* 45: 409-436).

However, any method known in the art for introducing DNA into a host cell can be used.

In a preferred embodiment, the Gram-positive host cells of the invention comprise in their genome a nucleic acid construct comprising (a) a first heterologous promoter operably linked to at least one polynucleotide encoding a foldase and (b) a second heterologous promotor operably linked to at least one polynucleotide encoding a polypeptide of interest, wherein the foldase and the polypeptide of interest are from the same Gram-positive species.

In an alternative embodiment, the at least one polynucleotide encoding a foldase and the at least one polynucleotide encoding a polypeptide of interest are operably linked with the same heterologous promotor in an operon.

Methods of Production

The present invention also relates to methods for producing a polypeptide of interest, the method comprising:
  a) providing a Gram-positive host cell of the invention comprising a nucleic acid construct and/or expression vector of the invention;
  b) cultivating said host cell under conditions conducive for expression of the foldase and the polypeptide of interest; and, optionally
  c) recovering the polypeptide of interest.

In an aspect, the present invention relates to a method for producing a polypeptide of interest, the method comprising:
  I) providing a Gram-positive host cell comprising in its genome:
    1) a nucleic acid construct comprising:
      a) a first heterologous promoter operably linked to at least one polynucleotide encoding a foldase; and
      b) a second heterologous promotor operably linked to at least one polynucleotide encoding a polypeptide of interest;
    and/or
    2) an expression vector comprising said nucleic acid construct;
    wherein the foldase and the polypeptide of interest are from the same Gram-positive species and are heterologous to the Gram-positive host cell;
  II) cultivating said host cell under conditions conducive for expression of the foldase and the polypeptide of interest; and, optionally
  III) recovering the polypeptide of interest.

In an embodiment, the Gram-positive host cell is a *Bacillus* cell. In another aspect, the Gram-positive host cell is a *Bacillus licheniformis* cell.

The methods of the inventions provide on par or improved yield of the polypeptide of interest and/or on par or reduced secretion stress. Thus, the methods of the invention maintain or improve yield without simultaneously increasing the amount of secretion stress exerted on the host cell, which is very beneficial for large-scale polypeptide production.

In an embodiment, the yield of the polypeptide of interest is on par or improved, e.g., at least 100%, at least 101%, at least 102%, at least 103%, at least 104%, at least 105%, at least 110%, at least 120%, at least 130%, at least 140%, at least 150%, at least 175%, at least 200%, at least 250%, at least 300%, at least 400%, at least 500%, or more. In a preferred embodiment, the yield is improved, e.g., more than 100% such as at least 101%, at least 102%, at least 103%, at least 104%, at least 105%, at least 110%, at least 120%, at least 130%, at least 140%, at least 150%, at least 175%, at least 200%, at least 250%, at least 300%, at least 400%, at least 500%, or more.

In an embodiment, the secretion stress experienced by the Gram-positive host cell is on par or reduced. In a preferred embodiment, the secretion stress is reduced. Most preferably the secretion stress is reduced by at least 1%, e.g., at least 2%, at least 3%, at least 4%, at least 5%, at least 10%, at least 15%, at least 20%, at least 25%, at least 30%, at least 35%, at least 40%, at least 45%, at least 50%, at least 75%, or more.

In an embodiment, the yield of the polypeptide of interest is improved and the secretion stress experienced by the Gram-positive host cell is on par or reduced.

In an embodiment, the yield of the polypeptide of interest is on par and the secretion stress experienced by the Gram-positive host cell is reduced.

In an embodiment, the yield of the polypeptide of interest is improved and the secretion stress experienced by the Gram-positive host cell is reduced.

The Gram-positive host cells are cultivated in a nutrient medium suitable for production of the polypeptide of interest using methods known in the art. For example, the cells may be cultivated by shake flask cultivation, or small-scale or large-scale fermentation (including continuous, batch, fed-batch, or solid-state fermentations) in laboratory or industrial fermentors in a suitable medium and under conditions allowing the polypeptide to be expressed and/or isolated. The cultivation takes place in a suitable nutrient medium comprising carbon and nitrogen sources and inorganic salts, using procedures known in the art. Suitable media are available from commercial suppliers or may be prepared according to published compositions (e.g., in catalogues of the American Type Culture Collection). If the polypeptide of interest is secreted into the nutrient medium, the polypeptide of interest can be recovered directly from the medium. If the polypeptide of interest is not secreted, it can be recovered from cell lysates.

The polypeptide of interest may be detected using methods known in the art that are specific for the polypeptide of interest. These detection methods include, but are not limited to, use of specific antibodies, formation of an enzyme product, or disappearance of an enzyme substrate. For example, an enzyme assay may be used to determine the activity of the polypeptide of interest.

The polypeptide of interest may be recovered using methods known in the art. For example, the polypeptide may be recovered from the nutrient medium by conventional procedures including, but not limited to, collection, centrifugation, filtration, extraction, spray-drying, evaporation, or precipitation. In one aspect, a fermentation broth comprising the polypeptide of interest is recovered.

The polypeptide of interest may be purified by a variety of procedures known in the art including, but not limited to, chromatography (e.g., ion exchange, affinity, hydrophobic, chromatofocusing, and size exclusion), electrophoretic procedures (e.g., preparative isoelectric focusing), differential solubility (e.g., ammonium sulfate precipitation), SDS-PAGE, or extraction (see, e.g., *Protein Purification*, Janson and Ryden, editors, VCH Publishers, New York, 1989) to obtain substantially pure polypeptides.

In an alternative aspect, the polypeptide of interest is not recovered, but rather a host cell of the present invention expressing the polypeptide of interest is used as a source of the polypeptide of interest.

Fermentation Broth Formulations and Cell Compositions

In further aspects, the present invention also relates to a fermentation broth formulation or a cell composition comprising a polypeptide of interest. The fermentation broth product further comprises additional ingredients used in the fermentation process, such as, for example, cells (including, the host cells containing the gene encoding the polynucleotide(s) which are used to produce the polypeptide of interest), cell debris, biomass, fermentation media and/or fermentation products. In some embodiments, the composition is a cell-killed whole broth containing organic acid(s), killed cells and/or cell debris, and culture medium.

The term "fermentation broth" as used herein refers to a preparation produced by cellular fermentation that undergoes no or minimal recovery and/or purification. For example, fermentation broths are produced when microbial cultures are grown to saturation, incubated under carbon-limiting conditions to allow protein synthesis (e.g., expression of enzymes by host cells) and secretion into cell culture medium. The fermentation broth can contain unfractionated or fractionated contents of the fermentation materials derived at the end of the fermentation. Typically, the fermentation broth is unfractionated and comprises the spent culture medium and cell debris present after the microbial cells are removed, e.g., by centrifugation. In some embodiments, the fermentation broth contains spent cell culture medium, extracellular enzymes, and viable and/or nonviable microbial cells.

In an embodiment, the fermentation broth formulation and cell compositions comprise a first organic acid component comprising at least one 1-5 carbon organic acid and/or a salt thereof and a second organic acid component comprising at least one 6 or more carbon organic acid and/or a salt thereof. In a specific embodiment, the first organic acid component is acetic acid, formic acid, propionic acid, a salt thereof, or a mixture of two or more of the foregoing and the second organic acid component is benzoic acid, cyclohexanecarboxylic acid, 4-methylvaleric acid, phenylacetic acid, a salt thereof, or a mixture of two or more of the foregoing.

In one aspect, the composition contains an organic acid(s), and optionally further contains killed cells and/or cell debris. In one embodiment, the killed cells and/or cell debris are removed from a cell-killed whole broth to provide a composition that is free of these components.

The fermentation broth formulations or cell compositions may further comprise a preservative and/or anti-microbial (e.g., bacteriostatic) agent, including, but not limited to, sorbitol, sodium chloride, potassium sorbate, and others known in the art.

The cell-killed whole broth or composition may contain the unfractionated contents of the fermentation materials derived at the end of the fermentation. Typically, the cell-killed whole broth or composition contains the spent culture medium and cell debris present after the microbial cells (e.g., filamentous fungal cells) are grown to saturation, incubated under carbon-limiting conditions to allow protein synthesis. In some embodiments, the cell-killed whole broth or composition contains the spent cell culture medium, extracellular enzymes, and killed filamentous fungal cells. In some embodiments, the microbial cells present in the cell-killed whole broth or composition can be permeabilized and/or lysed using methods known in the art.

A whole broth or cell composition as described herein is typically a liquid, but may contain insoluble components, such as killed cells, cell debris, culture media components, and/or insoluble enzyme(s). In some embodiments, insoluble components may be removed to provide a clarified liquid composition.

The whole broth formulations and cell compositions of the present invention may be produced by a method described in WO 1990/15861 or WO 2010/096673.

PREFERRED EMBODIMENTS

1) A nucleic acid construct comprising:
   a) a first heterologous promoter operably linked to at least one polynucleotide encoding a foldase; and
   b) a second heterologous promotor operably linked to at least one polynucleotide encoding a polypeptide of interest;
   wherein the foldase and the polypeptide of interest are from the same Gram-positive species.

2) The nucleic acid construct according to embodiment 1, wherein the first heterologous promotor and the second heterologous promoter are identical copies of the same heterologous promoter.

3) The nucleic acid construct according to any of the preceding embodiments, wherein the polypeptide of interest is secreted.

4) The nucleic acid construct according to any of the preceding embodiments, wherein the polypeptide of interest comprises an enzyme; preferably the enzyme is selected from the group consisting of hydrolase, isomerase, ligase, lyase, oxidoreductase, or transferase; more preferably an aminopeptidase, amylase, carbohydrase, carboxypeptidase, catalase, cellobiohydrolase, cellulase, chitinase, cutinase, cyclodextrin glycosyltransferase, deoxyribonuclease, endoglucanase, esterase, alpha-galactosidase, beta-galactosidase, glucoamylase, alpha-glucosidase, beta-glucosidase, invertase, laccase, lipase, mannosidase, mutanase, nuclease, oxidase, pectinolytic enzyme, peroxidase, phosphodiesterase, phytase, polyphenoloxidase, proteolytic enzyme, ribonuclease, transglutaminase, xylanase, and beta-xylosidase; most preferably the polypeptide of interest is an amylase.

5) The nucleic acid construct according to any of the preceding embodiments, wherein the foldase and the polypeptide of interest are selected from the same *Bacillus* species; preferably the *Bacillus* species is selected from the group consisting of *Bacillus alkalophilus, Bacillus altitudinis, Bacillus amyloliquefaciens, B. amyloliquefaciens* subsp. *plantarum, Bacillus brevis, Bacillus circulans, Bacillus clausii, Bacillus coagulans, Bacillus firmus, Bacillus* sp. NSP9.1, *Bacillus lautus, Bacillus lentus, Bacillus licheniformis, Bacillus megaterium, Bacillus methylotrophicus, Bacillus pumilus, Bacillus safensis, Bacillus sonorensis* L12, *Bacillus stearothermophilus, Bacillus subtilis*, and *Bacillus thuringiensis* cells; most preferably *Bacillus* species is selected from the group consisting of *B. amyloliquefaciens, B. licheniformis, B.* sp. NSP9.1, *B. sonorensis* L12, and *B. subtilis*.

6) The nucleic acid construct according to any of the preceding embodiments, wherein the foldase has a sequence identity of at least 80%, e.g., at least 85%, at least 90%, at least 91%, at least 92%, at least 93%, at least 94%, at least 95%, at least 96%, at least 97%, at least 98%, at least 99%, or 100%, to SED ID NO:3, and the polypeptide of interest is from *B. amyloliquefaciens*; preferably the polypeptide of interest is an amylase; more preferably the polypeptide of interest has a sequence identity of at least 80%, e.g., at least 85%, at least 90%, at least 91%, at least 92%, at least 93%, at least 94%, at least 95%, at least 96%, at least 97%, at least 98%, at least 99%, or 100%, to SEQ ID NO:6; most preferably, the polypeptide of interest comprises or consists of SEQ ID NO:6.

7) The nucleic acid construct according to any of embodiments 1-5, wherein the foldase has a sequence identity of at least 80%, e.g., at least 85%, at least 90%, at least 91%, at least 92%, at least 93%, at least 94%, at least 95%, at least 96%, at least 97%, at least 98%, at least 99%, or 100%, to SED ID NO:9, and the polypeptide of interest is from *B. licheniformis*; preferably the polypeptide of interest is an amylase; more preferably the polypeptide of interest has a sequence identity of at least 80%, e.g., at least 85%, at least 90%, at least 91%, at least 92%, at least 93%, at least 94%, at least 95%, at least 96%, at least 97%, at least 98%, at least 99%, or 100%, to SEQ ID NO:12; most preferably, the polypeptide of interest comprises or consists of SEQ ID NO:12.

8) The nucleic acid construct according to any embodiments 1-5, wherein the foldase has a sequence identity of at least 80%, e.g., at least 85%, at least 90%, at least 91%, at least 92%, at least 93%, at least 94%, at least 95%, at least 96%, at least 97%, at least 98%, at least 99%, or 100%, to SED ID NO:15, and the polypeptide of interest is from B. NSP9.1; preferably the polypeptide of interest is an amylase; more preferably the polypeptide of interest has a sequence identity of at least 80%, e.g., at least 85%, at least 90%, at least 91%, at least 92%, at least 93%, at least 94%, at least 95%, at least 96%, at least 97%, at least 98%, at least 99%, or 100%, to SEQ ID NO:18; most preferably, the polypeptide of interest comprises or consists of SEQ ID NO:18.

9) The nucleic acid construct according to any of embodiments 1-5, wherein the foldase has a sequence identity of at least 80%, e.g., at least 85%, at least 90%, at least 91%, at least 92%, at least 93%, at least 94%, at least 95%, at least 96%, at least 97%, at least 98%, at least 99%, or 100%, to SED ID NO:21, and the polypeptide of interest is from *B. sonorensis* L12; preferably the polypeptide of interest is an amylase; more preferably the polypeptide of interest has a sequence identity of at least 80%, e.g., at least 85%, at least 90%, at least 91%, at least 92%, at least 93%, at least 94%, at least 95%, at least 96%, at least 97%, at least 98%, at least 99%, or 100%, to SEQ ID NO:24; most preferably, the polypeptide of interest comprises or consists of SEQ ID NO:24.

10) The nucleic acid construct according to any of embodiments 1-5, wherein the foldase has a sequence identity of at least 80%, e.g., at least 85%, at least 90%, at least 91%, at least 92%, at least 93%, at least 94%, at least 95%, at least 96%, at least 97%, at least 98%, at least 99%, or 100%, to SED ID NO:27, and the polypeptide of interest is from *B. subtilis*; preferably the polypeptide of interest is an amylase; more preferably the polypeptide of interest has a sequence identity of at least 80%, e.g., at least 85%, at least 90%, at least 91%, at least 92%, at least 93%, at least 94%, at least 95%, at least 96%, at least 97%, at least 98%, at least 99%, or 100%, to SEQ ID NO:30; most preferably, the polypeptide of interest comprises or consists of SEQ ID NO:30.

11) An expression vector comprising a nucleic acid construct comprising:
a) a first heterologous promoter operably linked to at least one polynucleotide encoding a foldase; and
b) a second heterologous promoter operably linked to at least one polynucleotide encoding a polypeptide of interest;
wherein the foldase and the polypeptide of interest are from the same Gram-positive species.

12) The expression vector according to embodiment 10, wherein the first heterologous promotor and the second heterologous promoter are identical copies of the same heterologous promoter.

13) The expression vector according to any of embodiments 11-12, wherein the polypeptide of interest is secreted.

14) The expression vector according to any of embodiments 11-13, wherein the polypeptide of interest comprises an enzyme; preferably the enzyme is selected from the group consisting of hydrolase, isomerase, ligase, lyase, oxidoreductase, or transferase; more preferably an aminopeptidase, amylase, carbohydrase, carboxypeptidase, catalase, cellobiohydrolase, cellulase, chitinase, cutinase, cyclodextrin glycosyltransferase, deoxyribonuclease, endoglucanase, esterase, alpha-galactosidase, beta-galactosidase, glucoamylase, alpha-glucosidase, beta-glucosidase, invertase, laccase, lipase, mannosidase, mutanase, nuclease, oxidase, pectinolytic enzyme, peroxidase, phosphodiesterase, phytase, polyphenoloxidase, proteolytic enzyme, ribonuclease, transglutaminase, xylanase, and beta-xylosidase; most preferably the polypeptide of interest is an amylase.

15) The expression vector according to any of embodiments 11-14, wherein the foldase and the polypeptide of interest are selected from the same *Bacillus* species; preferably the *Bacillus* species is selected from the group consisting of *Bacillus alkalophilus, Bacillus altitudinis, Bacillus amyloliquefaciens, B. amyloliquefaciens* subsp. *plantarum, Bacillus brevis, Bacillus circulans, Bacillus clausii, Bacillus coagulans, Bacillus firmus, Bacillus* sp. NSP9.1, *Bacillus lautus, Bacillus lentus, Bacillus licheniformis, Bacillus megaterium, Bacillus methylotrophicus, Bacillus pumilus, Bacillus safensis, Bacillus sonorensis* L12, *Bacillus stearothermophilus, Bacillus subtilis*, and *Bacillus thuringiensis* cells; most preferably *Bacillus* species is selected from the group consisting of *B. amyloliquefaciens, B. licheniformis, B.* sp. NSP9.1, *B. sonorensis* L12, and *B. subtilis*.

16) The expression vector according to any of embodiments 11-15, wherein the foldase has a sequence identity of at least 80%, e.g., at least 85%, at least 90%, at least 91%, at least 92%, at least 93%, at least 94%, at least 95%, at least 96%, at least 97%, at least 98%, at least 99%, or 100%, to SED ID NO:3, and the polypeptide of interest is from *B. amyloliquefaciens*; preferably the polypeptide of interest is an amylase; more preferably the polypeptide of interest has a sequence identity of at least 80%, e.g., at least 85%, at least 90%, at least 91%, at least 92%, at least 93%, at least 94%, at least 95%, at least 96%, at least 97%, at least 98%, at least 99%, or 100%, to SEQ ID NO:6; most preferably, the polypeptide of interest comprises or consists of SEQ ID NO:6.

17) The expression vector according to any of embodiments 11-15, wherein the foldase has a sequence identity of at least 80%, e.g., at least 85%, at least 90%, at least 91%, at least 92%, at least 93%, at least 94%, at least 95%, at least 96%, at least 97%, at least 98%, at least 99%, or 100%, to SED ID NO:9, and the polypeptide of interest is from *B. licheniformis*; preferably the polypeptide of interest is an amylase; more preferably the polypeptide of interest has a sequence identity of at least 80%, e.g., at least 85%, at least 90%, at least 91%, at least 92%, at least 93%, at least 94%, at least 95%, at least 96%, at least 97%, at least 98%, at least 99%, or 100%, to SEQ ID NO:12; most preferably, the polypeptide of interest comprises or consists of SEQ ID NO:12.

18) The expression vector according to any of embodiments 11-15, wherein the foldase has a sequence identity of at least 80%, e.g., at least 85%, at least 90%, at least 91%, at least 92%, at least 93%, at least 94%, at least 95%, at least 96%, at least 97%, at least 98%, at least 99%, or 100%, to SED ID NO:15, and the polypeptide of interest is from *B.* sp. NSP9.1; preferably the polypeptide of interest is an amylase; more preferably the polypeptide of interest has a sequence identity of at least 80%, e.g., at least 85%, at least 90%, at least 91%, at least 92%, at least 93%, at least 94%, at least 95%, at least 96%, at least 97%, at least 98%, at least 99%, or 100%, to SEQ ID NO:18; most preferably, the polypeptide of interest comprises or consists of SEQ ID NO:18.

19) The expression vector according to any of embodiments 11-15, wherein the foldase has a sequence identity of at least 80%, e.g., at least 85%, at least 90%, at least 91%, at least 92%, at least 93%, at least 94%, at least 95%, at least 96%, at least 97%, at least 98%, at least 99%, or 100%, to SED ID NO:21, and the polypeptide of interest is from *B. sonorensis* L12; preferably the polypeptide of interest is an amylase; more preferably the polypeptide of interest has a sequence identity of at least 80%, e.g., at least 85%, at least 90%, at least 91%, at least 92%, at least 93%, at least 94%, at least 95%, at least 96%, at least 97%, at least 98%, at least 99%, or 100%, to SEQ ID NO:24; most preferably, the polypeptide of interest comprises or consists of SEQ ID NO:24.

20) The expression vector according to any of embodiments 11-15, wherein the foldase has a sequence identity of at least 80%, e.g., at least 85%, at least 90%, at least 91%, at least 92%, at least 93%, at least 94%, at least 95%, at least 96%, at least 97%, at least 98%, at least 99%, or 100%, to SED ID NO:27, and the polypeptide of interest is from *B. subtilis*; preferably the polypeptide of interest is an amylase; more preferably the polypeptide of interest has a sequence identity of at least 80%, e.g., at least 85%, at least 90%, at least 91%, at least 92%, at least 93%, at least 94%, at least 95%, at least 96%, at least 97%, at least 98%, at least 99%, or 100%, to SEQ ID NO:30; most preferably, the polypeptide of interest comprises or consists of SEQ ID NO:30.

21) A Gram-positive host cell comprising in its genome:
  1) a nucleic acid construct comprising:
    a) a first heterologous promoter operably linked to at least one polynucleotide encoding a foldase; and
    b) a second heterologous promotor operably linked to at least one polynucleotide encoding a polypeptide of interest;
  and/or
  2) an expression vector comprising said nucleic acid construct;
  wherein the foldase and the polypeptide of interest are from the same Gram-positive species and are heterologous to the Gram-positive host cell.

22) The Gram-positive host cell according to embodiment 21, which is a *Bacillus* host cell; preferably the *Bacillus* host cell is selected from the group consisting of *Bacillus alkalophilus, Bacillus altitudinis, Bacillus amyloliquefaciens, B. amyloliquefaciens* subsp. *plantarum, Bacillus brevis, Bacillus circulans, Bacillus clausii, Bacillus coagulans, Bacillus firmus, Bacillus* sp. NSP9.1, *Bacillus lautus, Bacillus lentus, Bacillus licheniformis, Bacillus megaterium, Bacillus methylotrophicus, Bacillus pumilus, Bacillus safensis, Bacillus sonorensis* L12, *Bacillus stearothermophilus, Bacillus subtilis*, and *Bacillus thuringiensis* cells; most preferably *Bacillus* species is selected from the group consisting of *B. amyloliquefaciens, B. licheniformis, B.* sp. NSP9.1, *B. sonorensis* L12, and *B. subtilis*.

23) The Gram-positive host cell according to any of embodiments 21-22, wherein the first heterologous promotor and the second heterologous promoter are identical copies of the same heterologous promoter.

24) The Gram-positive host cell according to any of embodiments 21-23, wherein the polypeptide of interest is secreted.

25) The Gram-positive host cell according to any of embodiments 21-24, wherein the polypeptide of interest comprises an enzyme; preferably the enzyme is selected from the group consisting of hydrolase, isomerase, ligase, lyase, oxidoreductase, or transferase; more preferably an aminopeptidase, amylase, carbohydrase, carboxypeptidase, catalase, cellobiohydrolase, cellulase, chitinase, cutinase, cyclodextrin glycosyltransferase, deoxyribonuclease, endoglucanase, esterase, alpha-galactosidase, beta-galactosidase, glucoamylase, alpha-glucosidase, beta-glucosidase, invertase, laccase, lipase, mannosidase, mutanase, nuclease, oxidase, pectinolytic enzyme, peroxidase, phosphodiesterase, phytase, polyphenoloxidase, proteolytic enzyme, ribonuclease, transglutaminase, xylanase, and beta-xylosidase; most preferably the polypeptide of interest is an amylase.

26) The Gram-positive host cell according to any of embodiments 21-25, wherein the foldase has a sequence identity of at least 80%, e.g., at least 85%, at least 90%, at least 91%, at least 92%, at least 93%, at least 94%, at least 95%, at least 96%, at least 97%, at least 98%, at least 99%, or 100%, to SED ID NO:3, and the polypeptide of interest is from *B. amyloliquefaciens*; preferably the polypeptide of interest is an amylase; more preferably the polypeptide of interest has a sequence identity of at least 80%, e.g., at least 85%, at least 90%, at least 91%, at least 92%, at least 93%, at least 94%, at least 95%, at least 96%, at least 97%, at least 98%, at least 99%, or 100%, to SEQ ID NO:6; most preferably, the polypeptide of interest comprises or consists of SEQ ID NO:6.

27) The Gram-positive host cell according to any of embodiments 21-25, wherein the foldase has a sequence identity of at least 80%, e.g., at least 85%, at least 90%, at least 91%, at least 92%, at least 93%, at least 94%, at least 95%, at least 96%, at least 97%, at least 98%, at least 99%, or 100%, to SED ID NO:9, and the polypeptide of interest is from *B. licheniformis*; preferably the polypeptide of interest is an amylase; more preferably the polypeptide of interest has a sequence identity of at least 80%, e.g., at least 85%, at least 90%, at least 91%, at least 92%, at least 93%, at least 94%, at least 95%, at least 96%, at least 97%, at least 98%, at least 99%, or 100%, to SEQ ID NO:12; most preferably, the polypeptide of interest comprises or consists of SEQ ID NO:12.

28) The Gram-positive host cell according to any of embodiments 21-25, wherein the foldase has a sequence identity of at least 80%, e.g., at least 85%, at least 90%, at least 91%, at least 92%, at least 93%, at least 94%, at least 95%, at least 96%, at least 97%, at least 98%, at least 99%, or 100%, to SED ID NO:15, and the polypeptide of interest is from *B.* sp. NSP9.1; preferably the polypeptide of interest is an amylase; more preferably the polypeptide of interest has a sequence identity of at least 80%, e.g., at least 85%, at least 90%, at least 91%, at least 92%, at least 93%, at least 94%, at least 95%, at least 96%, at least 97%, at least 98%, at least 99%, or 100%, to SEQ ID NO:18; most preferably, the polypeptide of interest comprises or consists of SEQ ID NO:18.

29) The Gram-positive host cell according to any of embodiments 21-25, wherein the foldase has a sequence identity of at least 80%, e.g., at least 85%, at least 90%, at least 91%, at least 92%, at least 93%, at least 94%, at least 95%, at least 96%, at least 97%, at least 98%, at least 99%, or 100%, to SED ID NO:21, and the polypeptide of interest is from *B. sonorensis* L12; preferably the polypeptide of interest is an amylase; more preferably the polypeptide of interest has a sequence identity of at least 80%, e.g., at least 85%, at least 90%, at least 91%, at least 92%, at least 93%, at least 94%, at least 95%, at least 96%, at least 97%, at least 98%, at least 99%, or 100%, to SEQ ID NO:24; most preferably, the polypeptide of interest comprises or consists of SEQ ID NO:24.

30) The Gram-positive host cell according to any of embodiments 21-25, wherein the foldase has a sequence identity of at least 80%, e.g., at least 85%, at least 90%, at least 91%, at least 92%, at least 93%, at least 94%, at least 95%, at least 96%, at least 97%, at least 98%, at least 99%, or 100%, to SED ID NO:27, and the polypeptide of interest is from *B. subtilis*; preferably the polypeptide of interest is an amylase; more preferably the polypeptide of interest has a sequence identity of at least 80%, e.g., at least 85%, at least 90%, at least 91%, at least 92%, at least 93%, at least 94%, at least 95%, at least 96%, at least 97%, at least 98%, at least 99%, or 100%, to SEQ ID NO:30; most preferably, the polypeptide of interest comprises or consists of SEQ ID NO:30.

31) A method for producing a polypeptide of interest, the method comprising:
  I) providing a Gram-positive host cell comprising in its genome:
    1) a nucleic acid construct comprising:
      a) a first heterologous promoter operably linked to at least one polynucleotide encoding a foldase; and
      b) a second heterologous promotor operably linked to at least one polynucleotide encoding the polypeptide of interest;
    and/or
    2) an expression vector comprising said nucleic acid construct;
      wherein the foldase and the polypeptide of interest are from the same Gram-positive species and are heterologous to the Gram-positive host cell;
  II) cultivating said host cell under conditions conducive for expression of the foldase and the polypeptide of interest; and, optionally
  III) recovering the polypeptide of interest.

32) The method according to embodiment 31, wherein the Gram-positive host cell is a *Bacillus* host cell; preferably the *Bacillus* host cell is selected from the group consisting of *Bacillus alkalophilus, Bacillus altitudinis, Bacillus amyloliquefaciens, B. amyloliquefaciens* subsp. *plantarum, Bacillus brevis, Bacillus circulans, Bacillus clausii, Bacillus coagulans, Bacillus firmus, Bacillus* sp. NSP9.1, *Bacillus lautus, Bacillus lentus, Bacillus licheniformis, Bacillus megaterium, Bacillus methylotrophicus, Bacillus pumilus, Bacillus safensis, Bacillus sonorensis* L12, *Bacillus stearothermophilus, Bacillus subtilis*, and *Bacillus thuringiensis* cells; most preferably *Bacillus* species is selected from the group consisting of *B. amyloliquefaciens, B. licheniformis, B.* sp. NSP9.1, *B. sonorensis* L12, and *B. subtilis*.

33) The method according to any of embodiments 31-32, wherein the first heterologous promotor and the second heterologous promoter are identical copies of the same heterologous promoter.

34) The method according to any of embodiments 31-33, wherein the polypeptide of interest is secreted.

35) The method according to any of embodiments 31-34, wherein the polypeptide of interest comprises an enzyme; preferably the enzyme is selected from the group consisting of hydrolase, isomerase, ligase, lyase, oxidoreductase, or transferase; more preferably an aminopeptidase, amylase, carbohydrase, carboxypeptidase, catalase, cellobiohydrolase, cellulase, chitinase, cutinase, cyclodextrin glycosyltransferase, deoxyribonuclease, endoglucanase, esterase, alpha-galactosidase, beta-galactosidase, glucoamylase, alpha-glucosidase, beta-glucosidase, invertase, laccase, lipase, mannosidase, mutanase, nuclease, oxidase, pectinolytic enzyme, peroxidase, phosphodiesterase, phytase, polyphenoloxidase, proteolytic enzyme, ribonuclease, transglutaminase, xylanase, and beta-xylosidase; most preferably the polypeptide of interest is an amylase.

36) The method according to any of embodiments 31-35, wherein the secretion stress experienced by the Gram-positive host cell is on par or reduced; preferably the secretion stress experienced by the Gram-positive host cell is reduced; most preferably the secretion stress is reduced by at least 1%, e.g., at least 2%, at least 3%, at least 4%, at least 5%, at least 10%, at least 15%, at least 20%, at least 25%, at least 30%, at least 35%, at least 40%, at least 45%, at least 50%, at least 75%, or more.

37) The method according to any of embodiments 31-36, wherein the foldase has a sequence identity of at least 80%, e.g., at least 85%, at least 90%, at least 91%, at least 92%, at least 93%, at least 94%, at least 95%, at least 96%, at least 97%, at least 98%, at least 99%, or 100%, to SED ID NO:3, and the polypeptide of interest is from *B. amyloliquefaciens*; preferably the polypeptide of interest is an amylase; more preferably the polypeptide of interest has a sequence identity of at least 80%, e.g., at least 85%, at least 90%, at least 91%, at least 92%, at least 93%, at least 94%, at least 95%, at least 96%, at least 97%, at least 98%, at least 99%, or 100%, to SEQ ID NO:6; most preferably, the polypeptide of interest comprises or consists of SEQ ID NO:6.

38) The method according to any of embodiments 31-36, wherein the foldase has a sequence identity of at least 80%, e.g., at least 85%, at least 90%, at least 91%, at least 92%, at least 93%, at least 94%, at least 95%, at least 96%, at least 97%, at least 98%, at least 99%, or 100%, to SED ID NO:9, and the polypeptide of interest is from *B. licheniformis*; preferably the polypeptide of interest is an amylase; more preferably the polypeptide of interest has a sequence identity of at least 80%, e.g., at least 85%, at least 90%, at least 91%, at least 92%, at least 93%, at least 94%, at least 95%, at least 96%, at least 97%, at least 98%, at least 99%, or 100%, to SEQ ID NO:12; most preferably, the polypeptide of interest comprises or consists of SEQ ID NO:12.

39) The method according to any of embodiments 31-36, wherein the foldase has a sequence identity of at least 80%, e.g., at least 85%, at least 90%, at least 91%, at least 92%, at least 93%, at least 94%, at least 95%, at least 96%, at least 97%, at least 98%, at least 99%, or 100%, to SED ID NO:15, and the polypeptide of interest is from *B.* sp. NSP9.1; preferably the polypeptide of interest is an amylase; more preferably the polypeptide of interest has a sequence identity of at least 80%, e.g., at least 85%, at least 90%, at least 91%, at least 92%, at least 93%, at least 94%, at least 95%, at least 96%, at least 97%, at least 98%, at least 99%, or 100%, to SEQ ID NO:18; most preferably, the polypeptide of interest comprises or consists of SEQ ID NO:18.

40) The method according to any of embodiments 31-36, wherein the foldase has a sequence identity of at least 80%, e.g., at least 85%, at least 90%, at least 91%, at least 92%, at least 93%, at least 94%, at least 95%, at least 96%, at least 97%, at least 98%, at least 99%, or 100%, to SED ID NO:21, and the polypeptide of interest is from *B. sonorensis* L12; preferably the polypeptide of interest is an amylase; more preferably the polypeptide of interest has a sequence identity of at least 80%, e.g., at least 85%, at least 90%, at least 91%, at least 92%, at least 93%, at least 94%, at least 95%, at least 96%, at least 97%, at least 98%, at least 99%, or 100%, to SEQ ID NO:24; most preferably, the polypeptide of interest comprises or consists of SEQ ID NO:24.

41) The method according to any of embodiments 31-36, wherein the foldase has a sequence identity of at least 80%, e.g., at least 85%, at least 90%, at least 91%, at least 92%, at least 93%, at least 94%, at least 95%, at least 96%, at least 97%, at least 98%, at least 99%, or 100%, to SED ID NO:27, and the polypeptide of interest is from B. subtilis; preferably the polypeptide of interest is an amylase; more preferably the polypeptide of interest has a sequence identity of at least 80%, e.g., at least 85%, at least 90%, at least 91%, at least 92%, at least 93%, at least 94%, at least 95%, at least 96%, at least 97%, at least 98%, at least 99%, or 100%, to SEQ ID NO:30; most preferably, the polypeptide of interest comprises or consists of SEQ ID NO:30.

42) The method according to any of embodiments 31-41, wherein the yield of the polypeptide of interest is on par or improved, e.g., at least 100%, at least 101%, at least 102%, at least 103%, at least 104%, at least 105%, at least 110%, at least 120%, at least 130%, at least 140%, at least 150%, at least 175%, at least 200%, at least 250%, at least 300%, at least 400%, at least 500%, or more, preferably the yield is improved, e.g., more than 100% such as at least 101%, at least 102%, at least 103%, at least 104%, at least 105%, at least 110%, at least 120%, at least 130%, at least 140%, at least 150%, at least 175%, at least 200%, at least 250%, at least 300%, at least 400%, at least 500%, or more.

43) The method according to any of embodiments 31-42, wherein the secretion stress experienced by the Gram-positive host cell is on par or reduced; preferably the secretion stress is reduced; most preferably the secretion stress is reduced by at least 1%, e.g., at least 2%, at least 3%, at least 4%, at least 5%, at least 10%, at least 15%, at least 20%, at least 25%, at least 30%, at least 35%, at least 40%, at least 45%, at least 50%, at least 75%, or more.

44) The method according to any of embodiments 31-43, wherein the yield of the polypeptide of interest is improved and the secretion stress experienced by the Gram-positive host cell is on par or reduced.

45) The method according to any of embodiments 31-44, wherein the yield of the polypeptide of interest is on par and the secretion stress experienced by the Gram-positive host cell is reduced.

46) The method according to any of embodiments 31-45, wherein the yield of the polypeptide of interest is improved and the secretion stress experienced by the Gram-positive host cell is reduced.

The present invention is further described by the following examples that should not be construed as limiting the scope of the invention.

EXAMPLES

Materials and Methods

Materials

Chemicals used as buffers and substrates were commercial products of at least reagent grade.

PCR amplifications were performed using standard textbook procedures, employing a commercial thermocycler and either Ready-To-Go PCR beads, Phusion polymerase, or RED-TAQ polymerase from commercial suppliers.

LB agar: See EP 0 506 780.

LBPSG agar plates contains LB agar supplemented with phosphate (0.01 M $K_3PO_4$), glucose (0.4%), and starch (0.5%); See EP 0 805 867 B1.

TY (liquid broth medium): See WO 94/14968, p. 16.

Oligonucleotide primers were obtained from Eurofins, Aarhus, Denmark. DNA manipulations (plasmid and genomic DNA preparation, restriction digestion, purification, ligation, DNA sequencing) was performed using standard textbook procedures with commercially available kits and reagents.

DNA was introduced into B. subtilis rendered naturally competent, either using a two-step procedure (Yasbin et al., 1975, J. Bacteriol. 121: 296-304), or a one-step procedure, in which cell material from an agar plate was resuspended in Spizisen 1 medium (WO 2014/052630), 12 ml shaken at 200 rpm for approx. 4 hours at 37° C., DNA added to 400 microliter aliquots, and these further shaken 150 rpm for 1 hour at the desired temperature before plating on selective agar plates.

All of the constructions described in the examples were assembled from synthetic DNA fragments ordered from GeneArt—ThermoFisher Scientific. The fragments were assembled by sequence overlap extension (SOE) as described in the Examples.

Genomic DNA was prepared from all relevant isolates by using the commercial available QIAamp DNA Blood Kit from Qiagen.

Standard Microplate Batch-Fermentation

The BioLector® is a microfermentation system that monitors online common fermentation parameters such as biomass, pH, oxygen saturation and fluorescence. It contains a temperature and humidity controlled incubation chamber that carries a single microplate. The fermentation can be monitored continuously by an optical fiber that moves below the plate. In this work, a BioLector® (m2p-Labs, Baesweiler, Germany) was used for the measurement of scattered light and GFP fluorescence. Cultivations were performed in LB media, at a shaking frequency of 1000 rpm, 37° C. and 85% humidity in 48-well Flowerplates® (M2p-labs), covered with a Sealing Foil with Reduced Evaporation (M2p-Labs). Fermentations were carried out in biological triplicates for 24 hours, and the supernatants harvested for subsequent amylase activity measurements.

Amylase Activity Assay

After 24 hours of fermentation, the Flowerplates® were centrifuged at 3500 rpm for 20 minutes at 4° C. 20 ul of the supernatant was transferred in technical duplicates to 96-well plates. A calibration curve with increasing concentrations of BAN amylase (0-500 UCF/ul, Novozymes in-house product) was added to each 96 well plate. AmyL (Roche/Hitachi) Reagent 1 (66 mL) and Reagent 2 (16 mL) were mixed and 180 ul of the mixture was added to the plate. The colorimetric reaction was measured in a Cytation5 plate reader at 405 nm, 23° C. for 6 minutes, measuring absorbance each minute.

Strains

| Strain | prsA gene in pel locus | Amylase gene in amyE locus |
| --- | --- | --- |
| B. subtilis 168 (Kunst et al. 1997) | | |
| AGQ159 | | SEQ ID NO: 13 |
| AN2 (B. subtilis 168; ΔsigF) | — | |

-continued

| Strain | prsA gene in pel locus | Amylase gene in amyE locus |
|---|---|---|
| AQG1 | — | SEQ ID NO: 4 |
| AQG100 | SEQ ID NO: 1 | SEQ ID NO: 4 |
| AQG109 | SEQ ID NO: 1 | SEQ ID NO: 28 |
| AQG115 | SEQ ID NO: 7 | SEQ ID NO: 4 |
| AQG126 | SEQ ID NO: 25 | SEQ ID NO: 10 |
| AQG131 | SEQ ID NO: 25 | SEQ ID NO: 4 |
| AQG162 | SEQ ID NO: 19 | |
| AQG174 | SEQ ID NO: 13 | SEQ ID NO: 10 |
| AQG175 | SEQ ID NO: 13 | SEQ ID NO: 4 |
| AQG178 | SEQ ID NO: 13 | SEQ ID NO: 28 |
| AQG34 | SEQ ID NO: 25 | |
| AQG567 | SEQ ID NO: 25 | SEQ ID NO: 22 |
| AQG570 | SEQ ID NO: 7 | SEQ ID NO: 22 |
| AQG572 | SEQ ID NO: 1 | SEQ ID NO: 22 |
| AQG575 | — | SEQ ID NO: 22 |
| AQG586 | SEQ ID NO: 13 | SEQ ID NO: 22 |
| AQG587 | — | SEQ ID NO: 16 |
| AQG588 | SEQ ID NO: 25 | SEQ ID NO: 16 |
| AQG590 | SEQ ID NO: 1 | SEQ ID NO: 16 |
| AQG606 | SEQ ID NO: 13 | SEQ ID NO: 16 |
| AQG610 | SEQ ID NO: 7 | SEQ ID NO: 16 |
| AQG657 | SEQ ID NO: 19 | SEQ ID NO: 10 |
| AQG661 | SEQ ID NO: 19 | SEQ ID NO: 22 |
| AQG662 | SEQ ID NO: 19 | SEQ ID NO: 28 |
| AQG667 | SEQ ID NO: 19 | SEQ ID NO: 16 |
| AQG672 | SEQ ID NO: 19 | SEQ ID NO: 4 |
| AQG77 | — | SEQ ID NO: 10 |
| AQG83 | SEQ ID NO: 25 | SEQ ID NO: 28 |
| AQG84 | — | SEQ ID NO: 28 |
| AQG91 | SEQ ID NO: 7 | |
| AQG92 | SEQ ID NO: 1 | |
| AQG97 | SEQ ID NO: 7 | SEQ ID NO: 10 |
| AQG108 | SEQ ID NO: 7 | SEQ ID NO: 28 |
| AQG98 | SEQ ID NO: 1 | SEQ ID NO: 10 |

Example 1. Construction of the *B. subtilis* Host AN2

*B. subtilis* AN2 was used as a host strain for expression of prsA and amylase genes as described in the following Examples. AN2 is a sporulation deficient derivative of *B. subtilis* 168 due to deletion of 297 bp in the sigF gene (the sigF sequence is provided as SEQ ID NO: 31 and the inactive version containing the deletion is provided as SEQ ID NO:32).

Example 2. Construction of Expression Cassettes for Heterologous prsA Genes and Chromosomal Integration of these in *B. subtilis* AN2

The *B. subtilis* strain AN2 was used as a host strain for insertion of expression cassettes for heterologous copies of the prsA gene. PrsA expression cassettes were integrated into the pel locus and consisted of the synthetic promoter $P_{conSD}$ followed by a prsA gene and the *B. subtilis* prsA native terminator. DNA for integrations can be assembled by PCR amplifications of synthetic DNA consisting of the following DNA components: pel 5' region+ermC (conferring resistance to erythromycin)+synthetic consensus promoter with SD sequence (PconsSD)+prsA open reading frame with terminator+pel 3' region. The purified PCR products were used in subsequent PCR reactions to create single linear DNA by the Gene Splicing by Overlapping Extension (SOE) method (Horton RM 1989) and the Phusion Hot Start DNA Polymerase system (Thermo Scientific) as follows. The PCR amplification reaction mixture contained 50 ng of each of the gel purified PCR products and a thermocycler was used to assemble and amplify the DNA.

The resulting SOE product was used directly for transformation of the *B. subtilis* host AN2. Chromosomal integration was facilitated by homologous recombination and cells in where double cross over events occurred were selected for on LB agar plates containing 1 μg/ml erythromycin. A schematic view of a linear DNA product used for integration of a prsA gene in AN2 is shown in FIG. 1 and the sequence of the DNA used for integration of the prsA gene from *Bacillus licheniformis* in AN2 resulting in strain AQG91 is listed in SEQ ID NO:33 (*B. licheniformis* prsA DNA sequence is SEQ ID NO:7). AN2 derivatives expressing PrsA from *B. amyloliquefaciens* (AQG92, SEQ ID NO:1), *B.* sp. NSP9.1 (AQG159, SEQ ID NO:13), *B. sonorensis* L12 (AQG162, SEQ ID NO:19), and *B. subtilis* (AGQ34, SEQ ID NO:25) were constructed by similar processes.

Example 3: Construction of Expression Cassettes for Heterologous Alpha-Amylase Genes and Chromosomal Integration of these in *B. subtilis* AN2, AQG91, AQG34, AQG92, AQG159, and AQG162

Figure 2:
FIG. 2 shows a schematic view of a DNA construct used for integration of an amylase gene (exemplified by AmyL from *B. licheniformis*) in the amyE locus in *B. subtilis*.

Alpha-amylase expression cassettes were integrated into the amyE loci of *B. subtilis* AN2, AQG91, AQG34, AQG92, AQG159 and AQG162 and consisted of the synthetic promoter $P_{conSD}$ followed by an alpha-amylase gene and the *B. amyloliquefaciens* amyQ terminator. The amyE gene becomes inactivated in this process. DNA for integration can be assembled by PCR amplifications of synthetic DNA consisting of the following DNA components: amyE 5' region+synthetic consensus promoter with SD sequence (PconsSD)+an alpha-amylase open reading frame+the *B. amyloliquefaciens* amyQ terminator+the cat gene (conferring resistance to chloramphenicol)+amyE 3' region. The genes encoding alpha-amylases used in this example are SEQ ID NO:4 (encoding *B. amyloliquefaciens* AmyQ), SEQ ID NO:10 (encoding *B. licheniformis* AmyL, SEQ ID NO:16 (encoding *B.* sp. NSP9.1 Amy9.1), SEQ ID NO:22 (encoding *B. sonorensis* L12 AmyL12), and SEQ ID NO:28 (encoding *B. subtilis* AmyE). The purified PCR products were used in subsequent PCR reactions to create single linear DNA by the SOE method described in Example 2. The resulting SOE products were used directly for transformation of the *B. subtilis* strains described in Example 2 and a schematic view of such a DNA product (used for integration of the amyL gene in AQG91) is shown in FIG. 2 and the DNA sequence is listed in SEQ ID NO:34. Each of SEQ ID NO:4, SEQ ID NO:10, SEQ ID NO:16, SEQ ID NO:22, and SEQ ID NO:28 were integrated into the amyE loci of each of the *B. subtilis* strains AN2, AQG92, AQG91, AQG159, AQG162, and AQG34 by a series of parallel integration processes as described for amyL previously in this Example. The resulting strains are listed in Table 1 below:

TABLE 1

| Gene delivered to amyE locus | Recipient strain | prsA gene in pel locus of recipient strain | Resulting strain |
|---|---|---|---|
| SEQ ID NO: 10 | AN2 | — | AQG77 |
| | AQG91 | SEQ ID NO: 7 | AQG97 |
| | AQG34 | SEQ ID NO: 25 | AQG126 |
| | AQG92 | SEQ ID NO: 1 | AQG98 |
| | AGQ159 | SEQ ID NO: 13 | AQG174 |
| | AQG162 | SEQ ID NO: 19 | AQG657 |
| SEQ ID NO: 28 | AN2 | — | AQG84 |
| | AQG91 | SEQ ID NO: 7 | AQG108 |
| | AQG34 | SEQ ID NO: 25 | AQG83 |

TABLE 1-continued

| Gene delivered to amyE locus | Recipient strain | prsA gene in pel locus of recipient strain | Resulting strain |
|---|---|---|---|
| | AQG92 | SEQ ID NO: 1 | AQG109 |
| | AGQ159 | SEQ ID NO: 13 | AQG178 |
| | AQG162 | SEQ ID NO: 19 | AQG662 |
| SEQ ID NO: 4 | AN2 | — | AQG1 |
| | AQG91 | SEQ ID NO: 7 | AQG115 |
| | AQG34 | SEQ ID NO: 25 | AQG131 |
| | AQG92 | SEQ ID NO: 1 | AQG100 |
| | AGQ159 | SEQ ID NO: 13 | AQG175 |
| | AQG162 | SEQ ID NO: 19 | AQG672 |
| SEQ ID NO: 16 | AN2 | — | AQG587 |
| | AQG91 | SEQ ID NO: 7 | AQG610 |
| | AQG34 | SEQ ID NO: 25 | AQG588 |
| | AQG92 | SEQ ID NO: 1 | AQG590 |
| | AGQ159 | SEQ ID NO: 13 | AQG606 |
| | AQG162 | SEQ ID NO: 19 | AQG667 |
| SEQ ID NO: 22 | AN2 | — | AQG575 |
| | AQG91 | SEQ ID NO: 7 | AQG570 |
| | AQG34 | SEQ ID NO: 25 | AQG567 | used the BioLector® microfermentation system that contains a temperature and humidity controlled incubation chamber and monitors common fermentation parameters online. Cultivations were carried out in biological triplicates for 24 hours, after which the supernatant was harvested for subsequent amylase activity measurements as described above. Table 2 shows amylase activities measured in supernatants from each series of strains co-expressing a specific amylase and the various heterologous prsA genes as described in Example 3. Values in each series are set relative to the strain which express the amylase from the amyE locus but which do not co-express any PrsA from the pel locus.

The table reveals that the highest amylase activities in the far majority of cases were obtained when the heterologous amylase was co-expressed with its cognate PrsA in *B. subtilis*. Other than cognate combinations of amylase and prsA genes that resulted in increased amylase activity were also observed, but none of these were superior to a cognate pair (Table 2).

TABLE 2

Relative extracellular amylase activity in growth medium of *B. subtilis* 168 ΔsigF co-expressing heterologous amylases and heterologous prsA genes. Values are calculated as the mean of at least triplicate determinations, normalized to the level of amylase activity in the strain expressing each amylase with no added prsA gene. (*The development of biomass in cultures was monitored on-line and all grew alike except those expressing PrsA from *B*. sp. NSP9.1. These cultures ended up with optical densities approximately 40% lower than the cultures expressing another PrsA (most likely due to increased cell lysis in the stationary phase). However, the level of amylase activity was still comparable to other cultures indicating that the *B*. sp. NSP9.1 PrsA may be particularly good at supporting amylase secretion as compared to the other expressed homologs.)

| Origin of heterologous amyE homologue inserted into the amyE locus | None (only wild type prsA gene) | *B. subtilis* PrsA | *B. licheniformis* PrsA | *B. amyloliquefaciens* PrsA | *B. sonorensis* L12 PrsA | *B.* sp. NSP9.1 PrsA |
|---|---|---|---|---|---|---|
| *B. subtilis* (amyE) | 1 ± 0.09 | 1.25 ± 0.11 | 0.91 ± 0.06 | 1.18 ± 0.13 | 0.84 ± 0.07 | 0.56 ± 0.16 |
| *B. licheniformis* (amyL) | 1 ± 0.08 | 1.20 ± 0.15 | 1.40 ± 0.08 | 1.48 ± 0.06 | 1.46 ± 0.10 | 1.06 ± 0.17 |
| *B. amyloliquefaciens* (amyQ) | 1 ± 0.08 | 1.18 ± 0.13 | 1.27 ± 0.18 | 1.19 ± 0.05 | 0.94 ± 0.007 | 0.89 ± 0.02 |
| *B. sonorensis* L12 | 1 ± 0.1 | 0.95 ± 0.28 | 2.35 ± 0.41 | 2.07 ± 0.25 | 2.54 ± 0.19 | 1.94 ± 0.44 |
| *B.* sp. NSP9.1* | 1 ± 0.17 | 1.12 ± 0.26 | 1.77 ± 0.15 | 1.64 ± 0.16 | 1.26 ± 0.13 | 1.50 ± 0.10 |

TABLE 1-continued

| Gene delivered to amyE locus | Recipient strain | prsA gene in pel locus of recipient strain | Resulting strain |
|---|---|---|---|
| | AQG92 | SEQ ID NO: 1 | AQG572 |
| | AGQ159 | SEQ ID NO: 13 | AQG586 |
| | AQG162 | SEQ ID NO: 19 | AQG661 |

Example 4. Alpha-Amylase Expression in Batch Cultures with *B. subtilis* Strains Described in Example 3

The *B. subtilis* strains constructed in Example 3 were tested with respect to alpha-amylase productivity in batch cultivations as described above. For batch cultivations we

Figure 3:
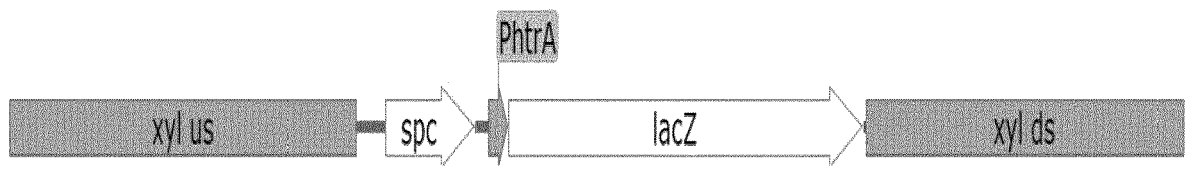
FIG. 3 shows a schematic view of a DNA construct used for integration of the $P_{htrA}$-lacZ cassette in the xyl locus of *B. subtilis*.

Example 5. Construction of a $P_{htrA}$-lacZ Expression Cassette for Use as an Indicator for Secretion Stress As an indicator for secretion stress imposed by amylase production on the *B. subtilis* strains described in the previous Examples, we employed a promoter fusion between the secretion stress-inducible htrA promoter ($P_{htrA}$) and the lacZ gene. A LacZ expression cassette under the control of the htrA promoter and targeting the xyl locus was assembled by SOE PCR using the following synthetic DNA components: 5' xyl region+a spc gene (conferring resistance to spectinomycin)+the native *B. subtilis* htrA promoter+the lacZ gene+ 3' xyl region. The purified PCR products were used in a subsequent PCR reaction to create a single linear DNA by the SOE method described in Example 2. A schematic view of the linear DNA product used for integration of the $P_{htrA}$-lacZ cassette into the xyl locus of *B. subtilis* is shown in FIG. 3 and the DNA sequence is listed in SEQ ID NO: 35.

Example 6. Integration of the $P_{htrA}$-lacZ Expression Cassette in AQG77, AQG97, AGQ98, AQG126, AQG174 and AQG657 Resulting in Strains AN2370 and AN2372

The SOE product described in Example 5 was used directly for transformation of the *B. subtilis* strains AQG77, AQG97, AGQ98, AQG126, AQG174 and AQG657 resulting in strains AN2370, AN2372, AN2368, AN2376, AN2373, and AN2377. Chromosomal integration was facilitated by homologous recombination and cells wherein double crossover events occurred were selected for on LB agar plates containing 120 µg/ml spectinomycin.

| Strain | prsA gene in pel locus | Amylase gene in amyE locus | xyl locus |
|---|---|---|---|
| AN2370 | — | SEQ ID NO: 10 | $P_{htrA}$-lacZ |
| AN2372 | SEQ ID NO: 7 | SEQ ID NO: 10 | $P_{htrA}$-lacZ |
| AN2368 | SEQ ID NO: 1 | SEQ ID NO: 10 | $P_{htrA}$-lacZ |
| AN2376 | SEQ ID NO: 25 | SEQ ID NO: 10 | $P_{htrA}$-lacZ |
| AN2373 | SEQ ID NO: 13 | SEQ ID NO: 10 | $P_{htrA}$-lacZ |
| AN2377 | SEQ ID NO: 19 | SEQ ID NO: 10 | $P_{htrA}$-lacZ |

Example 7. Beta-Galactosidase Expression in Batch Cultures with *B. subtilis* AN2370 and AN2372

The *B. subtilis* strains constructed in Example 6 were tested with respect to beta-galactosidase productivity in batch cultivations. Cultivations were carried out in biological triplicates for 24 hours, after which the supernatant was harvested for subsequent beta-galactosidase activity measurements as described above. The table below lists the beta-galactosidase activities measured in 24 hours old cultures of *B. subtilis* AN2370, AN2372, AN2368, AN2376, AN2373, and AN2377. The table reveals that co-expression of a heterologous polypeptide of interest with a cognate foldase not only results in increased alpha-amylase activity but also leads to a significant decrease in activity of the htrA promoter. Thus, co-expression of *B. licheniformis* PrsA provides the highest degree of alleviation of secretion stress in the AmyL-producing AN2 derivative AN2372 described in Example 6.

In conclusion, co-expression of a heterologous polypeptide with a cognate PrsA reduces secretion stress compared to co-expression of same heterologous polypeptide with a non-cognate PrsA.

| Strain | Specific beta-galactosidase activity (Miller units) | Amylase activity (normalized to WT) |
|---|---|---|
| AN2370 = WT (no extra PrsA) | 69.7 ± 5.9 | 1 ± 0.08 |
| AN2372 = *B. licheniformis* PrsA | 55.7 ± 4.2 | 1.40 ± 0.08 |
| AN2368 = *B. amyloliquefaciens* PrsA | 64.7 ± 2.4 | 1.48 ± 0.06 |
| AN2376 = *B. subtilis* PrsA | 77.1 ± 3.1 | 1.20 ± 0.15 |
| AN2373 = *B.* sp. NSP9.1 PrsA | 64.3 ± 1.9 | 1.06 ± 0.17 |
| AN2377 = *B. sonorensis* L12 PrsA | 60.7 ± 5.1 | 1.46 ± 0.10 |

The invention claimed is:

1. A Gram-positive host cell comprising in its genome:
1) a nucleic acid construct; and/or
2) an expression vector comprising said nucleic acid construct;
wherein the nucleic acid construct comprises:
a) a first heterologous promoter operably linked to at least one polynucleotide encoding a foldase; and
b) a second heterologous promotor operably linked to at least one polynucleotide encoding a polypeptide of interest;
wherein the foldase has a sequence identity of at least 80% to SED ID NO: 3, and the polypeptide of interest is from *Bacillus amyloliquefaciens,*
wherein the foldase has a sequence identity of at least 80% to SED ID NO: 9, and the polypeptide of interest is from *Bacillus licheniformis,*
wherein the foldase has a sequence identity of at least 80% to SED ID NO: 15, and the polypeptide of interest is from *Bacillus* sp. NSP9.1,
wherein the foldase has a sequence identity of at least 80% to SED ID NO: 21, and the polypeptide of interest is from *Bacillus sonorensis* L12, or
wherein the foldase has a sequence identity of at least 80% to SED ID NO: 27, and the polypeptide of interest is from *Bacillus subtilis;*
wherein the foldase is cognant to the polypeptide of interest; and
wherein the host cell has improved yield of the polypeptide of interest and/or reduced secretion stress when compared to the same host cell having co-expression of the same heterologous polypeptide of interest with a non-cognate foldase.

2. The Gram-positive host cell according to claim 1, wherein the host cell is a *Bacillus* host cell.

3. The Gram-positive host cell according to claim 2, wherein the host cell is selected from the group consisting of *B. amyloliquefaciens, B. licheniformis, B.* sp. NSP9.1, *B. sonorensis* L12, and *B. subtilis.*

4. A method for producing a polypeptide of interest, the method comprising:
I) providing a Gram-positive host cell according to claim 1,
wherein the foldase and the polypeptide of interest are from the same *Bacillus* species and are heterologous to the Gram-positive host cell;
II) cultivating said host cell under conditions conducive for expression of the foldase and the polypeptide of interest; and
III) recovering the polypeptide of interest.

5. The method according to claim 4, wherein the Gram-positive host cell is a *Bacillus* host cell.

6. The method according to claim 5, wherein the *Bacillus* host cell is selected from the group consisting of *B. amyloliquefaciens, B. licheniformis, B.* sp. NSP9.1, *B. sonorensis* L12, and *B. subtilis.*

7. The method according to claim 4, wherein the polypeptide of interest is an enzyme.

8. The method according to claim 7, wherein the enzyme is selected from the group consisting of an aminopeptidase, amylase, carbohydrase, carboxypeptidase, catalase, cellobiohydrolase, cellulase, chitinase, cutinase, cyclodextrin glycosyltransferase, deoxyribonuclease, endoglucanase, esterase, alpha-galactosidase, beta-galactosidase, glucoamylase, alpha-glucosidase, beta-glucosidase, invertase, laccase, lipase, mannosidase, mutanase, nuclease, oxidase, pectinolytic enzyme, peroxidase, phosphodiesterase, phytase, polyphenoloxidase, proteolytic enzyme, ribonuclease, transglutaminase, xylanase, and beta-xylosidase.

9. The method according to claim 4, wherein the secretion stress experienced by the Gram-positive host cell is reduced.

10. The method according to claim 9, wherein the secretion stress is reduced by at least 10%.

11. The method according to claim 7, wherein the enzyme is an amylase.

12. The host cell of claim 1, wherein the first heterologous promotor and the second heterologous promoter are identical copies of the same heterologous promoter.

13. The host cell of claim 1, wherein the polypeptide of interest comprises an enzyme.

14. The host cell of claim 1, wherein the enzyme is selected from the group consisting of aminopeptidase, amylase, carbohydrase, carboxypeptidase, catalase, cellobiohydrolase, cellulase, chitinase, cutinase, cyclodextrin glycosyltransferase, deoxyribonuclease, endoglucanase, esterase, alpha-galactosidase, beta-galactosidase, glucoamylase, alpha-glucosidase, beta-glucosidase, invertase, laccase, lipase, mannosidase, mutanase, nuclease, oxidase, pectinolytic enzyme, peroxidase, phosphodiesterase, phytase, polyphenoloxidase, proteolytic enzyme, ribonuclease, transglutaminase, xylanase, and beta-xylosidase.

15. The host cell of claim 1, wherein the enzyme is an amylase.

16. The host cell of claim 1, wherein the foldase has a sequence identity of at least 90% to SED ID NO: 3, and the polypeptide of interest is from *B. amyloliquefaciens*.

17. The host cell of claim 16, wherein the polypeptide of interest has a sequence identity of at least 90% to SEQ ID NO: 6.

18. The host cell of claim 1, wherein the foldase has a sequence identity of at least 90% to SED ID NO: 9, and the polypeptide of interest is from *B. licheniformis*.

19. The host cell of claim 18, wherein the polypeptide of interest has a sequence identity of at least 90% to SEQ ID NO: 12.

20. The host cell of claim 1, wherein the foldase has a sequence identity of at least 90% to SED ID NO: 15, and the polypeptide of interest is from *B.* sp. NSP9.1.

21. The host cell of claim 20, wherein the polypeptide of interest has a sequence identity of at least 90% to SEQ ID NO: 18.

22. The host cell of claim 1, wherein the foldase has a sequence identity of at least 90% to SED ID NO: 21, and the polypeptide of interest is from *B. sonorensis* L12.

23. The host cell of claim 22, wherein the polypeptide of interest has a sequence identity of at least 90% to SEQ ID NO: 24.

24. The host cell of claim 1, wherein the foldase has a sequence identity of at least 90% to SED ID NO: 27, and the polypeptide of interest is from *B. subtilis*.

25. The host cell of claim 24, wherein the polypeptide of interest has a sequence identity of at least 90% to SEQ ID NO: 30.

* * * * *

SEQUENCE LISTING

<160> NUMBER OF SEQ ID NOS: 35

<210> SEQ ID NO 1
<211> LENGTH: 858
<212> TYPE: DNA
<213> ORGANISM: Bacillus amyloliquefaciens
<220> FEATURE:
<221> NAME/KEY: CDS
<222> LOCATION: (1)..(855)
<220> FEATURE:
<221> NAME/KEY: sig_peptide
<222> LOCATION: (1)..(57)
<220> FEATURE:
<221> NAME/KEY: mat_peptide
<222> LOCATION: (58)..(855)

<400> SEQUENCE: 1

```
atg aag aaa atc gcg ata gca act att acg gca acg agc gtc ctc gct      48
Met Lys Lys Ile Ala Ile Ala Thr Ile Thr Ala Thr Ser Val Leu Ala
            -15                 -10                  -5 ctc agc gca tgc agc agc ggc gac aac gac gtg att gcc aag acg gat      96
Leu Ser Ala Cys Ser Ser Gly Asp Asn Asp Val Ile Ala Lys Thr Asp
        -1   1               5                  10 gcc ggc aat gtg aca aaa ggc gag ctc tac acg aac atg aaa aaa acc     144
Ala Gly Asn Val Thr Lys Gly Glu Leu Tyr Thr Asn Met Lys Lys Thr
 15                  20                  25 gcg ggc gca agt gtg ctg aca cag ctc gta caa gaa aaa gta tta gcc     192
Ala Gly Ala Ser Val Leu Thr Gln Leu Val Gln Glu Lys Val Leu Ala
 30                  35                  40                  45 aaa aaa tac aaa gta tcg gat aaa gaa att gat aac aag ctg aaa gag     240
Lys Lys Tyr Lys Val Ser Asp Lys Glu Ile Asp Asn Lys Leu Lys Glu
             50                  55                  60
```

| | | | | | | | | | | | | | | | |
|---|---|---|---|---|---|---|---|---|---|---|---|---|---|---|---|
|tac|aaa|act|cag|ctc|ggc|gac|cag|tac|agc|gcc|ctt|aaa|cag|cag|tac|
|Tyr|Lys|Thr|Gln|Leu|Gly|Asp|Gln|Tyr|Ser|Ala|Leu|Lys|Gln|Gln|Tyr|
| | |  |65| | | |70| | | |  |75| | | |

288 ggc gaa gat tac ctg aaa gat cag gtg aaa tac gaa ctg ctt gcc caa
Gly Glu Asp Tyr Leu Lys Asp Gln Val Lys Tyr Glu Leu Leu Ala Gln
     80              85              90

336 aaa gcg gcg aaa gac aac atc aaa gtc act gac tcc gac acg aaa gaa
Lys Ala Ala Lys Asp Asn Ile Lys Val Thr Asp Ser Asp Thr Lys Glu
 95             100             105

384 tat tac gac ggc tta aaa ggt aaa atc cgt gcg agc cac atc ctt gtc
Tyr Tyr Asp Gly Leu Lys Gly Lys Ile Arg Ala Ser His Ile Leu Val
110             115             120             125

432 gct gat aaa aag aca gct gac gaa gtg gag aaa aag ctg aaa aaa ggc
Ala Asp Lys Lys Thr Ala Asp Glu Val Glu Lys Lys Leu Lys Lys Gly
            130             135             140

480 gag aag ttt gaa acg ctt gcg aaa gaa tac tca act gac agc tca aaa
Glu Lys Phe Glu Thr Leu Ala Lys Glu Tyr Ser Thr Asp Ser Ser Lys
                145             150             155

528 gac aac ggc ggc gac ctt ggc tgg ttc gat aaa aaa tca atg gat gag
Asp Asn Gly Gly Asp Leu Gly Trp Phe Asp Lys Lys Ser Met Asp Glu
            160             165             170

576 aca ttc agc aaa gct gca ttc ggc ttg aaa gtc gga caa gtc agc gat
Thr Phe Ser Lys Ala Ala Phe Gly Leu Lys Val Gly Gln Val Ser Asp
    175             180             185

624 ccg gtc aaa aca aaa ttc ggt tat cat atc atc aaa aag acg gaa gaa
Pro Val Lys Thr Lys Phe Gly Tyr His Ile Ile Lys Lys Thr Glu Glu
190             195             200             205

672 cgc ggc aaa tat gat gac atg aaa aaa gaa ctg aaa gaa gaa gtt ctt
Arg Gly Lys Tyr Asp Asp Met Lys Lys Glu Leu Lys Glu Glu Val Leu
                210             215             220

720 aaa cag aag cta aac gac aac tca gct gta cag gca gcg att caa aaa
Lys Gln Lys Leu Asn Asp Asn Ser Ala Val Gln Ala Ala Ile Gln Lys
            225             230             235

768 gtc atg aag aaa gct gac gta aaa gtt gaa gac aaa gac tta aaa gac
Val Met Lys Lys Ala Asp Val Lys Val Glu Asp Lys Asp Leu Lys Asp
    240             245             250

816 acg ttt aac act tca gct tca aca tct tct gaa tct aaa taa
Thr Phe Asn Thr Ser Ala Ser Thr Ser Ser Glu Ser Lys
255             260             265

858

<210> SEQ ID NO 2
<211> LENGTH: 285
<212> TYPE: PRT
<213> ORGANISM: Bacillus amyloliquefaciens

<400> SEQUENCE: 2

Met Lys Lys Ile Ala Ile Ala Thr Ile Thr Ala Thr Ser Val Leu Ala
                -15                 -10                 -5

Leu Ser Ala Cys Ser Ser Gly Asp Asn Asp Val Ile Ala Lys Thr Asp
         -1  1               5                  10

Ala Gly Asn Val Thr Lys Gly Glu Leu Tyr Thr Asn Met Lys Lys Thr
         15                  20                  25

Ala Gly Ala Ser Val Leu Thr Gln Leu Val Gln Glu Lys Val Leu Ala
 30                  35                  40                  45

Lys Lys Tyr Lys Val Ser Asp Lys Glu Ile Asp Asn Lys Leu Lys Glu
                 50                  55                  60

Tyr Lys Thr Gln Leu Gly Asp Gln Tyr Ser Ala Leu Lys Gln Gln Tyr
                 65                  70                  75

Gly Glu Asp Tyr Leu Lys Asp Gln Val Lys Tyr Glu Leu Leu Ala Gln

-continued

```
                80              85              90
Lys Ala Ala Lys Asp Asn Ile Lys Val Thr Asp Ser Asp Thr Lys Glu
         95                 100                 105

Tyr Tyr Asp Gly Leu Lys Gly Lys Ile Arg Ala Ser His Ile Leu Val
110                 115                 120                 125

Ala Asp Lys Lys Thr Ala Asp Glu Val Glu Lys Lys Leu Lys Lys Gly
                130                 135                 140

Glu Lys Phe Glu Thr Leu Ala Lys Glu Tyr Ser Thr Asp Ser Ser Lys
        145                 150                 155

Asp Asn Gly Gly Asp Leu Gly Trp Phe Asp Lys Lys Ser Met Asp Glu
        160                 165                 170

Thr Phe Ser Lys Ala Ala Phe Gly Leu Lys Val Gly Gln Val Ser Asp
        175                 180                 185

Pro Val Lys Thr Lys Phe Gly Tyr His Ile Ile Lys Lys Thr Glu Glu
190                 195                 200                 205

Arg Gly Lys Tyr Asp Asp Met Lys Lys Glu Leu Lys Glu Val Leu
                210                 215                 220

Lys Gln Lys Leu Asn Asp Asn Ser Ala Val Gln Ala Ala Ile Gln Lys
            225                 230                 235

Val Met Lys Lys Ala Asp Val Lys Val Glu Asp Lys Asp Leu Lys Asp
            240                 245                 250

Thr Phe Asn Thr Ser Ala Ser Thr Ser Ser Glu Ser Lys
            255                 260                 265

<210> SEQ ID NO 3
<211> LENGTH: 266
<212> TYPE: PRT
<213> ORGANISM: Bacillus amyloliquefaciens

<400> SEQUENCE: 3

Cys Ser Ser Gly Asp Asn Asp Val Ile Ala Lys Thr Asp Ala Gly Asn
1               5                  10                 15

Val Thr Lys Gly Glu Leu Tyr Thr Asn Met Lys Lys Thr Ala Gly Ala
            20                  25                  30

Ser Val Leu Thr Gln Leu Val Gln Glu Lys Val Leu Ala Lys Lys Tyr
            35                  40                  45

Lys Val Ser Asp Lys Glu Ile Asp Asn Lys Leu Lys Glu Tyr Lys Thr
        50                  55                  60

Gln Leu Gly Asp Gln Tyr Ser Ala Leu Lys Gln Gln Tyr Gly Glu Asp
65              70                  75                  80

Tyr Leu Lys Asp Gln Val Lys Tyr Glu Leu Leu Ala Gln Lys Ala Ala
                85                  90                  95

Lys Asp Asn Ile Lys Val Thr Asp Ser Asp Thr Lys Glu Tyr Tyr Asp
            100                 105                 110

Gly Leu Lys Gly Lys Ile Arg Ala Ser His Ile Leu Val Ala Asp Lys
            115                 120                 125

Lys Thr Ala Asp Glu Val Glu Lys Lys Leu Lys Lys Gly Glu Lys Phe
        130                 135                 140

Glu Thr Leu Ala Lys Glu Tyr Ser Thr Asp Ser Ser Lys Asp Asn Gly
145                 150                 155                 160

Gly Asp Leu Gly Trp Phe Asp Lys Lys Ser Met Asp Glu Thr Phe Ser
                165                 170                 175

Lys Ala Ala Phe Gly Leu Lys Val Gly Gln Val Ser Asp Pro Val Lys
            180                 185                 190
```

-continued

```
Thr Lys Phe Gly Tyr His Ile Ile Lys Lys Thr Glu Glu Arg Gly Lys
            195                 200                 205

Tyr Asp Asp Met Lys Lys Glu Leu Lys Glu Glu Val Leu Lys Gln Lys
        210                 215                 220

Leu Asn Asp Asn Ser Ala Val Gln Ala Ala Ile Gln Lys Val Met Lys
225                 230                 235                 240

Lys Ala Asp Val Lys Val Glu Asp Lys Asp Leu Lys Asp Thr Phe Asn
                245                 250                 255

Thr Ser Ala Ser Thr Ser Ser Glu Ser Lys
            260                 265

<210> SEQ ID NO 4
<211> LENGTH: 1545
<212> TYPE: DNA
<213> ORGANISM: Bacillus amyloliquefaciens
<220> FEATURE:
<221> NAME/KEY: CDS
<222> LOCATION: (1)..(1542)
<220> FEATURE:
<221> NAME/KEY: sig_peptide
<222> LOCATION: (1)..(93)
<220> FEATURE:
<221> NAME/KEY: mat_peptide
<222> LOCATION: (94)..(1542)

<400> SEQUENCE: 4 atg att caa aaa cga aag cgg aca gtt tcg ttc aga ctt gtg ctt atg         48
Met Ile Gln Lys Arg Lys Arg Thr Val Ser Phe Arg Leu Val Leu Met
-30                 -25                 -20 tgc acg ctg tta ttt gtc agt ttg ccg att aca aaa aca tca gcc gta         96
Cys Thr Leu Leu Phe Val Ser Leu Pro Ile Thr Lys Thr Ser Ala Val
-15                 -10                 -5                  -1  1 aat ggc acg ctg atg cag tat ttt gaa tgg tat acg ccg aac gac ggc        144
Asn Gly Thr Leu Met Gln Tyr Phe Glu Trp Tyr Thr Pro Asn Asp Gly
                5                   10                  15 cag cat tgg aaa cga ttg cag aat gat gcg gaa cat tta tcg gat atc        192
Gln His Trp Lys Arg Leu Gln Asn Asp Ala Glu His Leu Ser Asp Ile
            20                  25                  30 gga atc act gcc gtc tgg att cct ccc gca tac aaa gga ttg agc caa        240
Gly Ile Thr Ala Val Trp Ile Pro Pro Ala Tyr Lys Gly Leu Ser Gln
        35                  40                  45 tcc gat aac gga tac gga cct tat gat ttg tat gat tta gga gaa ttc        288
Ser Asp Asn Gly Tyr Gly Pro Tyr Asp Leu Tyr Asp Leu Gly Glu Phe
50                  55                  60                  65 cag caa aaa ggg acg gtc aga acg aaa tac ggc aca aaa tca gag ctt        336
Gln Gln Lys Gly Thr Val Arg Thr Lys Tyr Gly Thr Lys Ser Glu Leu
                70                  75                  80 caa gat gcg atc ggc tca ctg cat tcc cgg aac gtc caa gta tac gga        384
Gln Asp Ala Ile Gly Ser Leu His Ser Arg Asn Val Gln Val Tyr Gly
            85                  90                  95 gat gtg gtt ttg aat cat aag gct ggt gct gat gca aca gaa gat gta        432
Asp Val Val Leu Asn His Lys Ala Gly Ala Asp Ala Thr Glu Asp Val
        100                 105                 110 act gcc gtc gaa gtc aat ccg gcc aat aga aat cag gaa act tcg gag        480
Thr Ala Val Glu Val Asn Pro Ala Asn Arg Asn Gln Glu Thr Ser Glu
115                 120                 125 gaa tat caa atc aaa gcg tgg acg gat ttt cgt ttt ccg ggc cgt gga        528
Glu Tyr Gln Ile Lys Ala Trp Thr Asp Phe Arg Phe Pro Gly Arg Gly
130                 135                 140                 145 aac acg tac agt gat ttt aaa tgg cat tgg tat cat ttc gac gga gcg        576
Asn Thr Tyr Ser Asp Phe Lys Trp His Trp Tyr His Phe Asp Gly Ala
                150                 155                 160
```

```
gac tgg gat gaa tcc cgg aag atc agc cgc atc ttt aag ttt cgt ggg      624
Asp Trp Asp Glu Ser Arg Lys Ile Ser Arg Ile Phe Lys Phe Arg Gly
            165                 170                 175 gaa gga aaa gcg tgg gat tgg gaa gta tca agt gaa aac ggc aac tat      672
Glu Gly Lys Ala Trp Asp Trp Glu Val Ser Ser Glu Asn Gly Asn Tyr
        180                 185                 190 gac tat tta atg tat gct gat gtt gac tac gac cac cct gat gtc gtg      720
Asp Tyr Leu Met Tyr Ala Asp Val Asp Tyr Asp His Pro Asp Val Val
        195                 200                 205 gca gag aca aaa aaa tgg ggt atc tgg tat gcg aat gaa ctg tca tta      768
Ala Glu Thr Lys Lys Trp Gly Ile Trp Tyr Ala Asn Glu Leu Ser Leu
210                 215                 220                 225 gac ggc ttc cgt att gat gcc gcc aaa cat att aaa ttt tca ttt ctg      816
Asp Gly Phe Arg Ile Asp Ala Ala Lys His Ile Lys Phe Ser Phe Leu
                230                 235                 240 cgt gat tgg gtt cag gcg gtc aga cag gcg acg gga aaa gaa atg ttt      864
Arg Asp Trp Val Gln Ala Val Arg Gln Ala Thr Gly Lys Glu Met Phe
                245                 250                 255 acg gtt gcg gag tat tgg cag aat aat gcc ggg aaa ctc gaa aac tac      912
Thr Val Ala Glu Tyr Trp Gln Asn Asn Ala Gly Lys Leu Glu Asn Tyr
            260                 265                 270 ttg aat aaa aca agc ttt aat caa tcc gtg ttt gat gtt ccg ctt cat      960
Leu Asn Lys Thr Ser Phe Asn Gln Ser Val Phe Asp Val Pro Leu His
        275                 280                 285 ttc aat tta cag gcg gct tcc tca caa gga ggc gga tat gat atg agg     1008
Phe Asn Leu Gln Ala Ala Ser Ser Gln Gly Gly Gly Tyr Asp Met Arg
290                 295                 300                 305 cgt ttg ctg gac ggt acc gtt gtg tcc agg cat ccg gaa aag gcg gtt     1056
Arg Leu Leu Asp Gly Thr Val Val Ser Arg His Pro Glu Lys Ala Val
                310                 315                 320 aca ttt gtt gaa aat cat gac aca cag ccg gga cag tca ttg gaa tcg     1104
Thr Phe Val Glu Asn His Asp Thr Gln Pro Gly Gln Ser Leu Glu Ser
                325                 330                 335 aca gtc caa act tgg ttt aaa ccg ctt gca tac gcc ttt att ttg aca     1152
Thr Val Gln Thr Trp Phe Lys Pro Leu Ala Tyr Ala Phe Ile Leu Thr
            340                 345                 350 aga gaa tcc ggt tat cct cag gtg ttc tat ggg gat atg tac ggg aca     1200
Arg Glu Ser Gly Tyr Pro Gln Val Phe Tyr Gly Asp Met Tyr Gly Thr
        355                 360                 365 aaa ggg aca tcg cca aag gaa att ccc tca ctg aaa gat aat ata gag     1248
Lys Gly Thr Ser Pro Lys Glu Ile Pro Ser Leu Lys Asp Asn Ile Glu
370                 375                 380                 385 ccg att tta aaa gcg cgt aag gag tac gca tac ggg ccc cag cac gat     1296
Pro Ile Leu Lys Ala Arg Lys Glu Tyr Ala Tyr Gly Pro Gln His Asp
                390                 395                 400 tat att gac cac ccg gat gtg atc gga tgg acg agg gaa ggt gac agc     1344
Tyr Ile Asp His Pro Asp Val Ile Gly Trp Thr Arg Glu Gly Asp Ser
                405                 410                 415 tcc gcc gcc aaa tca ggt ttg gcc gct tta atc acg gac gga ccc ggc     1392
Ser Ala Ala Lys Ser Gly Leu Ala Ala Leu Ile Thr Asp Gly Pro Gly
            420                 425                 430 gga tca aag cgg atg tat gcc ggc ctg aaa aat gcc ggc gag aca tgg     1440
Gly Ser Lys Arg Met Tyr Ala Gly Leu Lys Asn Ala Gly Glu Thr Trp
        435                 440                 445 tat gac ata acg ggc aac cgt tca gat act gta aaa atc gga tct gac     1488
Tyr Asp Ile Thr Gly Asn Arg Ser Asp Thr Val Lys Ile Gly Ser Asp
450                 455                 460                 465 ggc tgg gga gag ttt cat gta aac gat ggg tcc gtc tcc att tat gtt     1536
Gly Trp Gly Glu Phe His Val Asn Asp Gly Ser Val Ser Ile Tyr Val
```

```
                        470             475             480
cag aaa taa                                                          1545
Gln Lys <210> SEQ ID NO 5
<211> LENGTH: 514
<212> TYPE: PRT
<213> ORGANISM: Bacillus amyloliquefaciens

<400> SEQUENCE: 5

Met Ile Gln Lys Arg Lys Arg Thr Val Ser Phe Arg Leu Val Leu Met
    -30                 -25                 -20

Cys Thr Leu Leu Phe Val Ser Leu Pro Ile Thr Lys Thr Ser Ala Val
-15                 -10                  -5                  -1  1

Asn Gly Thr Leu Met Gln Tyr Phe Glu Trp Tyr Thr Pro Asn Asp Gly
                 5                  10                  15

Gln His Trp Lys Arg Leu Gln Asn Asp Ala Glu His Leu Ser Asp Ile
            20                  25                  30

Gly Ile Thr Ala Val Trp Ile Pro Pro Ala Tyr Lys Gly Leu Ser Gln
        35                  40                  45

Ser Asp Asn Gly Tyr Gly Pro Tyr Asp Leu Tyr Asp Leu Gly Glu Phe
50                  55                  60                  65

Gln Gln Lys Gly Thr Val Arg Thr Lys Tyr Gly Thr Lys Ser Glu Leu
                70                  75                  80

Gln Asp Ala Ile Gly Ser Leu His Ser Arg Asn Val Gln Val Tyr Gly
            85                  90                  95

Asp Val Val Leu Asn His Lys Ala Gly Ala Asp Ala Thr Glu Asp Val
        100                 105                 110

Thr Ala Val Glu Val Asn Pro Ala Asn Arg Asn Gln Glu Thr Ser Glu
    115                 120                 125

Glu Tyr Gln Ile Lys Ala Trp Thr Asp Phe Arg Phe Pro Gly Arg Gly
130                 135                 140                 145

Asn Thr Tyr Ser Asp Phe Lys Trp His Trp Tyr His Phe Asp Gly Ala
                150                 155                 160

Asp Trp Asp Glu Ser Arg Lys Ile Ser Arg Ile Phe Lys Phe Arg Gly
            165                 170                 175

Glu Gly Lys Ala Trp Asp Trp Glu Val Ser Ser Glu Asn Gly Asn Tyr
        180                 185                 190

Asp Tyr Leu Met Tyr Ala Asp Val Asp Tyr Asp His Pro Asp Val Val
    195                 200                 205

Ala Glu Thr Lys Lys Trp Gly Ile Trp Tyr Ala Asn Glu Leu Ser Leu
210                 215                 220                 225

Asp Gly Phe Arg Ile Asp Ala Ala Lys His Ile Lys Phe Ser Phe Leu
                230                 235                 240

Arg Asp Trp Val Gln Ala Val Arg Gln Ala Thr Gly Lys Glu Met Phe
            245                 250                 255

Thr Val Ala Glu Tyr Trp Gln Asn Asn Ala Gly Lys Leu Glu Asn Tyr
        260                 265                 270

Leu Asn Lys Thr Ser Phe Asn Gln Ser Val Phe Asp Val Pro Leu His
    275                 280                 285

Phe Asn Leu Gln Ala Ala Ser Ser Gln Gly Gly Gly Tyr Asp Met Arg
290                 295                 300                 305

Arg Leu Leu Asp Gly Thr Val Val Ser Arg His Pro Glu Lys Ala Val
                310                 315                 320
```

-continued

```
Thr Phe Val Glu Asn His Asp Thr Gln Pro Gly Gln Ser Leu Glu Ser
                325                 330                 335

Thr Val Gln Thr Trp Phe Lys Pro Leu Ala Tyr Ala Phe Ile Leu Thr
        340                 345                 350

Arg Glu Ser Gly Tyr Pro Gln Val Phe Tyr Gly Asp Met Tyr Gly Thr
    355                 360                 365

Lys Gly Thr Ser Pro Lys Glu Ile Pro Ser Leu Lys Asp Asn Ile Glu
370                 375                 380                 385

Pro Ile Leu Lys Ala Arg Lys Glu Tyr Ala Tyr Gly Pro Gln His Asp
                390                 395                 400

Tyr Ile Asp His Pro Asp Val Ile Gly Trp Thr Arg Glu Gly Asp Ser
        405                 410                 415

Ser Ala Ala Lys Ser Gly Leu Ala Ala Leu Ile Thr Asp Gly Pro Gly
    420                 425                 430

Gly Ser Lys Arg Met Tyr Ala Gly Leu Lys Asn Ala Gly Glu Thr Trp
435                 440                 445

Tyr Asp Ile Thr Gly Asn Arg Ser Asp Thr Val Lys Ile Gly Ser Asp
450                 455                 460                 465

Gly Trp Gly Glu Phe His Val Asn Asp Gly Ser Val Ser Ile Tyr Val
                470                 475                 480

Gln Lys

<210> SEQ ID NO 6
<211> LENGTH: 483
<212> TYPE: PRT
<213> ORGANISM: Bacillus amyloliquefaciens

<400> SEQUENCE: 6

Val Asn Gly Thr Leu Met Gln Tyr Phe Glu Trp Tyr Thr Pro Asn Asp
1               5                   10                  15

Gly Gln His Trp Lys Arg Leu Gln Asn Asp Ala Glu His Leu Ser Asp
                20                  25                  30

Ile Gly Ile Thr Ala Val Trp Ile Pro Pro Ala Tyr Lys Gly Leu Ser
            35                  40                  45

Gln Ser Asp Asn Gly Tyr Gly Pro Tyr Asp Leu Tyr Asp Leu Gly Glu
        50                  55                  60

Phe Gln Gln Lys Gly Thr Val Arg Thr Lys Tyr Gly Thr Lys Ser Glu
65                  70                  75                  80

Leu Gln Asp Ala Ile Gly Ser Leu His Ser Arg Asn Val Gln Val Tyr
                85                  90                  95

Gly Asp Val Val Leu Asn His Lys Ala Gly Ala Asp Ala Thr Glu Asp
            100                 105                 110

Val Thr Ala Val Glu Val Asn Pro Ala Asn Arg Asn Gln Glu Thr Ser
        115                 120                 125

Glu Glu Tyr Gln Ile Lys Ala Trp Thr Asp Phe Arg Phe Pro Gly Arg
    130                 135                 140

Gly Asn Thr Tyr Ser Asp Phe Lys Trp His Trp Tyr His Phe Asp Gly
145                 150                 155                 160

Ala Asp Trp Asp Glu Ser Arg Lys Ile Ser Arg Ile Phe Lys Phe Arg
                165                 170                 175

Gly Glu Gly Lys Ala Trp Asp Trp Glu Val Ser Ser Glu Asn Gly Asn
            180                 185                 190

Tyr Asp Tyr Leu Met Tyr Ala Asp Val Asp Tyr Asp His Pro Asp Val
        195                 200                 205
```

```
Val Ala Glu Thr Lys Lys Trp Gly Ile Trp Tyr Ala Asn Glu Leu Ser
    210                 215                 220

Leu Asp Gly Phe Arg Ile Asp Ala Ala Lys His Ile Lys Phe Ser Phe
225                 230                 235                 240

Leu Arg Asp Trp Val Gln Ala Val Arg Gln Ala Thr Gly Lys Glu Met
                245                 250                 255

Phe Thr Val Ala Glu Tyr Trp Gln Asn Asn Ala Gly Lys Leu Glu Asn
            260                 265                 270

Tyr Leu Asn Lys Thr Ser Phe Asn Gln Ser Val Phe Asp Val Pro Leu
        275                 280                 285

His Phe Asn Leu Gln Ala Ala Ser Ser Gln Gly Gly Gly Tyr Asp Met
    290                 295                 300

Arg Arg Leu Leu Asp Gly Thr Val Val Ser Arg His Pro Glu Lys Ala
305                 310                 315                 320

Val Thr Phe Val Glu Asn His Asp Thr Gln Pro Gly Gln Ser Leu Glu
                325                 330                 335

Ser Thr Val Gln Thr Trp Phe Lys Pro Leu Ala Tyr Ala Phe Ile Leu
            340                 345                 350

Thr Arg Glu Ser Gly Tyr Pro Gln Val Phe Tyr Gly Asp Met Tyr Gly
        355                 360                 365

Thr Lys Gly Thr Ser Pro Lys Glu Ile Pro Ser Leu Lys Asp Asn Ile
    370                 375                 380

Glu Pro Ile Leu Lys Ala Arg Lys Glu Tyr Ala Tyr Gly Pro Gln His
385                 390                 395                 400

Asp Tyr Ile Asp His Pro Asp Val Ile Gly Trp Thr Arg Glu Gly Asp
                405                 410                 415

Ser Ser Ala Ala Lys Ser Gly Leu Ala Ala Leu Ile Thr Asp Gly Pro
            420                 425                 430

Gly Gly Ser Lys Arg Met Tyr Ala Gly Leu Lys Asn Ala Gly Glu Thr
        435                 440                 445

Trp Tyr Asp Ile Thr Gly Asn Arg Ser Asp Thr Val Lys Ile Gly Ser
    450                 455                 460

Asp Gly Trp Gly Glu Phe His Val Asn Asp Gly Ser Val Ser Ile Tyr
465                 470                 475                 480

Val Gln Lys

<210> SEQ ID NO 7
<211> LENGTH: 861
<212> TYPE: DNA
<213> ORGANISM: Bacillus licheniformis
<220> FEATURE:
<221> NAME/KEY: CDS
<222> LOCATION: (1)..(858)
<220> FEATURE:
<221> NAME/KEY: sig_peptide
<222> LOCATION: (1)..(57)
<220> FEATURE:
<221> NAME/KEY: mat_peptide
<222> LOCATION: (58)..(858)

<400> SEQUENCE: 7 atg aag aag att gca att gcg gcg att aca gcg aca agc gtg ctg gct      48
Met Lys Lys Ile Ala Ile Ala Ala Ile Thr Ala Thr Ser Val Leu Ala
            -15                 -10                  -5 ctc agc gca tgc agc ggg gga gat tct gag gtt gtt gcg gaa aca aaa      96
Leu Ser Ala Cys Ser Gly Gly Asp Ser Glu Val Val Ala Glu Thr Lys
         -1   1               5                  10 gct gga aat att aca aaa gaa gac ctt tat caa aca tta aaa gac aat     144
```

|  |  |  |  |  |  |  |  |  |  |  |  |  |  |  |  |
|---|---|---|---|---|---|---|---|---|---|---|---|---|---|---|---|
| Ala | Gly | Asn | Ile | Thr | Lys | Glu | Asp | Leu | Tyr | Gln | Thr | Leu | Lys | Asp | Asn |
|  | 15 |  |  |  | 20 |  |  |  | 25 |  |  |  |  |  |  |

```
gcc gga gcg gac gca ctg aac atg ctt gtt cag caa aaa gta ctc gat    192
Ala Gly Ala Asp Ala Leu Asn Met Leu Val Gln Gln Lys Val Leu Asp
 30          35              40              45 gat aaa tac gat gtc tcc gac aaa gaa atc gac aaa aag ctg aac gag    240
Asp Lys Tyr Asp Val Ser Asp Lys Glu Ile Asp Lys Lys Leu Asn Glu
                 50              55              60 tac aaa aaa tca atg ggt gac cag ctc aac cag ctc att gac caa aaa    288
Tyr Lys Lys Ser Met Gly Asp Gln Leu Asn Gln Leu Ile Asp Gln Lys
             65              70              75 ggc gaa gac ttc gtc aaa gaa cag atc aaa tac gaa ctt ctg atg caa    336
Gly Glu Asp Phe Val Lys Glu Gln Ile Lys Tyr Glu Leu Leu Met Gln
         80              85              90 aaa gcc gca aag gat aac ata aaa gta acc gat gat gac gta aaa gaa    384
Lys Ala Ala Lys Asp Asn Ile Lys Val Thr Asp Asp Asp Val Lys Glu
     95              100             105 tat tat gac ggc ctg aaa ggc aaa atc cac tta agc cac att ctt gtg    432
Tyr Tyr Asp Gly Leu Lys Gly Lys Ile His Leu Ser His Ile Leu Val
110             115             120             125 aaa gaa aag aaa acg gct gaa gaa gtt gag aaa aag ctg aaa aaa ggc    480
Lys Glu Lys Lys Thr Ala Glu Glu Val Glu Lys Lys Leu Lys Lys Gly
                 130             135             140 gaa aaa ttc gaa gac ctt gca aaa gag tat tca act gac ggt aca gcc    528
Glu Lys Phe Glu Asp Leu Ala Lys Glu Tyr Ser Thr Asp Gly Thr Ala
             145             150             155 gaa aaa ggc ggc gac ctc ggc tgg gtc ggc aaa gac gat aac atg gac    576
Glu Lys Gly Gly Asp Leu Gly Trp Val Gly Lys Asp Asp Asn Met Asp
         160             165             170 aag gat ttc gtc aaa gcg gca ttt gct ttg aaa acc ggc gaa atc agc    624
Lys Asp Phe Val Lys Ala Ala Phe Ala Leu Lys Thr Gly Glu Ile Ser
     175             180             185 gga cct gtg aaa tcc caa ttc ggc tat cac atc att aaa aaa gac gaa    672
Gly Pro Val Lys Ser Gln Phe Gly Tyr His Ile Ile Lys Lys Asp Glu
190             195             200             205 gaa cgc ggc aaa tat gaa gac atg aaa aaa gag ctt aaa aaa gaa gtc    720
Glu Arg Gly Lys Tyr Glu Asp Met Lys Lys Glu Leu Lys Lys Glu Val
                 210             215             220 caa gaa caa aag caa aat gat caa act gaa ctg caa tcc gtc att gac    768
Gln Glu Gln Lys Gln Asn Asp Gln Thr Glu Leu Gln Ser Val Ile Asp
             225             230             235 aaa ctt gtc aaa gat gct gat tta aaa gta aaa gac aaa gag ttg aaa    816
Lys Leu Val Lys Asp Ala Asp Leu Lys Val Lys Asp Lys Glu Leu Lys
         240             245             250 aaa caa gtc gac cag cgt caa gct cag aca agc agc agc agc tga        861
Lys Gln Val Asp Gln Arg Gln Ala Gln Thr Ser Ser Ser Ser
     255             260             265

<210> SEQ ID NO 8
<211> LENGTH: 286
<212> TYPE: PRT
<213> ORGANISM: Bacillus licheniformis

<400> SEQUENCE: 8

Met Lys Lys Ile Ala Ile Ala Ala Ile Thr Ala Thr Ser Val Leu Ala
                -15                 -10                 -5

Leu Ser Ala Cys Ser Gly Gly Asp Ser Glu Val Val Ala Glu Thr Lys
         -1   1               5                  10

Ala Gly Asn Ile Thr Lys Glu Asp Leu Tyr Gln Thr Leu Lys Asp Asn
             15              20              25
```

```
Ala Gly Ala Asp Ala Leu Asn Met Leu Val Gln Gln Lys Val Leu Asp
 30              35                  40                  45

Asp Lys Tyr Asp Val Ser Asp Lys Glu Ile Asp Lys Lys Leu Asn Glu
             50                  55                  60

Tyr Lys Lys Ser Met Gly Asp Gln Leu Asn Gln Leu Ile Asp Gln Lys
             65                  70                  75

Gly Glu Asp Phe Val Lys Glu Gln Ile Lys Tyr Glu Leu Leu Met Gln
             80                  85                  90

Lys Ala Ala Lys Asp Asn Ile Lys Val Thr Asp Asp Val Lys Glu
 95                 100                 105

Tyr Tyr Asp Gly Leu Lys Gly Lys Ile His Leu Ser His Ile Leu Val
110                 115                 120                 125

Lys Glu Lys Lys Thr Ala Glu Glu Val Glu Lys Lys Leu Lys Lys Gly
                130                 135                 140

Glu Lys Phe Glu Asp Leu Ala Lys Glu Tyr Ser Thr Asp Gly Thr Ala
            145                 150                 155

Glu Lys Gly Gly Asp Leu Gly Trp Val Gly Lys Asp Asp Asn Met Asp
            160                 165                 170

Lys Asp Phe Val Lys Ala Ala Phe Ala Leu Lys Thr Gly Glu Ile Ser
            175                 180                 185

Gly Pro Val Lys Ser Gln Phe Gly Tyr His Ile Ile Lys Lys Asp Glu
190                 195                 200                 205

Glu Arg Gly Lys Tyr Glu Asp Met Lys Lys Glu Leu Lys Lys Glu Val
            210                 215                 220

Gln Glu Gln Lys Gln Asn Asp Gln Thr Glu Leu Gln Ser Val Ile Asp
            225                 230                 235

Lys Leu Val Lys Asp Ala Asp Leu Lys Val Lys Asp Lys Glu Leu Lys
            240                 245                 250

Lys Gln Val Asp Gln Arg Gln Ala Gln Thr Ser Ser Ser Ser
            255                 260                 265

<210> SEQ ID NO 9
<211> LENGTH: 267
<212> TYPE: PRT
<213> ORGANISM: Bacillus licheniformis

<400> SEQUENCE: 9

Cys Ser Gly Gly Asp Ser Glu Val Val Ala Glu Thr Lys Ala Gly Asn
 1               5                  10                  15

Ile Thr Lys Glu Asp Leu Tyr Gln Thr Leu Lys Asp Asn Ala Gly Ala
             20                  25                  30

Asp Ala Leu Asn Met Leu Val Gln Gln Lys Val Leu Asp Asp Lys Tyr
             35                  40                  45

Asp Val Ser Asp Lys Glu Ile Asp Lys Lys Leu Asn Glu Tyr Lys Lys
 50                  55                  60

Ser Met Gly Asp Gln Leu Asn Gln Leu Ile Asp Gln Lys Gly Glu Asp
 65                  70                  75                  80

Phe Val Lys Glu Gln Ile Lys Tyr Glu Leu Leu Met Gln Lys Ala Ala
                 85                  90                  95

Lys Asp Asn Ile Lys Val Thr Asp Asp Val Lys Glu Tyr Tyr Asp
            100                 105                 110

Gly Leu Lys Gly Lys Ile His Leu Ser His Ile Leu Val Lys Glu Lys
            115                 120                 125

Lys Thr Ala Glu Glu Val Glu Lys Lys Leu Lys Lys Gly Glu Lys Phe
```

```
                130                 135                 140
Glu Asp Leu Ala Lys Glu Tyr Ser Thr Asp Gly Thr Ala Glu Lys Gly
145                 150                 155                 160

Gly Asp Leu Gly Trp Val Gly Lys Asp Asp Asn Met Asp Lys Asp Phe
                165                 170                 175

Val Lys Ala Ala Phe Ala Leu Lys Thr Gly Glu Ile Ser Gly Pro Val
            180                 185                 190

Lys Ser Gln Phe Gly Tyr His Ile Ile Lys Lys Asp Glu Glu Arg Gly
                195                 200                 205

Lys Tyr Glu Asp Met Lys Lys Glu Leu Lys Lys Glu Val Gln Glu Gln
            210                 215                 220

Lys Gln Asn Asp Gln Thr Glu Leu Gln Ser Val Ile Asp Lys Leu Val
225                 230                 235                 240

Lys Asp Ala Asp Leu Lys Val Lys Asp Lys Glu Leu Lys Lys Gln Val
                245                 250                 255

Asp Gln Arg Gln Ala Gln Thr Ser Ser Ser Ser
                260                 265

<210> SEQ ID NO 10
<211> LENGTH: 1539
<212> TYPE: DNA
<213> ORGANISM: Bacillus licheniformis
<220> FEATURE:
<221> NAME/KEY: CDS
<222> LOCATION: (1)..(1536)
<220> FEATURE:
<221> NAME/KEY: sig_peptide
<222> LOCATION: (1)..(87)
<220> FEATURE:
<221> NAME/KEY: mat_peptide
<222> LOCATION: (88)..(1536)

<400> SEQUENCE: 10 atg aaa caa caa aaa cgg ctt tac gcc cga ttg ctg acg ctg tta ttt       48
Met Lys Gln Gln Lys Arg Leu Tyr Ala Arg Leu Leu Thr Leu Leu Phe
                -25                 -20                 -15 gcg ctc atc ttc ttg ctg cct cat tct gca gca gcg gca aat ctt           96
Ala Leu Ile Phe Leu Leu Pro His Ser Ala Ala Ala Ala Asn Leu
        -10                 -5              -1  1 aat ggg acg ctg atg cag tat ttt gaa tgg tac atg ccc aat gac ggc      144
Asn Gly Thr Leu Met Gln Tyr Phe Glu Trp Tyr Met Pro Asn Asp Gly
        5                   10                  15 caa cat tgg agg cgt ttg caa aac gac tcg gca tat ttg gct gaa cac      192
Gln His Trp Arg Arg Leu Gln Asn Asp Ser Ala Tyr Leu Ala Glu His
 20                 25                  30                  35 ggt att act gcc gtc tgg atc ccc ccg gca tat aag gga acg agc caa      240
Gly Ile Thr Ala Val Trp Ile Pro Pro Ala Tyr Lys Gly Thr Ser Gln
                40                  45                  50 gcg gat gtg ggc tac ggt gct tac gac ctt tat gat tta ggg gag ttt      288
Ala Asp Val Gly Tyr Gly Ala Tyr Asp Leu Tyr Asp Leu Gly Glu Phe
            55                  60                  65 cat caa aaa ggg acg gtt cgg aca aag tac ggc aca aaa gga gag ctg      336
His Gln Lys Gly Thr Val Arg Thr Lys Tyr Gly Thr Lys Gly Glu Leu
        70                  75                  80 caa tct gcg atc aaa agt ctt cat tcc cgc gac att aac gtt tac ggg      384
Gln Ser Ala Ile Lys Ser Leu His Ser Arg Asp Ile Asn Val Tyr Gly
    85                  90                  95 gat gtg gtc atc aac cac aaa ggc ggc gct gat gcg acc gaa gat gta      432
Asp Val Val Ile Asn His Lys Gly Gly Ala Asp Ala Thr Glu Asp Val
100                 105                 110                 115
```

-continued

| | | |
|---|---|---|
| acc gcg gtt gaa gtc gat ccc act gac cgc aac cgc gta att tca gga<br>Thr Ala Val Glu Val Asp Pro Thr Asp Arg Asn Arg Val Ile Ser Gly<br>          120                   125                  130 | 480 |
| gaa cac cta att aaa gcc tgg aca cat ttt cat ttt ccg ggg cgc ggc<br>Glu His Leu Ile Lys Ala Trp Thr His Phe His Phe Pro Gly Arg Gly<br>               135                 140               145 | 528 |
| agc aca tac agc gat ttt aaa tgg cat tgg tac cat ttt gac gga acc<br>Ser Thr Tyr Ser Asp Phe Lys Trp His Trp Tyr His Phe Asp Gly Thr<br>         150                   155                 160 | 576 |
| gat tgg gac gag tcc cga aag ctg aac cgc atc tat aag ttt caa gga<br>Asp Trp Asp Glu Ser Arg Lys Leu Asn Arg Ile Tyr Lys Phe Gln Gly<br>165                   170                 175 | 624 |
| aag gct tgg gat tgg gaa gtt tcc aat gaa aac ggc aac tat gat tat<br>Lys Ala Trp Asp Trp Glu Val Ser Asn Glu Asn Gly Asn Tyr Asp Tyr<br>180                   185               190               195 | 672 |
| ttg atg tat gcc gac atc gat tat gac cat cct gat gtc gca gca gaa<br>Leu Met Tyr Ala Asp Ile Asp Tyr Asp His Pro Asp Val Ala Ala Glu<br>         200                         205               210 | 720 |
| att aag aga tgg ggc act tgg tat gcc aat gaa ctg caa ttg gac ggt<br>Ile Lys Arg Trp Gly Thr Trp Tyr Ala Asn Glu Leu Gln Leu Asp Gly<br>               215                 220               225 | 768 |
| ttc cgt ctt gat gct gtc aaa cac att aaa ttt tct ttt ttg cgg gat<br>Phe Arg Leu Asp Ala Val Lys His Ile Lys Phe Ser Phe Leu Arg Asp<br>        230                   235                 240 | 816 |
| tgg gtt aat cat gtc agg gaa aaa acg ggg aag gaa atg ttt acg gta<br>Trp Val Asn His Val Arg Glu Lys Thr Gly Lys Glu Met Phe Thr Val<br>245                   250                 255 | 864 |
| gct gaa tat tgg cag aat gac ttg ggc gcg ctg gaa aac tat ttg aac<br>Ala Glu Tyr Trp Gln Asn Asp Leu Gly Ala Leu Glu Asn Tyr Leu Asn<br>260                   265               270               275 | 912 |
| aaa aca aat ttt aat cat tca gtg ttt gac gtg ccg ctt cat tat cag<br>Lys Thr Asn Phe Asn His Ser Val Phe Asp Val Pro Leu His Tyr Gln<br>         280                         285               290 | 960 |
| ttc cat gct gca tcg aca cag gga ggc ggc tat gat atg agg aaa ttg<br>Phe His Ala Ala Ser Thr Gln Gly Gly Gly Tyr Asp Met Arg Lys Leu<br>               295                 300               305 | 1008 |
| ctg aac ggt acg gtc gtt tcc aag cat ccg ttg aaa tcg gtt aca ttt<br>Leu Asn Gly Thr Val Val Ser Lys His Pro Leu Lys Ser Val Thr Phe<br>310                   315                 320 | 1056 |
| gtc gat aac cat gat aca cag ccg ggg caa tcg ctt gag tcg act gtc<br>Val Asp Asn His Asp Thr Gln Pro Gly Gln Ser Leu Glu Ser Thr Val<br>         325                         330               335 | 1104 |
| caa aca tgg ttt aag ccg ctt gct tac gct ttt att ctc aca agg gaa<br>Gln Thr Trp Phe Lys Pro Leu Ala Tyr Ala Phe Ile Leu Thr Arg Glu<br>340                   345               350               355 | 1152 |
| tct gga tac cct cag gtt ttc tac ggg gat atg tac ggg acg aaa gga<br>Ser Gly Tyr Pro Gln Val Phe Tyr Gly Asp Met Tyr Gly Thr Lys Gly<br>                   360                 365               370 | 1200 |
| gac tcc cag cgc gaa att cct gcc ttg aaa cac aaa att gaa ccg atc<br>Asp Ser Gln Arg Glu Ile Pro Ala Leu Lys His Lys Ile Glu Pro Ile<br>               375                 380               385 | 1248 |
| tta aaa gcg aga aaa cag tat gcg tac gga gca cag cat gat tat ttc<br>Leu Lys Ala Arg Lys Gln Tyr Ala Tyr Gly Ala Gln His Asp Tyr Phe<br>390                   395               400 | 1296 |
| gac cac cat gac att gtc ggc tgg aca agg gaa ggc gac agc tcg gtt<br>Asp His His Asp Ile Val Gly Trp Thr Arg Glu Gly Asp Ser Ser Val<br>         405                         410               415 | 1344 |
| gca aat tca ggt ttg gcg gca tta ata aca gac gga ccc ggt ggg gca<br>Ala Asn Ser Gly Leu Ala Ala Leu Ile Thr Asp Gly Pro Gly Gly Ala<br>420                   425               430               435 | 1392 |

-continued

```
aag cga atg tat gtc ggc cgg caa aac gcc ggt gag aca tgg cat gac     1440
Lys Arg Met Tyr Val Gly Arg Gln Asn Ala Gly Glu Thr Trp His Asp
            440                 445                 450 att acc gga aac cgt tcg gag ccg gtt gtc atc aat tcg gaa ggc tgg     1488
Ile Thr Gly Asn Arg Ser Glu Pro Val Val Ile Asn Ser Glu Gly Trp
        455                 460                 465 gga gag ttt cac gta aac ggc ggg tcg gtt tca att tat gtt caa aga     1536
Gly Glu Phe His Val Asn Gly Gly Ser Val Ser Ile Tyr Val Gln Arg
    470                 475                 480 tag                                                                  1539

<210> SEQ ID NO 11
<211> LENGTH: 512
<212> TYPE: PRT
<213> ORGANISM: Bacillus licheniformis

<400> SEQUENCE: 11

Met Lys Gln Gln Lys Arg Leu Tyr Ala Arg Leu Leu Thr Leu Leu Phe
                -25                 -20                 -15

Ala Leu Ile Phe Leu Leu Pro His Ser Ala Ala Ala Ala Asn Leu
            -10                  -5              -1   1

Asn Gly Thr Leu Met Gln Tyr Phe Glu Trp Tyr Met Pro Asn Asp Gly
  5                  10                  15

Gln His Trp Arg Arg Leu Gln Asn Asp Ser Ala Tyr Leu Ala Glu His
20                  25                  30                  35

Gly Ile Thr Ala Val Trp Ile Pro Pro Ala Tyr Lys Gly Thr Ser Gln
                40                  45                  50

Ala Asp Val Gly Tyr Gly Ala Tyr Asp Leu Tyr Asp Leu Gly Glu Phe
            55                  60                  65

His Gln Lys Gly Thr Val Arg Thr Lys Tyr Gly Thr Lys Gly Glu Leu
        70                  75                  80

Gln Ser Ala Ile Lys Ser Leu His Ser Arg Asp Ile Asn Val Tyr Gly
    85                  90                  95

Asp Val Val Ile Asn His Lys Gly Gly Ala Asp Ala Thr Glu Asp Val
100                 105                 110                 115

Thr Ala Val Glu Val Asp Pro Thr Asp Arg Asn Arg Val Ile Ser Gly
                120                 125                 130

Glu His Leu Ile Lys Ala Trp Thr His Phe His Phe Pro Gly Arg Gly
            135                 140                 145

Ser Thr Tyr Ser Asp Phe Lys Trp His Trp Tyr His Phe Asp Gly Thr
        150                 155                 160

Asp Trp Asp Glu Ser Arg Lys Leu Asn Arg Ile Tyr Lys Phe Gln Gly
    165                 170                 175

Lys Ala Trp Asp Trp Glu Val Ser Asn Glu Asn Gly Asn Tyr Asp Tyr
180                 185                 190                 195

Leu Met Tyr Ala Asp Ile Asp Tyr Asp His Pro Asp Val Ala Ala Glu
                200                 205                 210

Ile Lys Arg Trp Gly Thr Trp Tyr Ala Asn Glu Leu Gln Leu Asp Gly
            215                 220                 225

Phe Arg Leu Asp Ala Val Lys His Ile Lys Phe Ser Phe Leu Arg Asp
        230                 235                 240

Trp Val Asn His Val Arg Glu Lys Thr Gly Lys Glu Met Phe Thr Val
    245                 250                 255

Ala Glu Tyr Trp Gln Asn Asp Leu Gly Ala Leu Glu Asn Tyr Leu Asn
260                 265                 270                 275
```

```
Lys Thr Asn Phe Asn His Ser Val Phe Asp Val Pro Leu His Tyr Gln
                280                 285                 290

Phe His Ala Ala Ser Thr Gln Gly Gly Gly Tyr Asp Met Arg Lys Leu
                295                 300                 305

Leu Asn Gly Thr Val Val Ser Lys His Pro Leu Lys Ser Val Thr Phe
                310                 315                 320

Val Asp Asn His Asp Thr Gln Pro Gly Gln Ser Leu Glu Ser Thr Val
                325                 330                 335

Gln Thr Trp Phe Lys Pro Leu Ala Tyr Ala Phe Ile Leu Thr Arg Glu
340                 345                 350                 355

Ser Gly Tyr Pro Gln Val Phe Tyr Gly Asp Met Tyr Gly Thr Lys Gly
                360                 365                 370

Asp Ser Gln Arg Glu Ile Pro Ala Leu Lys His Lys Ile Glu Pro Ile
                375                 380                 385

Leu Lys Ala Arg Lys Gln Tyr Ala Tyr Gly Ala Gln His Asp Tyr Phe
                390                 395                 400

Asp His His Asp Ile Val Gly Trp Thr Arg Glu Gly Asp Ser Ser Val
                405                 410                 415

Ala Asn Ser Gly Leu Ala Ala Leu Ile Thr Asp Gly Pro Gly Gly Ala
420                 425                 430                 435

Lys Arg Met Tyr Val Gly Arg Gln Asn Ala Gly Glu Thr Trp His Asp
                440                 445                 450

Ile Thr Gly Asn Arg Ser Glu Pro Val Val Ile Asn Ser Glu Gly Trp
                455                 460                 465

Gly Glu Phe His Val Asn Gly Gly Ser Val Ser Ile Tyr Val Gln Arg
                470                 475                 480

<210> SEQ ID NO 12
<211> LENGTH: 483
<212> TYPE: PRT
<213> ORGANISM: Bacillus licheniformis

<400> SEQUENCE: 12

Ala Asn Leu Asn Gly Thr Leu Met Gln Tyr Phe Glu Trp Tyr Met Pro
1               5                   10                  15

Asn Asp Gly Gln His Trp Arg Arg Leu Gln Asn Asp Ser Ala Tyr Leu
                20                  25                  30

Ala Glu His Gly Ile Thr Ala Val Trp Ile Pro Pro Ala Tyr Lys Gly
                35                  40                  45

Thr Ser Gln Ala Asp Val Gly Tyr Gly Ala Tyr Asp Leu Tyr Asp Leu
            50                  55                  60

Gly Glu Phe His Gln Lys Gly Thr Val Arg Thr Lys Tyr Gly Thr Lys
65                  70                  75                  80

Gly Glu Leu Gln Ser Ala Ile Lys Ser Leu His Ser Arg Asp Ile Asn
                85                  90                  95

Val Tyr Gly Asp Val Val Ile Asn His Lys Gly Gly Ala Asp Ala Thr
                100                 105                 110

Glu Asp Val Thr Ala Val Glu Val Asp Pro Thr Asp Arg Asn Arg Val
                115                 120                 125

Ile Ser Gly Glu His Leu Ile Lys Ala Trp Thr His Phe His Phe Pro
                130                 135                 140

Gly Arg Gly Ser Thr Tyr Ser Asp Phe Lys Trp His Trp Tyr His Phe
145                 150                 155                 160

Asp Gly Thr Asp Trp Asp Glu Ser Arg Lys Leu Asn Arg Ile Tyr Lys
```

```
                    165                 170                 175
Phe Gln Gly Lys Ala Trp Asp Trp Glu Val Ser Asn Glu Asn Gly Asn
            180                 185                 190

Tyr Asp Tyr Leu Met Tyr Ala Asp Ile Asp Tyr Asp His Pro Asp Val
        195                 200                 205

Ala Ala Glu Ile Lys Arg Trp Gly Thr Trp Tyr Ala Asn Glu Leu Gln
    210                 215                 220

Leu Asp Gly Phe Arg Leu Asp Ala Val Lys His Ile Lys Phe Ser Phe
225                 230                 235                 240

Leu Arg Asp Trp Val Asn His Val Arg Glu Lys Thr Gly Lys Glu Met
                245                 250                 255

Phe Thr Val Ala Glu Tyr Trp Gln Asn Asp Leu Gly Ala Leu Glu Asn
            260                 265                 270

Tyr Leu Asn Lys Thr Asn Phe Asn His Ser Val Phe Asp Val Pro Leu
        275                 280                 285

His Tyr Gln Phe His Ala Ala Ser Thr Gln Gly Gly Gly Tyr Asp Met
    290                 295                 300

Arg Lys Leu Leu Asn Gly Thr Val Val Ser Lys His Pro Leu Lys Ser
305                 310                 315                 320

Val Thr Phe Val Asp Asn His Asp Thr Gln Pro Gly Gln Ser Leu Glu
                325                 330                 335

Ser Thr Val Gln Thr Trp Phe Lys Pro Leu Ala Tyr Ala Phe Ile Leu
            340                 345                 350

Thr Arg Glu Ser Gly Tyr Pro Gln Val Phe Tyr Gly Asp Met Tyr Gly
        355                 360                 365

Thr Lys Gly Asp Ser Gln Arg Glu Ile Pro Ala Leu Lys His Lys Ile
    370                 375                 380

Glu Pro Ile Leu Lys Ala Arg Lys Gln Tyr Ala Tyr Gly Ala Gln His
385                 390                 395                 400

Asp Tyr Phe Asp His His Asp Ile Val Gly Trp Thr Arg Glu Gly Asp
                405                 410                 415

Ser Ser Val Ala Asn Ser Gly Leu Ala Ala Leu Ile Thr Asp Gly Pro
            420                 425                 430

Gly Gly Ala Lys Arg Met Tyr Val Gly Arg Gln Asn Ala Gly Glu Thr
        435                 440                 445

Trp His Asp Ile Thr Gly Asn Arg Ser Glu Pro Val Val Ile Asn Ser
    450                 455                 460

Glu Gly Trp Gly Glu Phe His Val Asn Gly Gly Ser Val Ser Ile Tyr
465                 470                 475                 480

Val Gln Arg

<210> SEQ ID NO 13
<211> LENGTH: 861
<212> TYPE: DNA
<213> ORGANISM: Bacillus sp. NSP9.1
<220> FEATURE:
<221> NAME/KEY: CDS
<222> LOCATION: (1)..(858)
<220> FEATURE:
<221> NAME/KEY: sig_peptide
<222> LOCATION: (1)..(57)
<220> FEATURE:
<221> NAME/KEY: mat_peptide
<222> LOCATION: (58)..(858)

<400> SEQUENCE: 13 atg aag aaa att gca att gcg gcg ata aca gca aca agc gtg ctg gct     48
```

```
                Met Lys Lys Ile Ala Ile Ala Ala Ile Thr Ala Thr Ser Val Leu Ala
                    -15                 -10                  -5 ctc agc gca tgt tca ggt ggc gac tct caa gta gtt gcg gag aca aaa        96
Leu Ser Ala Cys Ser Gly Gly Asp Ser Gln Val Val Ala Glu Thr Lys
    -1   1               5                  10 gct ggc aac atc aca aag gag gac ctt tac cag act ctt aag gag aac       144
Ala Gly Asn Ile Thr Lys Glu Asp Leu Tyr Gln Thr Leu Lys Glu Asn
         15                  20                  25 gca ggt gcg gac gct ctt aac atg ctt gtt caa aag aag gta ctt gac       192
Ala Gly Ala Asp Ala Leu Asn Met Leu Val Gln Lys Lys Val Leu Asp
 30                  35                  40                  45 gac aag tac gac gta aca gac aag gag atc gac aag aag ctt aac gag       240
Asp Lys Tyr Asp Val Thr Asp Lys Glu Ile Asp Lys Lys Leu Asn Glu
                 50                  55                  60 tac aag aag agc atg ggc gac cag ctt gac tca ctt atc aag cag aag       288
Tyr Lys Lys Ser Met Gly Asp Gln Leu Asp Ser Leu Ile Lys Gln Lys
             65                  70                  75 ggc gag gac tac gtt aag gac caa atc aag tac gag ctt ctt atg aag       336
Gly Glu Asp Tyr Val Lys Asp Gln Ile Lys Tyr Glu Leu Leu Met Lys
         80                  85                  90 aaa gct gcg aag gac aac atc aag gtt aca gac gac gac gtt aag gag       384
Lys Ala Ala Lys Asp Asn Ile Lys Val Thr Asp Asp Asp Val Lys Glu
 95                 100                 105 tac tac gac tca ctt aag ggc aag att cgt gcg agc cac atc ctt gtt       432
Tyr Tyr Asp Ser Leu Lys Gly Lys Ile Arg Ala Ser His Ile Leu Val
110                 115                 120                 125 aag gac aag aag act gcg gaa gag gtt gag aag aag ctt aag aag ggc       480
Lys Asp Lys Lys Thr Ala Glu Glu Val Glu Lys Lys Leu Lys Lys Gly
                130                 135                 140 gag aag ttc gag gac ctt gcg aag gag tac tct aca gac ggc aca gcc       528
Glu Lys Phe Glu Asp Leu Ala Lys Glu Tyr Ser Thr Asp Gly Thr Ala
            145                 150                 155 gag aaa ggt ggc gac ctt ggc tgg ttc gct aag gag ggc gag atg gac       576
Glu Lys Gly Gly Asp Leu Gly Trp Phe Ala Lys Glu Gly Glu Met Asp
        160                 165                 170 aag aca ttc tct aaa gct gcg ttc gca ctt aag aca ggc gag gtt tct       624
Lys Thr Phe Ser Lys Ala Ala Phe Ala Leu Lys Thr Gly Glu Val Ser
    175                 180                 185 gag cca gtt aag act gac tac ggc tac cat atc atc aag aag acg gag       672
Glu Pro Val Lys Thr Asp Tyr Gly Tyr His Ile Ile Lys Lys Thr Glu
190                 195                 200                 205 gaa cgt ggc aag tac gac gac atg aag aag gag ctt aag aaa gag gtt       720
Glu Arg Gly Lys Tyr Asp Asp Met Lys Lys Glu Leu Lys Lys Glu Val
                210                 215                 220 gag gag caa aag ctt aac gac cag act gag ctt cag agc gta atc gac       768
Glu Glu Gln Lys Leu Asn Asp Gln Thr Glu Leu Gln Ser Val Ile Asp
            225                 230                 235 aag ctt gtt aag gac gcg gac ctt aag gtt aag gac aag gag ctt aag       816
Lys Leu Val Lys Asp Ala Asp Leu Lys Val Lys Asp Lys Glu Leu Lys
        240                 245                 250 aag caa atc gac caa tct caa act aac act aac tca aac tct taa           861
Lys Gln Ile Asp Gln Ser Gln Thr Asn Thr Asn Ser Asn Ser
    255                 260                 265

<210> SEQ ID NO 14
<211> LENGTH: 286
<212> TYPE: PRT
<213> ORGANISM: Bacillus sp. NSP9.1

<400> SEQUENCE: 14
```

```
Met Lys Lys Ile Ala Ile Ala Ile Thr Ala Ser Val Leu Ala
            -15              -10              -5

Leu Ser Ala Cys Ser Gly Gly Asp Ser Gln Val Val Ala Glu Thr Lys
         -1  1           5                  10

Ala Gly Asn Ile Thr Lys Glu Asp Leu Tyr Gln Thr Leu Lys Glu Asn
 15              20                  25

Ala Gly Ala Asp Ala Leu Asn Met Leu Val Gln Lys Val Leu Asp
 30              35                  40                  45

Asp Lys Tyr Asp Val Thr Asp Lys Glu Ile Asp Lys Lys Leu Asn Glu
             50                  55                  60

Tyr Lys Lys Ser Met Gly Asp Gln Leu Asp Ser Leu Ile Lys Gln Lys
         65                  70                  75

Gly Glu Asp Tyr Val Lys Asp Gln Ile Lys Tyr Glu Leu Leu Met Lys
             80                  85                  90

Lys Ala Ala Lys Asp Asn Ile Lys Val Thr Asp Asp Val Lys Glu
 95                  100                 105

Tyr Tyr Asp Ser Leu Lys Gly Lys Ile Arg Ala Ser His Ile Leu Val
110                 115                 120                 125

Lys Asp Lys Lys Thr Ala Glu Glu Val Glu Lys Lys Leu Lys Lys Gly
             130                 135                 140

Glu Lys Phe Glu Asp Leu Ala Lys Glu Tyr Ser Thr Asp Gly Thr Ala
         145                 150                 155

Glu Lys Gly Gly Asp Leu Gly Trp Phe Ala Lys Gly Glu Met Asp
             160                 165                 170

Lys Thr Phe Ser Lys Ala Ala Phe Ala Leu Lys Thr Gly Glu Val Ser
         175                 180                 185

Glu Pro Val Lys Thr Asp Tyr Gly Tyr His Ile Ile Lys Lys Thr Glu
190                 195                 200                 205

Glu Arg Gly Lys Tyr Asp Asp Met Lys Lys Glu Leu Lys Lys Glu Val
             210                 215                 220

Glu Glu Gln Lys Leu Asn Asp Gln Thr Glu Leu Gln Ser Val Ile Asp
         225                 230                 235

Lys Leu Val Lys Asp Ala Asp Leu Lys Val Lys Asp Lys Glu Leu Lys
             240                 245                 250

Lys Gln Ile Asp Gln Ser Gln Thr Asn Thr Asn Ser Asn Ser
         255                 260                 265
```

<210> SEQ ID NO 15
<211> LENGTH: 267
<212> TYPE: PRT
<213> ORGANISM: Bacillus sp. NSP9.1

<400> SEQUENCE: 15

```
Cys Ser Gly Gly Asp Ser Gln Val Val Ala Glu Thr Lys Ala Gly Asn
 1               5                  10                  15

Ile Thr Lys Glu Asp Leu Tyr Gln Thr Leu Lys Glu Asn Ala Gly Ala
             20                  25                  30

Asp Ala Leu Asn Met Leu Val Gln Lys Val Leu Asp Asp Lys Tyr
         35                  40                  45

Asp Val Thr Asp Lys Glu Ile Asp Lys Lys Leu Asn Glu Tyr Lys Lys
 50                  55                  60

Ser Met Gly Asp Gln Leu Asp Ser Leu Ile Lys Gln Lys Gly Glu Asp
 65                  70                  75                  80

Tyr Val Lys Asp Gln Ile Lys Tyr Glu Leu Leu Met Lys Lys Ala Ala
             85                  90                  95
```

```
Lys Asp Asn Ile Lys Val Thr Asp Asp Val Lys Glu Tyr Tyr Asp
                100                 105                 110

Ser Leu Lys Gly Lys Ile Arg Ala Ser His Ile Leu Val Lys Asp Lys
            115                 120                 125

Lys Thr Ala Glu Glu Val Glu Lys Lys Leu Lys Lys Gly Glu Lys Phe
        130                 135                 140

Glu Asp Leu Ala Lys Glu Tyr Ser Thr Asp Gly Thr Ala Glu Lys Gly
145                 150                 155                 160

Gly Asp Leu Gly Trp Phe Ala Lys Glu Gly Glu Met Asp Lys Thr Phe
                165                 170                 175

Ser Lys Ala Ala Phe Ala Leu Lys Thr Gly Glu Val Ser Glu Pro Val
            180                 185                 190

Lys Thr Asp Tyr Gly Tyr His Ile Ile Lys Lys Thr Glu Glu Arg Gly
        195                 200                 205

Lys Tyr Asp Asp Met Lys Lys Glu Leu Lys Lys Glu Val Glu Glu Gln
210                 215                 220

Lys Leu Asn Asp Gln Thr Glu Leu Gln Ser Val Ile Asp Lys Leu Val
225                 230                 235                 240

Lys Asp Ala Asp Leu Lys Val Lys Asp Lys Glu Leu Lys Lys Gln Ile
                245                 250                 255

Asp Gln Ser Gln Thr Asn Thr Asn Ser Asn Ser
                260                 265

<210> SEQ ID NO 16
<211> LENGTH: 1548
<212> TYPE: DNA
<213> ORGANISM: Bacillus sp. NSP9.1
<220> FEATURE:
<221> NAME/KEY: CDS
<222> LOCATION: (1)..(1545)
<220> FEATURE:
<221> NAME/KEY: sig
<222> LOCATION: (1)..(1545)
<220> FEATURE:
<221> NAME/KEY: sig
<222> LOCATION: (1)..(90)
<220> FEATURE:
<221> NAME/KEY: mat_peptide
<222> LOCATION: (91)..(1545)

<400> SEQUENCE: 16 atg ctg gga aaa aac aaa cgg ttt ttc aca tgg atg gtt tcg ttt ttc    48
Met Leu Gly Lys Asn Lys Arg Phe Phe Thr Trp Met Val Ser Phe Phe
-30             -25                 -20                 -15 gtc acg ctc atg ttc ctg gtt ccg ccg cct aaa gca agt gcg gaa agc    96
Val Thr Leu Met Phe Leu Val Pro Pro Pro Lys Ala Ser Ala Glu Ser
            -10                 -5              -1   1 att aac ggc aca ttg atg cag tat ttt gag tgg tat ttg ccc aat gat   144
Ile Asn Gly Thr Leu Met Gln Tyr Phe Glu Trp Tyr Leu Pro Asn Asp
            5                   10                  15 ggc caa cat tgg aag cgt tta caa aac gac gcg gca tat tta tca gat   192
Gly Gln His Trp Lys Arg Leu Gln Asn Asp Ala Ala Tyr Leu Ser Asp
        20                  25                  30 ctc ggc gtc acc gct gta tgg att ccg ccg gcc tac aag gga acg agt   240
Leu Gly Val Thr Ala Val Trp Ile Pro Pro Ala Tyr Lys Gly Thr Ser
35                  40                  45                  50 cag tct gat gtc ggt tat ggc gcc tat gat ttg tat gat tta gga gag   288
Gln Ser Asp Val Gly Tyr Gly Ala Tyr Asp Leu Tyr Asp Leu Gly Glu
                55                  60                  65 ttt cag caa aaa ggg acg gtg cga acg aaa tac gga aca aaa ggt gag   336
```

```
           Phe Gln Gln Lys Gly Thr Val Arg Thr Lys Tyr Gly Thr Lys Gly Glu
                            70                  75                  80 ctt caa tct gcg atc ggc aat ctt cat tcc cgt aat att cac gtc tac         384
Leu Gln Ser Ala Ile Gly Asn Leu His Ser Arg Asn Ile His Val Tyr
                85                  90                  95 ggg gat gtc gtc atc aat cat aaa gga gga gct gat ggg acg gaa gac         432
Gly Asp Val Val Ile Asn His Lys Gly Gly Ala Asp Gly Thr Glu Asp
            100                 105                 110 gtc acc gct gtt gaa gtc aat ccg ggg gac agg aat cag gaa acg tcc         480
Val Thr Ala Val Glu Val Asn Pro Gly Asp Arg Asn Gln Glu Thr Ser
        115                 120                 125                 130 ggg gag cag cga atc aaa gcg tgg aca gcg ttt cat ttt cca gga cgc         528
Gly Glu Gln Arg Ile Lys Ala Trp Thr Ala Phe His Phe Pro Gly Arg
                    135                 140                 145 gga agc acc tac agc ggt ttt aag tgg cat tgg tat cat ttt gat gga         576
Gly Ser Thr Tyr Ser Gly Phe Lys Trp His Trp Tyr His Phe Asp Gly
                150                 155                 160 aca gat tgg gac gag tcc cgg aaa ttg aac cgc atc tat aag ttt cgc         624
Thr Asp Trp Asp Glu Ser Arg Lys Leu Asn Arg Ile Tyr Lys Phe Arg
            165                 170                 175 gga gag ggc aag gca tgg gat tgg gag gtt tca agc gaa aac ggc aac         672
Gly Glu Gly Lys Ala Trp Asp Trp Glu Val Ser Ser Glu Asn Gly Asn
        180                 185                 190 tat gac tac ctg atg tat gct gat att gat tac aac cat ccc gat gtc         720
Tyr Asp Tyr Leu Met Tyr Ala Asp Ile Asp Tyr Asn His Pro Asp Val
195                 200                 205                 210 gtg gca gaa ttg aaa aaa tgg gga aca tgg tat gcc aat gaa ctg aac         768
Val Ala Glu Leu Lys Lys Trp Gly Thr Trp Tyr Ala Asn Glu Leu Asn
                    215                 220                 225 ttg gac ggt ttt cgg ctc gat gcc gtg aaa cat att aaa ttt tca ttt         816
Leu Asp Gly Phe Arg Leu Asp Ala Val Lys His Ile Lys Phe Ser Phe
                230                 235                 240 ttg cgg gat tgg ctg aaa tca gtc agg gaa tcg acg ggg aag gat atg         864
Leu Arg Asp Trp Leu Lys Ser Val Arg Glu Ser Thr Gly Lys Asp Met
            245                 250                 255 ttt gcg gta gct gag tat tgg cgg aat gac cag ggc gcc ctt gaa aat         912
Phe Ala Val Ala Glu Tyr Trp Arg Asn Asp Gln Gly Ala Leu Glu Asn
        260                 265                 270 tac ttg aag aaa acc gat ttt caa cat tcg gta ttc gat gtt ccg ctc         960
Tyr Leu Lys Lys Thr Asp Phe Gln His Ser Val Phe Asp Val Pro Leu
275                 280                 285                 290 cac tac aat ttg cat gcc gca tcg caa ggg ggc ggc tat gat atg            1008
His Tyr Asn Leu His Ala Ala Ser Ser Gln Gly Gly Gly Tyr Asp Met
                    295                 300                 305 agg caa ttg ctg aac ggt act gtc gta tcc aaa tat ccg gaa aag gcg        1056
Arg Gln Leu Leu Asn Gly Thr Val Val Ser Lys Tyr Pro Glu Lys Ala
                310                 315                 320 gtc aca ttt gtt gat aat cat gat aca cag cct gga caa tcg ctt gag       1104
Val Thr Phe Val Asp Asn His Asp Thr Gln Pro Gly Gln Ser Leu Glu
            325                 330                 335 tcc act gtc gaa cca tgg ttt aaa ccg ctt gcc tat tgt ttc att atg       1152
Ser Thr Val Glu Pro Trp Phe Lys Pro Leu Ala Tyr Cys Phe Ile Met
        340                 345                 350 aca agg aag tcc ggc tac ccg cag gtt ttc tac gga gat ctg tat ggg       1200
Thr Arg Lys Ser Gly Tyr Pro Gln Val Phe Tyr Gly Asp Leu Tyr Gly
355                 360                 365                 370 aca aag ggt tct aca tca cgg gaa att cca gtg ctt aaa aac aaa ctc       1248
Thr Lys Gly Ser Thr Ser Arg Glu Ile Pro Val Leu Lys Asn Lys Leu
                    375                 380                 385
```

```
gag ccg att tta aaa gcg cgc aaa cat tat gca tat ggc gcc cag cac    1296
Glu Pro Ile Leu Lys Ala Arg Lys His Tyr Ala Tyr Gly Ala Gln His
        390                 395                 400 gac tat ttc gac cat cat gat atc atc ggc tgg acg agg gaa ggt gac    1344
Asp Tyr Phe Asp His His Asp Ile Ile Gly Trp Thr Arg Glu Gly Asp
            405                 410                 415 agt tcg att cag aag tcc ggt cta gct gca tta ata aca gac gga ccc    1392
Ser Ser Ile Gln Lys Ser Gly Leu Ala Ala Leu Ile Thr Asp Gly Pro
        420                 425                 430 ggc gga tca aag cgt atg tat gtc gga cgt gag aat gcg ggt gaa acg    1440
Gly Gly Ser Lys Arg Met Tyr Val Gly Arg Glu Asn Ala Gly Glu Thr
435                 440                 445                 450 tgg tat gac atc acg ggg aac cgt tca gac tcc gtc gcg atc gat tcg    1488
Trp Tyr Asp Ile Thr Gly Asn Arg Ser Asp Ser Val Ala Ile Asp Ser
            455                 460                 465 aac ggc tgg gga gaa ttc cgt gtg aac ggc ggt tcg gtt tcc att tat    1536
Asn Gly Trp Gly Glu Phe Arg Val Asn Gly Gly Ser Val Ser Ile Tyr
        470                 475                 480 gtt cag agg tag                                                    1548
Val Gln Arg
        485

<210> SEQ ID NO 17
<211> LENGTH: 515
<212> TYPE: PRT
<213> ORGANISM: Bacillus sp. NSP9.1

<400> SEQUENCE: 17

Met Leu Gly Lys Asn Lys Arg Phe Phe Thr Trp Met Val Ser Phe Phe
-30                 -25                 -20                 -15

Val Thr Leu Met Phe Leu Val Pro Pro Lys Ala Ser Ala Glu Ser
            -10                 -5                  -1  1

Ile Asn Gly Thr Leu Met Gln Tyr Phe Gl

```
            195                 200                 205                 210
Val Ala Glu Leu Lys Lys Trp Gly Thr Trp Tyr Ala Asn Glu Leu Asn
                215                 220                 225

Leu Asp Gly Phe Arg Leu Asp Ala Val Lys His Ile Lys Phe Ser Phe
                230                 235                 240

Leu Arg Asp Trp Leu Lys Ser Val Arg Glu Ser Thr Gly Lys Asp Met
                245                 250                 255

Phe Ala Val Ala Glu Tyr Trp Arg Asn Asp Gln Gly Ala Leu Glu Asn
                260                 265                 270

Tyr Leu Lys Lys Thr Asp Phe Gln His Ser Val Phe Asp Val Pro Leu
275                 280                 285                 290

His Tyr Asn Leu His Ala Ala Ser Ser Gln Gly Gly Tyr Asp Met
                    295                 300                 305

Arg Gln Leu Leu Asn Gly Thr Val Val Ser Lys Tyr Pro Glu Lys Ala
                310                 315                 320

Val Thr Phe Val Asp Asn His Asp Thr Gln Pro Gly Gln Ser Leu Glu
                325                 330                 335

Ser Thr Val Glu Pro Trp Phe Lys Pro Leu Ala Tyr Cys Phe Ile Met
    340                 345                 350

Thr Arg Lys Ser Gly Tyr Pro Gln Val Phe Tyr Gly Asp Leu Tyr Gly
355                 360                 365                 370

Thr Lys Gly Ser Thr Ser Arg Glu Ile Pro Val Leu Lys Asn Lys Leu
                375                 380                 385

Glu Pro Ile Leu Lys Ala Arg Lys His Tyr Ala Tyr Gly Ala Gln His
                390                 395                 400

Asp Tyr Phe Asp His His Asp Ile Ile Gly Trp Thr Arg Glu Gly Asp
                405                 410                 415

Ser Ser Ile Gln Lys Ser Gly Leu Ala Ala Leu Ile Thr Asp Gly Pro
                420                 425                 430

Gly Gly Ser Lys Arg Met Tyr Val Gly Arg Glu Asn Ala Gly Glu Thr
435                 440                 445                 450

Trp Tyr Asp Ile Thr Gly Asn Arg Ser Asp Ser Val Ala Ile Asp Ser
                455                 460                 465

Asn Gly Trp Gly Glu Phe Arg Val Asn Gly Ser Val Ser Ile Tyr
                470                 475                 480

Val Gln Arg
        485

<210> SEQ ID NO 18
<211> LENGTH: 485
<212> TYPE: PRT
<213> ORGANISM: Bacillus sp. NSP9.1

<400> SEQUENCE: 18

Glu Ser Ile Asn Gly Thr Leu Met Gln Tyr Phe Glu Trp Tyr Leu Pro
1               5                   10                  15

Asn Asp Gly Gln His Trp Lys Arg Leu Gln Asn Asp Ala Ala Tyr Leu
                20                  25                  30

Ser Asp Leu Gly Val Thr Ala Val Trp Ile Pro Pro Ala Tyr Lys Gly
            35                  40                  45

Thr Ser Gln Ser Asp Val Gly Tyr Gly Ala Tyr Asp Leu Tyr Asp Leu
        50                  55                  60

Gly Glu Phe Gln Gln Lys Gly Thr Val Arg Thr Lys Tyr Gly Thr Lys
65                  70                  75                  80
```

-continued

```
Gly Glu Leu Gln Ser Ala Ile Gly Asn Leu His Ser Arg Asn Ile His
                85                  90                  95

Val Tyr Gly Asp Val Val Ile Asn His Lys Gly Gly Ala Asp Gly Thr
            100                 105                 110

Glu Asp Val Thr Ala Val Glu Val Asn Pro Gly Asp Arg Asn Gln Glu
        115                 120                 125

Thr Ser Gly Glu Gln Arg Ile Lys Ala Trp Thr Ala Phe His Phe Pro
    130                 135                 140

Gly Arg Gly Ser Thr Tyr Ser Gly Phe Lys Trp His Trp Tyr His Phe
145                 150                 155                 160

Asp Gly Thr Asp Trp Asp Glu Ser Arg Lys Leu Asn Arg Ile Tyr Lys
                165                 170                 175

Phe Arg Gly Glu Gly Lys Ala Trp Asp Trp Glu Val Ser Ser Glu Asn
            180                 185                 190

Gly Asn Tyr Asp Tyr Leu Met Tyr Ala Asp Ile Asp Tyr Asn His Pro
        195                 200                 205

Asp Val Val Ala Glu Leu Lys Lys Trp Gly Thr Trp Tyr Ala Asn Glu
    210                 215                 220

Leu Asn Leu Asp Gly Phe Arg Leu Asp Ala Val Lys His Ile Lys Phe
225                 230                 235                 240

Ser Phe Leu Arg Asp Trp Leu Lys Ser Val Arg Glu Ser Thr Gly Lys
                245                 250                 255

Asp Met Phe Ala Val Ala Glu Tyr Trp Arg Asn Asp Gln Gly Ala Leu
            260                 265                 270

Glu Asn Tyr Leu Lys Lys Thr Asp Phe Gln His Ser Val Phe Asp Val
        275                 280                 285

Pro Leu His Tyr Asn Leu His Ala Ala Ser Ser Gln Gly Gly Gly Tyr
    290                 295                 300

Asp Met Arg Gln Leu Leu Asn Gly Thr Val Val Ser Lys Tyr Pro Glu
305                 310                 315                 320

Lys Ala Val Thr Phe Val Asp Asn His Asp Thr Gln Pro Gly Gln Ser
                325                 330                 335

Leu Glu Ser Thr Val Glu Pro Trp Phe Lys Pro Leu Ala Tyr Cys Phe
            340                 345                 350

Ile Met Thr Arg Lys Ser Gly Tyr Pro Gln Val Phe Tyr Gly Asp Leu
        355                 360                 365

Tyr Gly Thr Lys Gly Ser Thr Ser Arg Glu Ile Pro Val Leu Lys Asn
    370                 375                 380

Lys Leu Glu Pro Ile Leu Lys Ala Arg Lys His Tyr Ala Tyr Gly Ala
385                 390                 395                 400

Gln His Asp Tyr Phe Asp His His Asp Ile Ile Gly Trp Thr Arg Glu
                405                 410                 415

Gly Asp Ser Ser Ile Gln Lys Ser Gly Leu Ala Ala Leu Ile Thr Asp
            420                 425                 430

Gly Pro Gly Gly Ser Lys Arg Met Tyr Val Gly Arg Glu Asn Ala Gly
        435                 440                 445

Glu Thr Trp Tyr Asp Ile Thr Gly Asn Arg Ser Asp Ser Val Ala Ile
    450                 455                 460

Asp Ser Asn Gly Trp Gly Glu Phe Arg Val Asn Gly Gly Ser Val Ser
465                 470                 475                 480

Ile Tyr Val Gln Arg
                485
```

-continued

```
<210> SEQ ID NO 19
<211> LENGTH: 864
<212> TYPE: DNA
<213> ORGANISM: Bacillus sonorensis L12
<220> FEATURE:
<221> NAME/KEY: CDS
<222> LOCATION: (1)..(861)
<220> FEATURE:
<221> NAME/KEY: sig_peptide
<222> LOCATION: (1)..(57)
<220> FEATURE:
<221> NAME/KEY: mat_peptide
<222> LOCATION: (58)..(861)

<400> SEQUENCE: 19 atg aag aag att aca att gcg gcg att acg gcg aca agc ctt ctg gct      48
Met Lys Lys Ile Thr Ile Ala Ala Ile Thr Ala Thr Ser Leu Leu Ala
        -15                 -10                  -5 ctc agc gcg tgc agc ggg gga gat tct gaa gtt gtc gca gaa aca aaa      96
Leu Ser Ala Cys Ser Gly Gly Asp Ser Glu Val Val Ala Glu Thr Lys
         -1  1               5                  10 gca gga aat gta aca aaa gaa gag ctt tat caa aca tta aaa gaa aac     144
Ala Gly Asn Val Thr Lys Glu Glu Leu Tyr Gln Thr Leu Lys Glu Asn
 15                  20                  25 gcc gga gcg gac gcg ctt aac atg ctt gtt cag caa aaa gta ctc gat     192
Ala Gly Ala Asp Ala Leu Asn Met Leu Val Gln Gln Lys Val Leu Asp
 30                  35                  40                  45 gac aaa tac aag gcc tca gac aaa gaa att gac aaa aaa ctg aat gaa     240
Asp Lys Tyr Lys Ala Ser Asp Lys Glu Ile Asp Lys Lys Leu Asn Glu
                 50                  55                  60 tac aag aaa acc gca ggc gac cag atc aac gcg ctg att gat caa aaa     288
Tyr Lys Lys Thr Ala Gly Asp Gln Ile Asn Ala Leu Ile Asp Gln Lys
                 65                  70                  75 ggc gaa aaa tac gtc aaa aaa cag atc aaa tat gaa ctt ctt atg cag     336
Gly Glu Lys Tyr Val Lys Lys Gln Ile Lys Tyr Glu Leu Leu Met Gln
         80                  85                  90 aaa gcc gca aag gat aac ata aaa gta aca gac aaa gac gtg aaa gaa     384
Lys Ala Ala Lys Asp Asn Ile Lys Val Thr Asp Lys Asp Val Lys Glu
 95                 100                 105 tat tat gac ggc ctc aaa ggc aaa atc cgc gcg agc cac att ctc gtc     432
Tyr Tyr Asp Gly Leu Lys Gly Lys Ile Arg Ala Ser His Ile Leu Val
110                 115                 120                 125 aaa gat aag aaa acc gct gaa gaa gtt gag aaa aag ctg aaa aaa ggc     480
Lys Asp Lys Lys Thr Ala Glu Glu Val Glu Lys Lys Leu Lys Lys Gly
                130                 135                 140 gaa aaa ttt gaa gac ctt gca aaa gag tat tca act gac gga act gct     528
Glu Lys Phe Glu Asp Leu Ala Lys Glu Tyr Ser Thr Asp Gly Thr Ala
        145                 150                 155 gaa aaa ggc ggc gac ctc ggc tgg ttt ggc aaa act gaa atg gat aaa     576
Glu Lys Gly Gly Asp Leu Gly Trp Phe Gly Lys Thr Glu Met Asp Lys
        160                 165                 170 tca ttc acc aaa gcg gcc ttc gct ctg aaa aca ggc gaa atc agc ggc     624
Ser Phe Thr Lys Ala Ala Phe Ala Leu Lys Thr Gly Glu Ile Ser Gly
        175                 180                 185 cct gtc aaa tca caa tgg ggc tac cac atc att aag aaa aca gaa gaa     672
Pro Val Lys Ser Gln Trp Gly Tyr His Ile Ile Lys Lys Thr Glu Glu
190                 195                 200                 205 cgc ggc aaa tac gat gac atg aaa aac gat ctg aaa aaa ctg cta ata     720
Arg Gly Lys Tyr Asp Asp Met Lys Asn Asp Leu Lys Lys Leu Leu Ile
                210                 215                 220 gaa caa aaa caa agc gat aca act gaa ctt cag tcc gtc atg aac aaa     768
Glu Gln Lys Gln Ser Asp Thr Thr Glu Leu Gln Ser Val Met Asn Lys
                225                 230                 235
```

```
ctc gtc aaa gac gct gac atg aag gta aaa gat aaa gaa ctg aaa aaa      816
Leu Val Lys Asp Ala Asp Met Lys Val Lys Asp Lys Glu Leu Lys Lys
        240                 245                 250 caa gtc gaa caa agc cag tca tct gca caa aca aac agc aac agc taa      864
Gln Val Glu Gln Ser Gln Ser Ser Ala Gln Thr Asn Ser Asn Ser
    255                 260                 265
```

<210> SEQ ID NO 20
<211> LENGTH: 287
<212> TYPE: PRT
<213> ORGANISM: Bacillus sonorensis L12

<400> SEQUENCE: 20

```
Met Lys Lys Ile Thr Ile Ala Ala Ile Thr Ala Thr Ser Leu Leu Ala
                -15                 -10                  -5

Leu Ser Ala Cys Ser Gly Gly Asp Ser Glu Val Val Ala Glu Thr Lys
         -1   1               5                  10

Ala Gly Asn Val Thr Lys Glu Glu Leu Tyr Gln Thr Leu Lys Glu Asn
             15                  20                  25

Ala Gly Ala Asp Ala Leu Asn Met Leu Val Gln Gln Lys Val Leu Asp
30                  35                  40                  45

Asp Lys Tyr Lys Ala Ser Asp Lys Glu Ile Asp Lys Lys Leu Asn Glu
                50                  55                  60

Tyr Lys Lys Thr Ala Gly Asp Gln Ile Asn Ala Leu Ile Asp Gln Lys
                65                  70                  75

Gly Glu Lys Tyr Val Lys Lys Gln Ile Lys Tyr Glu Leu Leu Met Gln
                80                  85                  90

Lys Ala Ala Lys Asp Asn Ile Lys Val Thr Asp Lys Asp Val Lys Glu
     95                 100                 105

Tyr Tyr Asp Gly Leu Lys Gly Lys Ile Arg Ala Ser His Ile Leu Val
110                 115                 120                 125

Lys Asp Lys Lys Thr Ala Glu Glu Val Glu Lys Lys Leu Lys Lys Gly
                130                 135                 140

Glu Lys Phe Glu Asp Leu Ala Lys Glu Tyr Ser Thr Asp Gly Thr Ala
                145                 150                 155

Glu Lys Gly Gly Asp Leu Gly Trp Phe Gly Lys Thr Glu Met Asp Lys
            160                 165                 170

Ser Phe Thr Lys Ala Ala Phe Ala Leu Lys Thr Gly Glu Ile Ser Gly
            175                 180                 185

Pro Val Lys Ser Gln Trp Gly Tyr His Ile Ile Lys Lys Thr Glu Glu
190                 195                 200                 205

Arg Gly Lys Tyr Asp Asp Met Lys Asn Asp Leu Lys Lys Leu Leu Ile
                210                 215                 220

Glu Gln Lys Gln Ser Asp Thr Thr Glu Leu Gln Ser Val Met Asn Lys
            225                 230                 235

Leu Val Lys Asp Ala Asp Met Lys Val Lys Asp Lys Glu Leu Lys Lys
            240                 245                 250

Gln Val Glu Gln Ser Gln Ser Ser Ala Gln Thr Asn Ser Asn Ser
        255                 260                 265
```

<210> SEQ ID NO 21
<211> LENGTH: 268
<212> TYPE: PRT
<213> ORGANISM: Bacillus sonorensis L12

<400> SEQUENCE: 21

```
Cys Ser Gly Gly Asp Ser Glu Val Val Ala Glu Thr Lys Ala Gly Asn
1               5                   10                  15

Val Thr Lys Glu Glu Leu Tyr Gln Thr Leu Lys Glu Asn Ala Gly Ala
            20                  25                  30

Asp Ala Leu Asn Met Leu Val Gln Gln Lys Val Leu Asp Asp Lys Tyr
        35                  40                  45

Lys Ala Ser Asp Lys Glu Ile Asp Lys Lys Leu Asn Glu Tyr Lys Lys
    50                  55                  60

Thr Ala Gly Asp Gln Ile Asn Ala Leu Ile Asp Gln Lys Gly Glu Lys
65                  70                  75                  80

Tyr Val Lys Lys Gln Ile Lys Tyr Glu Leu Leu Met Gln Lys Ala Ala
                85                  90                  95

Lys Asp Asn Ile Lys Val Thr Asp Lys Asp Val Lys Glu Tyr Tyr Asp
            100                 105                 110

Gly Leu Lys Gly Lys Ile Arg Ala Ser His Ile Leu Val Lys Asp Lys
        115                 120                 125

Lys Thr Ala Glu Glu Val Glu Lys Lys Leu Lys Gly Glu Lys Phe
    130                 135                 140

Glu Asp Leu Ala Lys Glu Tyr Ser Thr Asp Gly Thr Ala Glu Lys Gly
145                 150                 155                 160

Gly Asp Leu Gly Trp Phe Gly Lys Thr Glu Met Asp Lys Ser Phe Thr
                165                 170                 175

Lys Ala Ala Phe Ala Leu Lys Thr Gly Glu Ile Ser Gly Pro Val Lys
            180                 185                 190

Ser Gln Trp Gly Tyr His Ile Ile Lys Lys Thr Glu Glu Arg Gly Lys
        195                 200                 205

Tyr Asp Asp Met Lys Asn Asp Leu Lys Leu Leu Ile Glu Gln Lys
    210                 215                 220

Gln Ser Asp Thr Thr Glu Leu Gln Ser Val Met Asn Lys Leu Val Lys
225                 230                 235                 240

Asp Ala Asp Met Lys Val Lys Asp Lys Glu Leu Lys Lys Gln Val Glu
                245                 250                 255

Gln Ser Gln Ser Ser Ala Gln Thr Asn Ser Asn Ser
        260                 265

<210> SEQ ID NO 22
<211> LENGTH: 1536
<212> TYPE: DNA
<213> ORGANISM: Bacillus sonorensis L12
<220> FEATURE:
<221> NAME/KEY: CDS
<222> LOCATION: (1)..(1533)
<220> FEATURE:
<221> NAME/KEY: sig_peptide
<222> LOCATION: (1)..(78)
<220> FEATURE:
<221> NAME/KEY: mat_peptide
<222> LOCATION: (79)..(1533)

<400> SEQUENCE: 22 atg gtt tac aaa tgc aaa cgg ata tta tgt tgt gtg ctg ctg ttt ttc      48
Met Val Tyr Lys Cys Lys Arg Ile Leu Cys Cys Val Leu Leu Phe Phe
    -25                 -20                 -15 ata gtg ctg ccg gct tct aaa aca tat gcg gca agc ctg aac ggc acg      96
Ile Val Leu Pro Ala Ser Lys Thr Tyr Ala Ala Ser Leu Asn Gly Thr
-10             -5                  -1  1               5 ctg atg cag tat ttt gaa tgg aat ctg cct aat gac ggc cag cat tgg     144
Leu Met Gln Tyr Phe Glu Trp Asn Leu Pro Asn Asp Gly Gln His Trp
        10                  15                  20
```

```
aag cgc tta caa aat gat gcg gga tat tta tcc gac att ggg ata acg    192
Lys Arg Leu Gln Asn Asp Ala Gly Tyr Leu Ser Asp Ile Gly Ile Thr
         25                  30                  35 gct gtt tgg att ccg ccc gcc tac aag gga acg agc cag gct gac gtt    240
Ala Val Trp Ile Pro Pro Ala Tyr Lys Gly Thr Ser Gln Ala Asp Val
 40                  45                  50 gga tac ggc cca tac gat ttg tac gat tta ggg gag ttc ctg caa aaa    288
Gly Tyr Gly Pro Tyr Asp Leu Tyr Asp Leu Gly Glu Phe Leu Gln Lys
55                  60                  65                  70 ggg acg gtg cgg acg aaa tac ggg atg aaa aca gag ctt cag tca gcg    336
Gly Thr Val Arg Thr Lys Tyr Gly Met Lys Thr Glu Leu Gln Ser Ala
                 75                  80                  85 gtc ggt tcg ctt cat tcc cag aac atc caa gtg tat ggc gat gtt gtc    384
Val Gly Ser Leu His Ser Gln Asn Ile Gln Val Tyr Gly Asp Val Val
             90                  95                 100 ctt aat cat aag gct ggg gcg gat ctg acg gag gat gtc acc gcg gtt    432
Leu Asn His Lys Ala Gly Ala Asp Leu Thr Glu Asp Val Thr Ala Val
        105                 110                 115 gaa gtg aat ccc ggc aat cga aat cag gaa ata tct gga gaa tat cga    480
Glu Val Asn Pro Gly Asn Arg Asn Gln Glu Ile Ser Gly Glu Tyr Arg
    120                 125                 130 atc aaa gcg tgg aca gga ttc aat ttc cct gga cgc ggc agc aca tac    528
Ile Lys Ala Trp Thr Gly Phe Asn Phe Pro Gly Arg Gly Ser Thr Tyr
135                 140                 145                 150 agt gat ttt aaa tgg cat tgg tat cat ttt gat ggg acg gat tgg gac    576
Ser Asp Phe Lys Trp His Trp Tyr His Phe Asp Gly Thr Asp Trp Asp
                155                 160                 165 gaa tcc cga aag ctg aat cgc atc tac aag ttc cgc gga gat ggg aag    624
Glu Ser Arg Lys Leu Asn Arg Ile Tyr Lys Phe Arg Gly Asp Gly Lys
            170                 175                 180 gca tgg gat tgg gag gtt tcc agc gaa aac ggc aac tac gat tat tta    672
Ala Trp Asp Trp Glu Val Ser Ser Glu Asn Gly Asn Tyr Asp Tyr Leu
        185                 190                 195 atg tat gcg gat gtc gat tat gac cac ccc gat gtt gtg gca gaa atg    720
Met Tyr Ala Asp Val Asp Tyr Asp His Pro Asp Val Val Ala Glu Met
    200                 205                 210 aaa cgg tgg gga acc tgg tat gca aaa gag ctt caa ttg gac ggt ttc    768
Lys Arg Trp Gly Thr Trp Tyr Ala Lys Glu Leu Gln Leu Asp Gly Phe
215                 220                 225                 230 cgg ctt gat gcc gta aaa cat att aaa ttt tca ttt ttg agc gac tgg    816
Arg Leu Asp Ala Val Lys His Ile Lys Phe Ser Phe Leu Ser Asp Trp
                235                 240                 245 ctg aaa gcg gtc agg cag tca acc gga aag gaa atg ttt acg gtt gcg    864
Leu Lys Ala Val Arg Gln Ser Thr Gly Lys Glu Met Phe Thr Val Ala
            250                 255                 260 gaa tac tgg caa aat aac ctt gga gaa atc gaa aac tac ttg caa aaa    912
Glu Tyr Trp Gln Asn Asn Leu Gly Glu Ile Glu Asn Tyr Leu Gln Lys
        265                 270                 275 acc gat ttt caa cat tct gta ttc gat gtg ccg ctt cat ttt aac ctt    960
Thr Asp Phe Gln His Ser Val Phe Asp Val Pro Leu His Phe Asn Leu
    280                 285                 290 cag gcc gca tct tca cac gga ggc agc tat gat atg agg aat ttg ctg   1008
Gln Ala Ala Ser Ser His Gly Gly Ser Tyr Asp Met Arg Asn Leu Leu
295                 300                 305                 310 aac gga acg gtt gtt tcc aaa cat cct ttg aaa gcg gtt aca ttt gtc   1056
Asn Gly Thr Val Val Ser Lys His Pro Leu Lys Ala Val Thr Phe Val
                315                 320                 325 gac aac cat gac aca cag ccg ggg caa tca ttg gag tcg acc gtc caa   1104
Asp Asn His Asp Thr Gln Pro Gly Gln Ser Leu Glu Ser Thr Val Gln
```

-continued

```
              330              335              340
aca tgg ttc aag ccg ctt gcc tac gct ttt att ttg aca aga gag gcc    1152
Thr Trp Phe Lys Pro Leu Ala Tyr Ala Phe Ile Leu Thr Arg Glu Ala
        345              350              355 ggg tac ccg cag gtt ttt tat gga gat atg tat ggg aca aaa ggt cct    1200
Gly Tyr Pro Gln Val Phe Tyr Gly Asp Met Tyr Gly Thr Lys Gly Pro
360              365              370 aca tcg cgg gaa att cct tct ctt aaa agt aaa ctg gag ccg att ttg    1248
Thr Ser Arg Glu Ile Pro Ser Leu Lys Ser Lys Leu Glu Pro Ile Leu
375              380              385              390 aaa gcg cgc aag tat ttt gct tat gga aca cag cat gat tat ttc gat    1296
Lys Ala Arg Lys Tyr Phe Ala Tyr Gly Thr Gln His Asp Tyr Phe Asp
            395              400              405 cat cca gat gcc atc ggc tgg acg agg gaa ggc gat caa tcc gtc gct    1344
His Pro Asp Ala Ile Gly Trp Thr Arg Glu Gly Asp Gln Ser Val Ala
        410              415              420 gca tca ggc ttg gcc gct tta atc aca gac gga ccg gga gga tca aag    1392
Ala Ser Gly Leu Ala Ala Leu Ile Thr Asp Gly Pro Gly Gly Ser Lys
        425              430              435 cgg atg tat gtg ggc agg cag cat gcc ggt gag aca tgg cat gac atc    1440
Arg Met Tyr Val Gly Arg Gln His Ala Gly Glu Thr Trp His Asp Ile
440              445              450 act ggg aac cgt tca gat tcc gtc gtg atc aat tcg gac ggc tgg gga    1488
Thr Gly Asn Arg Ser Asp Ser Val Val Ile Asn Ser Asp Gly Trp Gly
455              460              465              470 gag ttt tat gta aac ggc ggt tcg gtt tcg att tat gtc caa cga tag    1536
Glu Phe Tyr Val Asn Gly Gly Ser Val Ser Ile Tyr Val Gln Arg
            475              480              485
```

<210> SEQ ID NO 23
<211> LENGTH: 511
<212> TYPE: PRT
<213> ORGANISM: Bacillus sonorensis L12

<400> SEQUENCE: 23

```
Met Val Tyr Lys Cys Lys Arg Ile Leu Cys Cys Val Leu Leu Phe Phe
    -25              -20              -15

Ile Val Leu Pro Ala Ser Lys Thr Tyr Ala Ala Ser Leu Asn Gly Thr
-10              -5              -1   1              5

Leu Met Gln Tyr Phe Glu Trp Asn Leu Pro Asn Asp Gly Gln His Trp
            10              15              20

Lys Arg Leu Gln Asn Asp Ala Gly Tyr Leu Ser Asp Ile Gly Ile Thr
        25              30              35

Ala Val Trp Ile Pro Pro Ala Tyr Lys Gly Thr Ser Gln Ala Asp Val
    40              45              50

Gly Tyr Gly Pro Tyr Asp Leu Tyr Asp Leu Gly Glu Phe Leu Gln Lys
55              60              65              70

Gly Thr Val Arg Thr Lys Tyr Gly Met Lys Thr Glu Leu Gln Ser Ala
            75              80              85

Val Gly Ser Leu His Ser Gln Asn Ile Gln Val Tyr Gly Asp Val Val
        90              95              100

Leu Asn His Lys Ala Gly Ala Asp Leu Thr Glu Asp Val Thr Ala Val
    105              110              115

Glu Val Asn Pro Gly Asn Arg Asn Gln Glu Ile Ser Gly Glu Tyr Arg
120              125              130

Ile Lys Ala Trp Thr Gly Phe Asn Phe Pro Gly Arg Gly Ser Thr Tyr
135              140              145              150
```

Ser Asp Phe Lys Trp His Trp Tyr His Phe Asp Gly Thr Asp Trp Asp
            155                 160                 165

Glu Ser Arg Lys Leu Asn Arg Ile Tyr Lys Phe Arg Gly Asp Gly Lys
            170                 175                 180

Ala Trp Asp Trp Glu Val Ser Ser Glu Asn Gly Asn Tyr Asp Tyr Leu
            185                 190                 195

Met Tyr Ala Asp Val Asp Tyr Asp His Pro Asp Val Val Ala Glu Met
            200                 205                 210

Lys Arg Trp Gly Thr Trp Tyr Ala Lys Glu Leu Gln Leu Asp Gly Phe
215                 220                 225                 230

Arg Leu Asp Ala Val Lys His Ile Lys Phe Ser Phe Leu Ser Asp Trp
            235                 240                 245

Leu Lys Ala Val Arg Gln Ser Thr Gly Lys Glu Met Phe Thr Val Ala
            250                 255                 260

Glu Tyr Trp Gln Asn Asn Leu Gly Glu Ile Glu Asn Tyr Leu Gln Lys
            265                 270                 275

Thr Asp Phe Gln His Ser Val Phe Asp Val Pro Leu His Phe Asn Leu
            280                 285                 290

Gln Ala Ala Ser Ser His Gly Gly Ser Tyr Asp Met Arg Asn Leu Leu
295                 300                 305                 310

Asn Gly Thr Val Val Ser Lys His Pro Leu Lys Ala Val Thr Phe Val
            315                 320                 325

Asp Asn His Asp Thr Gln Pro Gly Gln Ser Leu Glu Ser Thr Val Gln
            330                 335                 340

Thr Trp Phe Lys Pro Leu Ala Tyr Ala Phe Ile Leu Thr Arg Glu Ala
            345                 350                 355

Gly Tyr Pro Gln Val Phe Tyr Gly Asp Met Tyr Gly Thr Lys Gly Pro
            360                 365                 370

Thr Ser Arg Glu Ile Pro Ser Leu Lys Ser Lys Leu Glu Pro Ile Leu
375                 380                 385                 390

Lys Ala Arg Lys Tyr Phe Ala Tyr Gly Thr Gln His Asp Tyr Phe Asp
            395                 400                 405

His Pro Asp Ala Ile Gly Trp Thr Arg Glu Gly Asp Gln Ser Val Ala
            410                 415                 420

Ala Ser Gly Leu Ala Ala Leu Ile Thr Asp Gly Pro Gly Gly Ser Lys
            425                 430                 435

Arg Met Tyr Val Gly Arg Gln His Ala Gly Glu Thr Trp His Asp Ile
            440                 445                 450

Thr Gly Asn Arg Ser Asp Ser Val Val Ile Asn Ser Asp Gly Trp Gly
455                 460                 465                 470

Glu Phe Tyr Val Asn Gly Gly Ser Val Ser Ile Tyr Val Gln Arg
            475                 480                 485

<210> SEQ ID NO 24
<211> LENGTH: 485
<212> TYPE: PRT
<213> ORGANISM: Bacillus sonorensis L12

<400> SEQUENCE: 24

Ala Ser Leu Asn Gly Thr Leu Met Gln Tyr Phe Glu Trp Asn Leu Pro
1               5                   10                  15

Asn Asp Gly Gln His Trp Lys Arg Leu Gln Asn Asp Ala Gly Tyr Leu
            20                  25                  30

Ser Asp Ile Gly Ile Thr Ala Val Trp Ile Pro Pro Ala Tyr Lys Gly
        35                  40                  45

-continued

Thr Ser Gln Ala Asp Val Gly Tyr Gly Pro Tyr Asp Leu Tyr Asp Leu
        50                  55                  60

Gly Glu Phe Leu Gln Lys Gly Thr Val Arg Thr Lys Tyr Gly Met Lys
65                  70                  75                  80

Thr Glu Leu Gln Ser Ala Val Gly Ser Leu His Ser Gln Asn Ile Gln
                85                  90                  95

Val Tyr Gly Asp Val Val Leu Asn His Lys Ala Gly Ala Asp Leu Thr
                100                 105                 110

Glu Asp Val Thr Ala Val Glu Val Asn Pro Gly Asn Arg Asn Gln Glu
                115                 120                 125

Ile Ser Gly Glu Tyr Arg Ile Lys Ala Trp Thr Gly Phe Asn Phe Pro
130                 135                 140

Gly Arg Gly Ser Thr Tyr Ser Asp Phe Lys Trp His Trp Tyr His Phe
145                 150                 155                 160

Asp Gly Thr Asp Trp Asp Glu Ser Arg Lys Leu Asn Arg Ile Tyr Lys
                165                 170                 175

Phe Arg Gly Asp Gly Lys Ala Trp Asp Trp Glu Val Ser Ser Glu Asn
                180                 185                 190

Gly Asn Tyr Asp Tyr Leu Met Tyr Ala Asp Val Asp Tyr Asp His Pro
                195                 200                 205

Asp Val Val Ala Glu Met Lys Arg Trp Gly Thr Trp Tyr Ala Lys Glu
210                 215                 220

Leu Gln Leu Asp Gly Phe Arg Leu Asp Ala Val Lys His Ile Lys Phe
225                 230                 235                 240

Ser Phe Leu Ser Asp Trp Leu Lys Ala Val Arg Gln Ser Thr Gly Lys
                245                 250                 255

Glu Met Phe Thr Val Ala Glu Tyr Trp Gln Asn Asn Leu Gly Glu Ile
                260                 265                 270

Glu Asn Tyr Leu Gln Lys Thr Asp Phe Gln His Ser Val Phe Asp Val
                275                 280                 285

Pro Leu His Phe Asn Leu Gln Ala Ala Ser Ser His Gly Gly Ser Tyr
                290                 295                 300

Asp Met Arg Asn Leu Leu Asn Gly Thr Val Val Ser Lys His Pro Leu
305                 310                 315                 320

Lys Ala Val Thr Phe Val Asp Asn His Asp Thr Gln Pro Gly Gln Ser
                325                 330                 335

Leu Glu Ser Thr Val Gln Thr Trp Phe Lys Pro Leu Ala Tyr Ala Phe
                340                 345                 350

Ile Leu Thr Arg Glu Ala Gly Tyr Pro Gln Val Phe Tyr Gly Asp Met
                355                 360                 365

Tyr Gly Thr Lys Gly Pro Thr Ser Arg Glu Ile Pro Ser Leu Lys Ser
370                 375                 380

Lys Leu Glu Pro Ile Leu Lys Ala Arg Lys Tyr Phe Ala Tyr Gly Thr
385                 390                 395                 400

Gln His Asp Tyr Phe Asp His Pro Asp Ala Ile Gly Trp Thr Arg Glu
                405                 410                 415

Gly Asp Gln Ser Val Ala Ala Ser Gly Leu Ala Ala Leu Ile Thr Asp
                420                 425                 430

Gly Pro Gly Gly Ser Lys Arg Met Tyr Val Gly Arg Gln His Ala Gly
                435                 440                 445

Glu Thr Trp His Asp Ile Thr Gly Asn Arg Ser Asp Ser Val Val Ile
450                 455                 460

```
Asn Ser Asp Gly Trp Gly Glu Phe Tyr Val Asn Gly Ser Val Ser
465                 470                 475                 480

Ile Tyr Val Gln Arg
                485

<210> SEQ ID NO 25
<211> LENGTH: 879
<212> TYPE: DNA
<213> ORGANISM: Bacillus subtilis
<220> FEATURE:
<221> NAME/KEY: CDS
<222> LOCATION: (1)..(876)
<220> FEATURE:
<221> NAME/KEY: sig_peptide
<222> LOCATION: (1)..(57)
<220> FEATURE:
<221> NAME/KEY: mat_peptide
<222> LOCATION: (58)..(876)

<400> SEQUENCE: 25 atg aag aaa atc gca ata gca gct atc act gct aca agc atc ctc gct      48
Met Lys Lys Ile Ala Ile Ala Ala Ile Thr Ala Thr Ser Ile Leu Ala
                -15                 -10                 -5 ctc agt gct tgc agc agc ggc gac aaa gaa gtt atc gca aaa aca gac      96
Leu Ser Ala Cys Ser Ser Gly Asp Lys Glu Val Ile Ala Lys Thr Asp
        -1  1               5                  10 gca ggc gat gtc aca aaa ggc gag ctt tac aca aac atg aag aaa aca     144
Ala Gly Asp Val Thr Lys Gly Glu Leu Tyr Thr Asn Met Lys Lys Thr
     15                  20                  25 gct ggc gca agc gta ctg aca cag cta gtg caa gaa aaa gta ttg gac     192
Ala Gly Ala Ser Val Leu Thr Gln Leu Val Gln Glu Lys Val Leu Asp
 30                  35                  40                  45 aag aag tat aaa gtt tcg gat aaa gaa att gac aac aag ctg aaa gaa     240
Lys Lys Tyr Lys Val Ser Asp Lys Glu Ile Asp Asn Lys Leu Lys Glu
                 50                  55                  60 tac aaa acg cag ctt ggc gat caa tat act gcc ctc gaa aag caa tat     288
Tyr Lys Thr Gln Leu Gly Asp Gln Tyr Thr Ala Leu Glu Lys Gln Tyr
             65                  70                  75 ggc aaa gat tac ctg aaa gaa caa gta aaa tat gaa ttg ctg aca caa     336
Gly Lys Asp Tyr Leu Lys Glu Gln Val Lys Tyr Glu Leu Leu Thr Gln
         80                  85                  90 aaa gcg gct aaa gat aac atc aaa gta aca gac gcc gat atc aaa gag     384
Lys Ala Ala Lys Asp Asn Ile Lys Val Thr Asp Ala Asp Ile Lys Glu
     95                 100                 105 tac tgg gaa ggc tta aaa ggc aaa atc cgt gca agc cac atc ctt gtt     432
Tyr Trp Glu Gly Leu Lys Gly Lys Ile Arg Ala Ser His Ile Leu Val
110                 115                 120                 125 gct gat aaa aag aca gct gaa gaa gta gag aaa aag ctg aaa aaa ggc     480
Ala Asp Lys Lys Thr Ala Glu Glu Val Glu Lys Lys Leu Lys Lys Gly
                130                 135                 140 gag aag ttt gaa gac ctt gcg aaa gaa tac tca aca gac agc tct gct     528
Glu Lys Phe Glu Asp Leu Ala Lys Glu Tyr Ser Thr Asp Ser Ser Ala
            145                 150                 155 tca aaa ggc ggg gat ctt ggc tgg ttc gca aaa gaa ggc caa atg gac     576
Ser Lys Gly Gly Asp Leu Gly Trp Phe Ala Lys Glu Gly Gln Met Asp
        160                 165                 170 gaa aca ttc agc aaa gct gca ttc aaa tta aaa aca ggt gaa gtc agt     624
Glu Thr Phe Ser Lys Ala Ala Phe Lys Leu Lys Thr Gly Glu Val Ser
    175                 180                 185 gat cct gtc aaa acg caa tac ggc tac cat atc att aaa aag aca gaa     672
Asp Pro Val Lys Thr Gln Tyr Gly Tyr His Ile Ile Lys Lys Thr Glu
190                 195                 200                 205
```

```
gaa cgc ggc aaa tat gat gat atg aaa aaa gaa ctg aaa tct gaa gtg      720
Glu Arg Gly Lys Tyr Asp Asp Met Lys Lys Glu Leu Lys Ser Glu Val
            210                 215                 220 ctt gaa caa aaa tta aat gac aac gca gct gtt cag gaa gct gtt caa      768
Leu Glu Gln Lys Leu Asn Asp Asn Ala Ala Val Gln Glu Ala Val Gln
                225                 230                 235 aaa gtc atg aag aag gct gac atc gaa gta aaa gat aaa gat ctg aaa      816
Lys Val Met Lys Lys Ala Asp Ile Glu Val Lys Asp Lys Asp Leu Lys
        240                 245                 250 gac aca ttt aat aca tct tca aca agc aac agc act tct tca tct tca      864
Asp Thr Phe Asn Thr Ser Ser Thr Ser Asn Ser Thr Ser Ser Ser Ser
    255                 260                 265 agc aat tct aaa taa                                                  879
Ser Asn Ser Lys
270

<210> SEQ ID NO 26
<211> LENGTH: 292
<212> TYPE: PRT
<213> ORGANISM: Bacillus subtilis

<400> SEQUENCE: 26

Met Lys Lys Ile Ala Ile Ala Ala Ile Thr Ala Thr Ser Ile Leu Ala
                -15                 -10                 -5

Leu Ser Ala Cys Ser Ser Gly Asp Lys Glu Val Ile Ala Lys Thr Asp
        -1  1                 5                  10

Ala Gly Asp Val Thr Lys Gly Glu Leu Tyr Thr Asn Met Lys Lys Thr
    15                  20                  25

Ala Gly Ala Ser Val Leu Thr Gln Leu Val Gln Glu Lys Val Leu Asp
30                  35                  40                  45

Lys Lys Tyr Lys Val Ser Asp Lys Glu Ile Asp Asn Lys Leu Lys Glu
                50                  55                  60

Tyr Lys Thr Gln Leu Gly Asp Gln Tyr Thr Ala Leu Glu Lys Gln Tyr
            65                  70                  75

Gly Lys Asp Tyr Leu Lys Glu Gln Val Lys Tyr Glu Leu Leu Thr Gln
        80                  85                  90

Lys Ala Ala Lys Asp Asn Ile Lys Val Thr Asp Ala Asp Ile Lys Glu
    95                  100                 105

Tyr Trp Glu Gly Leu Lys Gly Lys Ile Arg Ala Ser His Ile Leu Val
110                 115                 120                 125

Ala Asp Lys Lys Thr Ala Glu Glu Val Glu Lys Leu Lys Lys Lys Gly
                130                 135                 140

Glu Lys Phe Glu Asp Leu Ala Lys Glu Tyr Ser Thr Asp Ser Ser Ala
            145                 150                 155

Ser Lys Gly Gly Asp Leu Gly Trp Phe Ala Lys Glu Gly Gln Met Asp
        160                 165                 170

Glu Thr Phe Ser Lys Ala Ala Phe Lys Leu Lys Thr Gly Glu Val Ser
    175                 180                 185

Asp Pro Val Lys Thr Gln Tyr Gly Tyr His Ile Ile Lys Lys Thr Glu
190                 195                 200                 205

Glu Arg Gly Lys Tyr Asp Asp Met Lys Lys Glu Leu Lys Ser Glu Val
                210                 215                 220

Leu Glu Gln Lys Leu Asn Asp Asn Ala Ala Val Gln Glu Ala Val Gln
            225                 230                 235

Lys Val Met Lys Lys Ala Asp Ile Glu Val Lys Asp Lys Asp Leu Lys
        240                 245                 250
```

Asp Thr Phe Asn Thr Ser Ser Thr Ser Asn Ser Thr Ser Ser Ser Ser
            255                 260                 265

Ser Asn Ser Lys
270

<210> SEQ ID NO 27
<211> LENGTH: 273
<212> TYPE: PRT
<213> ORGANISM: Bacillus subtilis

<400> SEQUENCE: 27

Cys Ser Ser Gly Asp Lys Glu Val Ile Ala Lys Thr Asp Ala Gly Asp
1               5                   10                  15

Val Thr Lys Gly Glu Leu Tyr Thr Asn Met Lys Lys Thr Ala Gly Ala
            20                  25                  30

Ser Val Leu Thr Gln Leu Val Gln Glu Lys Val Leu Asp Lys Lys Tyr
        35                  40                  45

Lys Val Ser Asp Lys Glu Ile Asp Asn Lys Leu Lys Glu Tyr Lys Thr
    50                  55                  60

Gln Leu Gly Asp Gln Tyr Thr Ala Leu Glu Lys Gln Tyr Gly Lys Asp
65                  70                  75                  80

Tyr Leu Lys Glu Gln Val Lys Tyr Glu Leu Leu Thr Gln Lys Ala Ala
                85                  90                  95

Lys Asp Asn Ile Lys Val Thr Ala Asp Ile Lys Glu Tyr Trp Glu
            100                 105                 110

Gly Leu Lys Gly Lys Ile Arg Ala Ser His Ile Leu Val Ala Asp Lys
        115                 120                 125

Lys Thr Ala Glu Glu Val Glu Lys Leu Lys Lys Gly Glu Lys Phe
    130                 135                 140

Glu Asp Leu Ala Lys Glu Tyr Ser Thr Asp Ser Ser Ala Ser Lys Gly
145                 150                 155                 160

Gly Asp Leu Gly Trp Phe Ala Lys Glu Gly Gln Met Asp Glu Thr Phe
                165                 170                 175

Ser Lys Ala Ala Phe Lys Leu Lys Thr Gly Glu Val Ser Asp Pro Val
            180                 185                 190

Lys Thr Gln Tyr Gly Tyr His Ile Ile Lys Lys Thr Glu Glu Arg Gly
        195                 200                 205

Lys Tyr Asp Asp Met Lys Lys Glu Leu Lys Ser Glu Val Leu Glu Gln
    210                 215                 220

Lys Leu Asn Asp Asn Ala Ala Val Gln Glu Ala Val Gln Lys Val Met
225                 230                 235                 240

Lys Lys Ala Asp Ile Glu Val Lys Asp Lys Asp Leu Lys Asp Thr Phe
                245                 250                 255

Asn Thr Ser Ser Thr Ser Asn Ser Thr Ser Ser Ser Ser Asn Ser
            260                 265                 270

Lys

<210> SEQ ID NO 28
<211> LENGTH: 1980
<212> TYPE: DNA
<213> ORGANISM: Bacillus subtilis
<220> FEATURE:
<221> NAME/KEY: CDS
<222> LOCATION: (1)..(1977)
<220> FEATURE:
<221> NAME/KEY: sig_peptide
<222> LOCATION: (1)..(99)
<220> FEATURE:

-continued

<221> NAME/KEY: mat_peptide
<222> LOCATION: (100)..(1977)

<400> SEQUENCE: 28

| | | | | | | | | | | | | | | | | |
|---|---|---|---|---|---|---|---|---|---|---|---|---|---|---|---|---|
| atg | ttt | gca | aaa | cga | ttc | aaa | acc | tct | tta | ctg | ccg | tta | ttc | gct | gga | 48 |
| Met | Phe | Ala | Lys | Arg | Phe | Lys | Thr | Ser | Leu | Leu | Pro | Leu | Phe | Ala | Gly | |
| | | | -30 | | | | -25 | | | | -20 | | | | | |
| ttt | tta | ttg | ctg | ttt | cat | ttg | gtt | ctg | gca | gga | ccg | gcg | gct | gcg | agt | 96 |
| Phe | Leu | Leu | Leu | Phe | His | Leu | Val | Leu | Ala | Gly | Pro | Ala | Ala | Ala | Ser | |
| | | -15 | | | | | -10 | | | | | -5 | | | | |
| gct | gaa | acg | gcg | aac | aaa | tcg | aat | gag | ctt | aca | gca | ccg | tcg | atc | aaa | 144 |
| Ala | Glu | Thr | Ala | Asn | Lys | Ser | Asn | Glu | Leu | Thr | Ala | Pro | Ser | Ile | Lys | |
| -1 | 1 | | | | 5 | | | | | 10 | | | | | 15 | |
| agc | gga | acc | att | ctt | cat | gca | tgg | aat | tgg | tcg | ttc | aat | acg | tta | aaa | 192 |
| Ser | Gly | Thr | Ile | Leu | His | Ala | Trp | Asn | Trp | Ser | Phe | Asn | Thr | Leu | Lys | |
| | | | | 20 | | | | | 25 | | | | | 30 | | |
| cac | aat | atg | aag | gat | att | cat | gat | gca | gga | tat | aca | gcc | att | cag | aca | 240 |
| His | Asn | Met | Lys | Asp | Ile | His | Asp | Ala | Gly | Tyr | Thr | Ala | Ile | Gln | Thr | |
| | | | 35 | | | | | 40 | | | | | 45 | | | |
| tct | ccg | att | aac | caa | gta | aag | gaa | ggg | aat | caa | gga | gat | aaa | agc | atg | 288 |
| Ser | Pro | Ile | Asn | Gln | Val | Lys | Glu | Gly | Asn | Gln | Gly | Asp | Lys | Ser | Met | |
| | | 50 | | | | | 55 | | | | | 60 | | | | |
| tcg | aac | tgg | tac | tgg | ctg | tat | cag | ccg | aca | tcg | tat | caa | att | ggc | aac | 336 |
| Ser | Asn | Trp | Tyr | Trp | Leu | Tyr | Gln | Pro | Thr | Ser | Tyr | Gln | Ile | Gly | Asn | |
| | 65 | | | | | 70 | | | | | 75 | | | | | |
| cgt | tac | tta | ggt | act | gaa | caa | gaa | ttt | aaa | gaa | atg | tgt | gca | gcc | gct | 384 |
| Arg | Tyr | Leu | Gly | Thr | Glu | Gln | Glu | Phe | Lys | Glu | Met | Cys | Ala | Ala | Ala | |
| 80 | | | | | 85 | | | | | 90 | | | | | 95 | |
| gaa | gaa | tat | ggc | ata | aag | gtc | att | gtt | gac | gcg | gtc | atc | aat | cat | acc | 432 |
| Glu | Glu | Tyr | Gly | Ile | Lys | Val | Ile | Val | Asp | Ala | Val | Ile | Asn | His | Thr | |
| | | | | 100 | | | | | 105 | | | | | 110 | | |
| acc | agt | gat | tat | gcc | gcg | att | tcc | aat | gag | gtt | aag | agt | att | cca | aac | 480 |
| Thr | Ser | Asp | Tyr | Ala | Ala | Ile | Ser | Asn | Glu | Val | Lys | Ser | Ile | Pro | Asn | |
| | | | 115 | | | | | 120 | | | | | 125 | | | |
| tgg | aca | cat | gga | aac | aca | caa | att | aaa | aac | tgg | tct | gat | cga | tgg | gat | 528 |
| Trp | Thr | His | Gly | Asn | Thr | Gln | Ile | Lys | Asn | Trp | Ser | Asp | Arg | Trp | Asp | |
| | | 130 | | | | | 135 | | | | | 140 | | | | |
| gtc | acg | cag | aat | tca | ttg | ctc | ggg | ctg | tat | gac | tgg | aat | aca | caa | aat | 576 |
| Val | Thr | Gln | Asn | Ser | Leu | Leu | Gly | Leu | Tyr | Asp | Trp | Asn | Thr | Gln | Asn | |
| | 145 | | | | | 150 | | | | | 155 | | | | | |
| aca | caa | gta | cag | tcc | tat | ctg | aaa | cgg | ttc | tta | gac | agg | gca | ttg | aat | 624 |
| Thr | Gln | Val | Gln | Ser | Tyr | Leu | Lys | Arg | Phe | Leu | Asp | Arg | Ala | Leu | Asn | |
| 160 | | | | | 165 | | | | | 170 | | | | | 175 | |
| gac | ggg | gca | gac | ggt | ttt | cga | ttt | gat | gcc | gcc | aaa | cat | ata | gag | ctt | 672 |
| Asp | Gly | Ala | Asp | Gly | Phe | Arg | Phe | Asp | Ala | Ala | Lys | His | Ile | Glu | Leu | |
| | | | | 180 | | | | | 185 | | | | | 190 | | |
| cca | gat | gat | ggc | agt | tac | ggc | agt | caa | ttt | tgg | ccg | aat | atc | aca | aat | 720 |
| Pro | Asp | Asp | Gly | Ser | Tyr | Gly | Ser | Gln | Phe | Trp | Pro | Asn | Ile | Thr | Asn | |
| | | | 195 | | | | | 200 | | | | | 205 | | | |
| aca | tct | gca | gag | ttc | caa | tac | gga | gaa | atc | ctg | cag | gat | agt | gcc | tcc | 768 |
| Thr | Ser | Ala | Glu | Phe | Gln | Tyr | Gly | Glu | Ile | Leu | Gln | Asp | Ser | Ala | Ser | |
| | | 210 | | | | | 215 | | | | | 220 | | | | |
| aga | gat | gct | gca | tat | gcg | aat | tat | atg | gat | gtg | aca | gcg | tct | aac | tat | 816 |
| Arg | Asp | Ala | Ala | Tyr | Ala | Asn | Tyr | Met | Asp | Val | Thr | Ala | Ser | Asn | Tyr | |
| | 225 | | | | | 230 | | | | | 235 | | | | | |
| ggg | cat | tcc | ata | agg | tcc | gct | tta | aag | aat | cgt | aat | ctg | ggc | gtg | tcg | 864 |
| Gly | His | Ser | Ile | Arg | Ser | Ala | Leu | Lys | Asn | Arg | Asn | Leu | Gly | Val | Ser | |
| 240 | | | | | 245 | | | | | 250 | | | | | 255 | |
| aat | atc | tcc | cac | tat | gca | tct | gat | gtg | tct | gcg | gac | aag | cta | gtg | aca | 912 |
| Asn | Ile | Ser | His | Tyr | Ala | Ser | Asp | Val | Ser | Ala | Asp | Lys | Leu | Val | Thr | |

-continued

```
              260                 265                 270
tgg gta gag tcg cat gat acg tat gcc aat gat gat gaa gag tcg aca        960
Trp Val Glu Ser His Asp Thr Tyr Ala Asn Asp Asp Glu Glu Ser Thr
            275                 280                 285 tgg atg agc gat gat gat atc cgt tta ggc tgg gcg gtg ata gct tct       1008
Trp Met Ser Asp Asp Asp Ile Arg Leu Gly Trp Ala Val Ile Ala Ser
            290                 295                 300 cgt tca ggc agt acg cct ctt ttc ttt tcc aga cct gag gga ggc gga       1056
Arg Ser Gly Ser Thr Pro Leu Phe Phe Ser Arg Pro Glu Gly Gly Gly
            305                 310                 315 aat ggt gtg agg ttc ccg ggg aaa agc caa ata ggc gat cgc ggg agt       1104
Asn Gly Val Arg Phe Pro Gly Lys Ser Gln Ile Gly Asp Arg Gly Ser
320                 325                 330                 335 gct tta ttt gaa gat cag gct atc act gcg gtc aat aga ttt cac aat       1152
Ala Leu Phe Glu Asp Gln Ala Ile Thr Ala Val Asn Arg Phe His Asn
                340                 345                 350 gtg atg gct gga cag cct gag gaa ctc tcg aac ccg aat gga aac aac       1200
Val Met Ala Gly Gln Pro Glu Glu Leu Ser Asn Pro Asn Gly Asn Asn
                355                 360                 365 cag ata ttt atg aat cag cgc ggc tca cat ggc gtt gtg ctg gca aat       1248
Gln Ile Phe Met Asn Gln Arg Gly Ser His Gly Val Val Leu Ala Asn
                370                 375                 380 gca ggt tca tcc tct gtc tct atc aat acg gca aca aaa ttg cct gat       1296
Ala Gly Ser Ser Ser Val Ser Ile Asn Thr Ala Thr Lys Leu Pro Asp
385                 390                 395 ggc agg tat gac aat aaa gct gga gcg ggt tca ttt caa gtg aac gat       1344
Gly Arg Tyr Asp Asn Lys Ala Gly Ala Gly Ser Phe Gln Val Asn Asp
400                 405                 410                 415 ggt aaa ctg aca ggc acg atc aat gcc agg tct gta gct gtg ctt tat       1392
Gly Lys Leu Thr Gly Thr Ile Asn Ala Arg Ser Val Ala Val Leu Tyr
                420                 425                 430 cct gat gat att gca aaa gcg cct cat gtt ttc ctt gag aat tac aaa       1440
Pro Asp Asp Ile Ala Lys Ala Pro His Val Phe Leu Glu Asn Tyr Lys
                435                 440                 445 aca ggt gta aca cat tct ttc aat gat caa ctg acg att acc ttg cgt       1488
Thr Gly Val Thr His Ser Phe Asn Asp Gln Leu Thr Ile Thr Leu Arg
                450                 455                 460 gca gat gcg aat aca aca aaa gcc gtt tat caa atc aat aat gga cca       1536
Ala Asp Ala Asn Thr Thr Lys Ala Val Tyr Gln Ile Asn Asn Gly Pro
465                 470                 475 gag acg gcg ttt aag gat gga gat caa ttc aca atc gga aaa gga gat       1584
Glu Thr Ala Phe Lys Asp Gly Asp Gln Phe Thr Ile Gly Lys Gly Asp
480                 485                 490                 495 cca ttt ggc aaa aca tac acc atc atg tta aaa gga acg aac agt gat       1632
Pro Phe Gly Lys Thr Tyr Thr Ile Met Leu Lys Gly Thr Asn Ser Asp
                500                 505                 510 ggt gta acg agg acc gag aaa tac agt ttt gtt aaa aga gat cca gcg       1680
Gly Val Thr Arg Thr Glu Lys Tyr Ser Phe Val Lys Arg Asp Pro Ala
                515                 520                 525 tcg gcc aaa acc atc ggc tat caa aat ccg aat cat tgg agc cag gta       1728
Ser Ala Lys Thr Ile Gly Tyr Gln Asn Pro Asn His Trp Ser Gln Val
                530                 535                 540 aat gct tat atc tat aaa cat gat ggg agc cga gta att gaa ttg acc       1776
Asn Ala Tyr Ile Tyr Lys His Asp Gly Ser Arg Val Ile Glu Leu Thr
545                 550                 555 gga tct tgg cct gga aaa cca atg act aaa aat gca gac gga att tac       1824
Gly Ser Trp Pro Gly Lys Pro Met Thr Lys Asn Ala Asp Gly Ile Tyr
                560                 565                 570                 575 acg ctg acg ctg cct gcg gac acg gat aca acc aac gca aaa gtg att       1872
```

```
Thr Leu Thr Leu Pro Ala Asp Thr Asp Thr Thr Asn Ala Lys Val Ile
            580                 585                 590 ttt aat aat ggc agc gcc caa gtg ccc ggt cag aat cag cct ggc ttt      1920
Phe Asn Asn Gly Ser Ala Gln Val Pro Gly Gln Asn Gln Pro Gly Phe
            595                 600                 605 gat tac gtg cta aat ggt tta tat aat gac tcg ggc tta agc ggt tct      1968
Asp Tyr Val Leu Asn Gly Leu Tyr Asn Asp Ser Gly Leu Ser Gly Ser
            610                 615                 620 ctt ccc cat taa                                                       1980
Leu Pro His
    625

<210> SEQ ID NO 29
<211> LENGTH: 659
<212> TYPE: PRT
<213> ORGANISM: Bacillus subtilis

<400> SEQUENCE: 29

Met Phe Ala Lys Arg Phe Lys Thr Ser Leu Leu Pro Leu Phe Ala Gly
            -30                 -25                 -20

Phe Leu Leu Leu Phe His Leu Val Leu Ala Gly Pro Ala Ala Ala Ser
            -15                 -10                  -5

Ala Glu Thr Ala Asn Lys Ser Asn Glu Leu Thr Ala Pro Ser Ile Lys
 -1  1                   5                  10                  15

Ser Gly Thr Ile Leu His Ala Trp Asn Trp Ser Phe Asn Thr Leu Lys
             20                  25                  30

His Asn Met Lys Asp Ile His Asp Ala Gly Tyr Thr Ala Ile Gln Thr
             35                  40                  45

Ser Pro Ile Asn Gln Val Lys Glu Gly Asn Gln Gly Asp Lys Ser Met
     50                  55                  60

Ser Asn Trp Tyr Trp Leu Tyr Gln Pro Thr Ser Tyr Gln Ile Gly Asn
 65                  70                  75

Arg Tyr Leu Gly Thr Glu Gln Glu Phe Lys Glu Met Cys Ala Ala Ala
 80                  85                  90                  95

Glu Glu Tyr Gly Ile Lys Val Ile Val Asp Ala Val Ile Asn His Thr
                    100                 105                 110

Thr Ser Asp Tyr Ala Ala Ile Ser Asn Glu Val Lys Ser Ile Pro Asn
            115                 120                 125

Trp Thr His Gly Asn Thr Gln Ile Lys Asn Trp Ser Asp Arg Trp Asp
            130                 135                 140

Val Thr Gln Asn Ser Leu Leu Gly Leu Tyr Asp Trp Asn Thr Gln Asn
145                 150                 155

Thr Gln Val Gln Ser Tyr Leu Lys Arg Phe Leu Asp Arg Ala Leu Asn
160                 165                 170                 175

Asp Gly Ala Asp Gly Phe Arg Phe Asp Ala Ala Lys His Ile Glu Leu
                    180                 185                 190

Pro Asp Asp Gly Ser Tyr Gly Ser Gln Phe Trp Pro Asn Ile Thr Asn
            195                 200                 205

Thr Ser Ala Glu Phe Gln Tyr Gly Glu Ile Leu Gln Asp Ser Ala Ser
            210                 215                 220

Arg Asp Ala Ala Tyr Ala Asn Tyr Met Asp Val Thr Ala Ser Asn Tyr
225                 230                 235

Gly His Ser Ile Arg Ser Ala Leu Lys Asn Arg Asn Leu Gly Val Ser
240                 245                 250                 255

Asn Ile Ser His Tyr Ala Ser Asp Val Ser Ala Asp Lys Leu Val Thr
                    260                 265                 270
```

Trp Val Glu Ser His Asp Thr Tyr Ala Asn Asp Asp Glu Glu Ser Thr
            275                 280                 285

Trp Met Ser Asp Asp Ile Arg Leu Gly Trp Ala Val Ile Ala Ser
        290                 295                 300

Arg Ser Gly Ser Thr Pro Leu Phe Phe Ser Arg Pro Glu Gly Gly Gly
    305                 310                 315

Asn Gly Val Arg Phe Pro Gly Lys Ser Gln Ile Gly Asp Arg Gly Ser
320                 325                 330                 335

Ala Leu Phe Glu Asp Gln Ala Ile Thr Ala Val Asn Arg Phe His Asn
            340                 345                 350

Val Met Ala Gly Gln Pro Glu Glu Leu Ser Asn Pro Asn Gly Asn Asn
        355                 360                 365

Gln Ile Phe Met Asn Gln Arg Gly Ser His Gly Val Val Leu Ala Asn
    370                 375                 380

Ala Gly Ser Ser Val Ser Ile Asn Thr Ala Thr Lys Leu Pro Asp
385                 390                 395

Gly Arg Tyr Asp Asn Lys Ala Gly Ala Gly Ser Phe Gln Val Asn Asp
400                 405                 410                 415

Gly Lys Leu Thr Gly Thr Ile Asn Ala Arg Ser Val Ala Val Leu Tyr
            420                 425                 430

Pro Asp Asp Ile Ala Lys Ala Pro His Val Phe Leu Glu Asn Tyr Lys
        435                 440                 445

Thr Gly Val Thr His Ser Phe Asn Asp Gln Leu Thr Ile Thr Leu Arg
    450                 455                 460

Ala Asp Ala Asn Thr Thr Lys Ala Val Tyr Gln Ile Asn Asn Gly Pro
465                 470                 475

Glu Thr Ala Phe Lys Asp Gly Asp Gln Phe Thr Ile Gly Lys Gly Asp
480                 485                 490                 495

Pro Phe Gly Lys Thr Tyr Thr Ile Met Leu Lys Gly Thr Asn Ser Asp
            500                 505                 510

Gly Val Thr Arg Thr Glu Lys Tyr Ser Phe Val Lys Arg Asp Pro Ala
        515                 520                 525

Ser Ala Lys Thr Ile Gly Tyr Gln Asn Pro Asn His Trp Ser Gln Val
    530                 535                 540

Asn Ala Tyr Ile Tyr Lys His Asp Gly Ser Arg Val Ile Glu Leu Thr
545                 550                 555

Gly Ser Trp Pro Gly Lys Pro Met Thr Lys Asn Ala Asp Gly Ile Tyr
560                 565                 570                 575

Thr Leu Thr Leu Pro Ala Asp Thr Asp Thr Thr Asn Ala Lys Val Ile
            580                 585                 590

Phe Asn Asn Gly Ser Ala Gln Val Pro Gly Gln Asn Gln Pro Gly Phe
        595                 600                 605

Asp Tyr Val Leu Asn Gly Leu Tyr Asn Asp Ser Gly Leu Ser Gly Ser
    610                 615                 620

Leu Pro His
    625

<210> SEQ ID NO 30
<211> LENGTH: 626
<212> TYPE: PRT
<213> ORGANISM: Bacillus subtilis

<400> SEQUENCE: 30

Glu Thr Ala Asn Lys Ser Asn Glu Leu Thr Ala Pro Ser Ile Lys Ser

-continued

```
1               5                   10                  15
Gly Thr Ile Leu His Ala Trp Asn Trp Ser Phe Asn Thr Leu Lys His
                20                  25                  30
Asn Met Lys Asp Ile His Asp Ala Gly Tyr Thr Ala Ile Gln Thr Ser
                35                  40                  45
Pro Ile Asn Gln Val Lys Glu Gly Asn Gln Gly Asp Lys Ser Met Ser
                50                  55                  60
Asn Trp Tyr Trp Leu Tyr Gln Pro Thr Ser Tyr Gln Ile Gly Asn Arg
65                  70                  75                  80
Tyr Leu Gly Thr Glu Gln Glu Phe Lys Glu Met Cys Ala Ala Ala Glu
                85                  90                  95
Glu Tyr Gly Ile Lys Val Ile Val Asp Ala Val Ile Asn His Thr Thr
                100                 105                 110
Ser Asp Tyr Ala Ala Ile Ser Asn Glu Val Lys Ser Ile Pro Asn Trp
                115                 120                 125
Thr His Gly Asn Thr Gln Ile Lys Asn Trp Ser Asp Arg Trp Asp Val
                130                 135                 140
Thr Gln Asn Ser Leu Leu Gly Leu Tyr Asp Trp Asn Thr Gln Asn Thr
145                 150                 155                 160
Gln Val Gln Ser Tyr Leu Lys Arg Phe Leu Asp Arg Ala Leu Asn Asp
                165                 170                 175
Gly Ala Asp Gly Phe Arg Phe Asp Ala Ala Lys His Ile Glu Leu Pro
                180                 185                 190
Asp Asp Gly Ser Tyr Gly Ser Gln Phe Trp Pro Asn Ile Thr Asn Thr
                195                 200                 205
Ser Ala Glu Phe Gln Tyr Gly Glu Ile Leu Gln Asp Ser Ala Ser Arg
                210                 215                 220
Asp Ala Ala Tyr Ala Asn Tyr Met Asp Val Thr Ala Ser Asn Tyr Gly
225                 230                 235                 240
His Ser Ile Arg Ser Ala Leu Lys Asn Arg Asn Leu Gly Val Ser Asn
                245                 250                 255
Ile Ser His Tyr Ala Ser Asp Val Ser Ala Asp Lys Leu Val Thr Trp
                260                 265                 270
Val Glu Ser His Asp Thr Tyr Ala Asn Asp Asp Glu Glu Ser Thr Trp
                275                 280                 285
Met Ser Asp Asp Asp Ile Arg Leu Gly Trp Ala Val Ile Ala Ser Arg
                290                 295                 300
Ser Gly Ser Thr Pro Leu Phe Phe Ser Arg Pro Glu Gly Gly Gly Asn
305                 310                 315                 320
Gly Val Arg Phe Pro Gly Lys Ser Gln Ile Gly Asp Arg Gly Ser Ala
                325                 330                 335
Leu Phe Glu Asp Gln Ala Ile Thr Ala Val Asn Arg Phe His Asn Val
                340                 345                 350
Met Ala Gly Gln Pro Glu Glu Leu Ser Asn Pro Asn Gly Asn Asn Gln
                355                 360                 365
Ile Phe Met Asn Gln Arg Gly Ser His Gly Val Val Leu Ala Asn Ala
                370                 375                 380
Gly Ser Ser Ser Val Ser Ile Asn Thr Ala Thr Lys Leu Pro Asp Gly
385                 390                 395                 400
Arg Tyr Asp Asn Lys Ala Gly Ala Gly Ser Phe Gln Val Asn Asp Gly
                405                 410                 415
Lys Leu Thr Gly Thr Ile Asn Ala Arg Ser Val Ala Val Leu Tyr Pro
                420                 425                 430
```

Asp Asp Ile Ala Lys Ala Pro His Val Phe Leu Glu Asn Tyr Lys Thr
        435                 440                 445

Gly Val Thr His Ser Phe Asn Asp Gln Leu Thr Ile Thr Leu Arg Ala
    450                 455                 460

Asp Ala Asn Thr Thr Lys Ala Val Tyr Gln Ile Asn Asn Gly Pro Glu
465                 470                 475                 480

Thr Ala Phe Lys Asp Gly Asp Gln Phe Thr Ile Gly Lys Gly Asp Pro
                485                 490                 495

Phe Gly Lys Thr Tyr Thr Ile Met Leu Lys Gly Thr Asn Ser Asp Gly
                500                 505                 510

Val Thr Arg Thr Glu Lys Tyr Ser Phe Val Lys Arg Asp Pro Ala Ser
        515                 520                 525

Ala Lys Thr Ile Gly Tyr Gln Asn Pro Asn His Trp Ser Gln Val Asn
        530                 535                 540

Ala Tyr Ile Tyr Lys His Asp Gly Ser Arg Val Ile Glu Leu Thr Gly
545                 550                 555                 560

Ser Trp Pro Gly Lys Pro Met Thr Lys Asn Ala Asp Gly Ile Tyr Thr
                565                 570                 575

Leu Thr Leu Pro Ala Asp Thr Asp Thr Thr Asn Ala Lys Val Ile Phe
                580                 585                 590

Asn Asn Gly Ser Ala Gln Val Pro Gly Gln Asn Gln Pro Gly Phe Asp
        595                 600                 605

Tyr Val Leu Asn Gly Leu Tyr Asn Asp Ser Gly Leu Ser Gly Ser Leu
        610                 615                 620

Pro His
625

<210> SEQ ID NO 31
<211> LENGTH: 768
<212> TYPE: DNA
<213> ORGANISM: Artificial Sequence
<220> FEATURE:
<223> OTHER INFORMATION: sigF

<400> SEQUENCE: 31

```
atggatgtgg aggttaagaa aaacggcaaa aacgctcagc tgaaggatca tgaagtaaag    60
gaattaatca acaaagcca aatggcgac cagcaggcaa gagacctcct catagaaaaa    120
aacatgcgtc ttgtttggtc tgtcgtacag cggtttttaa acagaggata tgagcctgac    180
gatctcttcc agatcggctg catcgggctg ttaaaatctg ttgacaaatt tgatttaacc    240
tatgatgtgc gttttcaac gtatgcagtg ccgatgatta tcggagaaat ccaacgattt    300
atccgtgatg acggaaccgt aaaggtatca cggtcattaa aagagcttgg aaacaaaatc    360
cggcgcgcga aggatgagct ttcgaaaaca ctgggcagag tgccgacggt gcaggagatc    420
gctgaccatt tggagattga agctgaggat gttgtactgg cccaagaggc ggtaagggct    480
ccatcttcga ttcacgaaac cgtttatgaa aatgacggag atccgattac ctgcttgat    540
caaatcgctg acaactcaga gaaaaatgg tttgacaaaa ttgcgctgaa agaagcgatc    600
agcgatttgg aggaagggga aaactaatc gtctatctca gatattataa agaccagaca    660
cagtccgagg tggctgagcg gctcgggatc tctcaggtgc aggtttccag gcttgaaaag    720
aaaatattaa aacagatcaa ggttcaaatg gatcatacgg atggctag                768
```

<210> SEQ ID NO 32
<211> LENGTH: 471

```
<212> TYPE: DNA
<213> ORGANISM: Artificial Sequence
<220> FEATURE:
<223> OTHER INFORMATION: sigF delta297bp

<400> SEQUENCE: 32
atggatgtgg aggttaagaa aaacggcaaa aacgctcagc tgaaggatca tgaagtaaag      60
gaattaatca aacaaagcca aaatggcgac cagcaggcaa gagacctcct catagaaaaa     120
aacatgcgtc ttgtttggtc tgtcgtacag cggtttttaa acagaggata tgagcctgac     180
gatctcttcc agatcggctg catcgggctg aaaatgacg gagatccgat taccctgctt      240
gatcaaatcg ctgacaactc agaagaaaaa tggtttgaca aaattgcgct gaaagaagcg     300
atcagcgatt tggaggaaag ggaaaaacta atcgtctatc tcagatatta taaagaccag     360
acacagtccg aggtggctga gcggctcggg atctctcagg tgcaggtttc caggcttgaa     420
aagaaaatat taaaacagat caaggttcaa atggatcata cggatggcta g              471

<210> SEQ ID NO 33
<211> LENGTH: 17422
<212> TYPE: DNA
<213> ORGANISM: Artificial Sequence
<220> FEATURE:
<223> OTHER INFORMATION: SOE PCR product for integration of a gene
      coding for PrsA from Bacillus licheniformis in pel of AN2, AQG91

<400> SEQUENCE: 33
gtctcacttc cttactgcgt ctggttgcaa aaacgaagaa gcaaggattc ccctcgcttc       60
tcatttgtcc tatttattat acactttttt aggcacatct ttggcgcttg tttcactaga     120
cttgatgcct ctgaatcttg tccaagtgtc acggtccgca tcatagactt gtccattttt     180
caccgctttg agattttcc agagcgggtt cgttttccac tcatctacaa tggttttgcc      240
ttcgttggct gagatgaaca aaatatcagg atcgattttg ctcaattgct caaggctgac     300
ctcttgatag gcgttatctg acttcacagc gtgtgtaaag cctagcattt taaagatttc     360
tccgtcatag gatgatgatg tatgaagctg gaaggaatcc gctcttgcaa cgccgagaac     420
gatgttgcgg ttttcatctt tcggaagttc ggcttttaga tcgttgatga cttttatgtg     480
ctcggcaagc ttttctttc cttcatcttc tttatttaat gctttagcaa tggtcgtaaa      540
gctgtcgatc gtttcgtcat atgtcgcttc acggcttttt aattcaatcg tcggggcgat     600
ttttttcagc tgtttataaa tgttttttatg gcgctcagcg tcagcgatga ttaaatcagg     660
cttcaaggaa ctgatgacct caagattggg ttcgctgcgt gtgcctacag atgtgtaatc     720
aatggagctg ccgacaagct ttttaatcat atctttttg ttgtcatctg cgatgcccac      780
cggcgtaatg ccgagattgt gaacggcatc caagaatgaa agctcaagca caaccacccg     840
ctaaggtgtg ccgcttactg tcgttttcc ttcttcgtca tggatcactc tggaatcctt      900
agactcgctt tgccgcttc cgttgttatt ctggcttgat gaacagccgg atacaatgag     960
gcaggcgagc aataaaacac tcatgatggc aatcaacttg ttagaatagg tgcgcatgtc    1020
attcttcctt ttttcagatt tagtaatgag aatcattatc acatgtaaca ctataatagc    1080
atggcttatc atgtcaatat ttttttagta aagaaagctg cgttttttact gctttctcat   1140 gaaagcatca tcagacacaa ataagtggta tgcagcgtta ccgtgtcttc gagacaaaaa    1200
cgcatgggcg ttggctttag aggtttcgaa catatcagca gtgacataag gaaggagagt    1260
gctgagataa ccgacaatt tcttttctat ttcatctgtt agtgcaaatt caatgtcgcc      1320
gatattcatg ataatcgaga aaacaaagtc gatatcgata tgaaaatgtt cctcggcaaa    1380
```

```
aaccgcaagc tcgtgaattc ctggtgaaca tccggcacgc ttatggaaaa tctgtttgac    1440
taaatcactc acaatccaag cattgtattg ctgttctggt gaaaagtatt gcattagaca    1500
tacctcctgc tcgtacggat aaaggcagcg tttcatggtc gtgtgctccg tgcagcggct    1560
tctccttaat tttgattttt ctgaaaatag gtcccgttcc tatcacttta ccatggacgg    1620
aaaacaaata gctactacca ttcctcctgt ttttctcttc aatgttctgg aatctgtttc    1680
aggtacagac gatcgggtat gaaagaaata tagaaaacat gaaggaggaa tatcgacatg    1740
aaaccagttg taaaagagta tacaaatgac gaacagctca tgaaagatgt agaggaattg    1800
cagaaaatgg gtgttgcgaa agaggatgta tacgtcttag ctcacgacga tgacagaacg    1860
gaacgcctgg ctgacaacac gaacgccaac acgatcggag ccaaagaaac aggttttaag    1920
cacgcggtgg gaaatatctt caataaaaaa ggagacgagc tccgcaataa aattcacgaa    1980
atcggttttt ctgaagatga agccgctcaa tttgaaaaac gcttagatga aggaaaagtg    2040
cttctctttg tgacagataa cgaaaaagtg aaagctggg cataaagcaa ggaaaaaacc    2100
aaaaggccaa tgtcggcctt ttggtttttt tgcggtcttt gcggtgggat tttgcagaat    2160
gccgcaatag gatagcggaa catttttcggt tctgaatgtc cctcaatttg ctattatatt    2220
tttgtgataa attggaataa aatctcacaa aatagaaaat gggggtacat agtggatgaa    2280
aaaagtgatg ttagctacgg ctttgttttt aggattgact ccagctggcg cgaacgcagc    2340
tgatttaggc caccagacgt tgggatccaa tgatggctgg ggcgcgtact cgaccggcac    2400
gacaggcgga tcaaaagcac cctcctcaaa tgtgtatacc gtcagcaaca gaaaccagct    2460
tgtctcggca ttagggaaag aaacgaacac aacgccaaaa atcatttata tcaagggaac    2520
gattgacatg aacgtggatg acaatctgaa gccgcttggc ctaaatgact ataaagatcc    2580
ggagtatgat ttggacaaat atttgaaagc ctatgatcct agcacatggg gcaaaaaaga    2640
gccgtcggga acacaagaag aagcgagagc acgctctcag aaaaaccaaa agcacgggt    2700 catggtggat atccctgcaa acacgacgat cgtcggttca gggactaacg ctaaagtcgt    2760
gggaggaaac ttccaaatca agagtgataa cgtcattatt cgcaacattg aattccagga    2820
tgcctatgac tattttccgc aatggttgta aaacgacggc cagtgaattc tgatcaaatg    2880
gttcagtgag agcgaagcga acacttgatt ttttaatttt ctatcttta taggtcatta    2940 gagtatactt atttgtccta taaactattt agcagcataa tagatttatt gaataggtca    3000
tttaagttga gcgtattaga ggaggaaaat cttggagaaa tatttgaaga acccgaacgc    3060
gtataataaa gaataataat aaatctgtag acaaattgtg aaaggatgta cttaaacgct    3120
aacggtcagc tttattgaac agtaatttaa gtatatgtcc aatctagggt aagtaaattg    3180
agtatcaata taaactttat atgaacataa tcaacgaggt gaaatcatga acgagaaaaa    3240
tataaaacac agtcaaaact ttattacttc aaaacataat atagataaaa taatgacaaa    3300
tataagatta aatgaacatg ataatatctt tgaaatcggc tcaggaaaag gccatttac    3360 ccttgaatta gtaaagaggt gtaatttcgt aactgccatt gaaatagacc ataaattatg    3420
caaaactaca gaaaataaac ttgttgatca cgataatttc caagttttaa acaaggatat    3480
attgcagttt aaatttccta aaaaccaatc ctataaaata tatggtaata taccttataa    3540
cataagtacg gatataatac gcaaaattgt ttttgatagt atagctaatg agatttattt    3600
aatcgtggaa tacgggtttg ctaaaagatt attaaataca aaacgctcat tggcattact    3660
tttaatggca gaagttgata tttctatatt aagtatggtt ccaagagaat attttcatcc    3720
```

```
taaacctaaa gtgaatagct cacttatcag attaagtaga aaaaaatcaa gaatatcaca    3780
caaagataaa caaaagtata attatttcgt tatgaaatgg gttaacaaag aatacaagaa    3840
aatatttaca aaaaatcaat ttaacaattc cttaaaacat gcaggaattg acgatttaaa    3900
caatattagc tttgaacaat tcttatctct tttcaatagc tataaattat ttaataagta    3960
ggctaatttt attgcaataa caggtgctta cttttaaaac tactgattta ttgataaata    4020
ttgaacaatt tttgggaaga ataaagcgtc ctcttgtgaa attagagaac gctttattac    4080
tttaatttag tgaaacaatt tgtaactatt gaaatagaa agaaattgtt ccttcgatag    4140
tttattaata ttagtggagc tcagtgagag cgaagcgaac acttgatttt ttaattttct    4200 atctttata ggtcattaga gtatacttat ttgtcctata aactatttag cagcataata    4260
gatttattga ataggtcatt taagttgagc atattagggg aggaaaatct tggagaaata    4320
tttgaagaac ccgagatcta gatcaggtac ctcaggatga ttgatcaccc gcggtgtaaa    4380
aaataggaat aaaggggggt tgacattatt ttactgatat gtataatata atttgtataa    4440
gaaaatgaga gggagaggaa acatgaagaa gattgcaatt gcggcgatta cagcgacaag    4500
cgtgctggct ctcagcgcat gcagcggggg agattctgag gttgttgcgg aaacaaaagc    4560
tggaaatatt acaaaagaag acctttatca aacattaaaa gacaatgccg gagcggacgc    4620
actgaacatg cttgttcagc aaaaagtact cgatgataaa tacgatgtct ccgacaaaga    4680
aatcgacaaa aagctgaacg agtacaaaaa atcaatgggt gaccagctca accagctcat    4740
tgaccaaaaa ggcgaagact tcgtcaaaga acagatcaaa tacgaacttc tgatgcaaaa    4800
agccgcaaag gataacataa aagtaaccga tgatgacgta aaagaatatt atgacggcct    4860
gaaaggcaaa atccacttaa gccacattct tgtgaaagaa aagaaaacgg ctgaagaagt    4920
tgagaaaaag ctgaaaaaag gcgaaaaatt cgaagacctt gcaaaagagt attcaactga    4980
cggtacagcc gaaaaaggcg gcgacctcgg ctgggtcggc aaagacgata acatggacaa    5040
ggatttcgtc aaagcggcat ttgctttgaa accggcgaaa atcagcggac tgtgaaaatc    5100
ccaattcggc tatcacatca ttaaaaaaga cgaagaacgc ggcaaatatg aagacatgaa    5160
aaaagagctt aaaaaagaag tccaagaaca aaagcaaaat gatcaaactg aactgcaatc    5220
cgtcattgac aaacttgtca agatgctga tttaaaagta aagacaaag agttgaaaaa    5280 acaagtcgac cagcgtcaag ctcagacaag cagcagcagc tgataaaaaa agctgtgcgg    5340
ctcattgagc cgcacagctt tttttatgcg atggaatggt tttgattttc ttcttcatgc    5400
tgctgagaac tgcgcggttc gcgtccggac agcacatcac cgaaatatta tggaagaaaa    5460
tatcagcacc atgacggcca aacggatgct tccaacggtg ctaactatat cgcgatgtcc    5520
tacaactatt atcacgatca tgataaaagc cccattttcg gatcaagtga cagcaaaacc    5580
tccgatgacg gcaaattaaa aattacgctg catcataacc gctataaaaa tattgtccag    5640
cgcgcgccga gagtccgctt cgggcaagtg cacgtataca acaactatta tgaaggaagc    5700
acaagctctt caagttatcc ttttagctat gcatggggaa tcggaaagtc atctaaaatc    5760
tatgcccaaa acaatgtcat tgacgtaccg ggactgtcag ctgctaaaac gatcagcgta    5820
ttcagcgggg gaacggcttt atatgactcc ggcacgttgc tgaacggcac acagatcaac    5880
gcatcggctg caaacgggct gagctcttct gtcggctgga cgccgtctct gcatggatcg    5940
attgatgctt ctgctaatgt gaaatcaaat gttataaatc aagcgggtgc gggtaaatta    6000
aattaagaaa gtgaaaaaca caagggtgc taacctttgt gttttttaat taattaaaat    6060
gtttattaac ttagttaagg agtagaatgg aaaagggat cggaaaacaa gtatatagga    6120
```

```
ggagacctat ttatggcttc agaaaaagac gcaggaaaac agtcagcagt aaagcttgtt    6180
ccattgctta ttactgtcgc tgtgggacta atcatctggt ttattcccgc tccgtccgga    6240
cttgaaccta aagcttggca tttgtttgcg attttgtcg caacaattat cggctttatc    6300
tccaagccct tgccaatggg tgcaattgca attttgcat tggcggttac tgcactaact    6360
ggaacactat caattgagga tacattaagc ggattcggga ataagaccat ttggcttatc    6420
gttatcgcat tctttatttc ccggggattt atcaaaaccg gtctcggtgc gagaatttcg    6480
tatgtattcg ttcagaaatt cggaaaaaaa acccttggac tttcttattc actgctattc    6540
agtgatttaa tactttcacc tgctattcca agtaatacgg cgcgtgcagg aggcattata    6600
tttcctatta tcagatcatt atccgaaaca ttcggatcaa gcccggcaaa tggaacagag    6660
agaaaaatcg gtgcattctt attaaaaacc ggttttcagg ggaatctgat cacatctgct    6720
atgttcctga cagcgatggc ggcgaacccg ctgattgcca agctggccca tgatgtcgca    6780
ggggtggact aacatggac aagctgggca attgccgcga ttgtaccggg acttgtaagc    6840
ttaatcatca cgccgcttgt gatttacaaa ctgtatccgc cggaaatcaa agaaacaccg    6900
gatgcggcga aaatcgcaac agaaaaactg aaagaaatgg gaccgttcaa aaaatcggag    6960 cttttccatgg ttatcgtgtt tcttttggtg cttgtgctgt ggattttttgg cggcagcttc    7020 aacatcgacg ctaccacaac cgcattgatc ggtttggccg ttctcttatt atcacaagtt    7080
ctgacttggg atgatatcaa gaaagaacag ggcgcttggg atacgctcac ttggtttgcg    7140
gcgcttgtca tgctcgccaa cttcttgaat gaattaggca tggtgtcttg gttcagtaat    7200
gccatgaaat catccgtatc agggttctct tggattgtgg cattcatcat tttaattgtt    7260
gtgtattatt actctcacta tttctttgca agtgcgacag cccacatcag tgcgatgtat    7320
tcagcatttt tggctgtcgt cgtggcagcg ggcgcaccgc cgcttttagc agcgctgagc    7380
ctcgcgttca tcagcaacct gttcgggtca acgactcact acggttctgg agcggctccg    7440
gtcttcttcg gagcaggcta catcccgcaa ggcaaatggt ggtccatcgg atttatcctg    7500
tcgattgttc atatcatcgt atggcttgtg atcggcggat tatggtggaa agtactagga    7560
atatggtaga aagaaaaagg cagacgcggt ctgcctttt ttattttcac tccttcgtaa    7620
gaaaatggat tttgaaaaat gagaaaattc cctgtgaaaa atggtatgat ctaggtagaa    7680
aggacggctg gtgctgtggt gaaaagcgg ttccattttt ccctgcaaac aaaataatg    7740 gggctgattg cggctctgct ggtctttgtc attggtgtgc tgaccattac gttagccgtt    7800
cagcatacac agggagaacg gagacaggca gagcagctgg cggttcaaac ggcgagaacc    7860
atttcctata tgccgccggt taaagagctc attgagagaa aagacggaca tgcggctcag    7920
acgcaagagg tcattgaaca aatgaaagaa cagactggtg cgtttgccat ttatgttttg    7980
aacgaaaaag gagacattcg cagcgcctct ggaaaaagcg gattaaagaa actggagcgc    8040
agcagagaaa ttttgtttgg cggttcgcat gtttctgaaa caaaagcgga tggacgaaga    8100
gtgatcagag ggagcgcgcc gattataaaa gaacagaagg gatacagcca agtgatcggc    8160
agcgtgtctg ttgatttcct gcaaacggag acagagcaaa gcatcaaaaa gcatttgaga    8220
aatttgagtg tgattgctgt gcttgtactg ctgctcggat ttattggcgc cgccgtgctg    8280
gcgaaaagca tcagaaagga tacgctcggg cttgaaccgc atgagatcgc ggctctatat    8340
cgtgagagga acgcaatgct tttcgcgatt cgagaaggga ttattgccac caatcgtgaa    8400
ggcgtcgtca ccatgatgaa cgtatcggcg gccgagatgc tgaagctgcc cgagcctgtg    8460
```

```
atccatcttc ctatagatga cgtcatgccg ggagcagggc tgatgtctgt gcttgaaaaa    8520
ggagaaatgc tgccgaacca ggaagtaagc gtcaacgatc aagtgtttat tatcaatacg    8580
aaagtgatga atcaaggcgg gcaggcgtat gggattgtcg tcagcttcag ggagaaaaca    8640
gagctgaaga agctgatcga cacattgaca gaggttcgca aatattcaga ggatctcagg    8700
gcgcagactc agtctcactt ccttactgcg tctggttgca aaaacgaaga agcaaggatt    8760
cccctcgctt ctcatttgtc ctatttatta tacactttt taggcacatc tttggcgctt    8820
gtttcactag acttgatgcc tctgaatctt gtccaagtgt cacggtccgc atcatagact    8880
tgtccatttt tcaccgcttt gagattttc cagagcgggt tcgttttcca ctcatctaca    8940
atggttttgc cttcgttggc tgagatgaac aaaatatcag gatcgatttt gctcaattgc    9000
tcaaggctga cctcttgata ggcgttatct gacttcacag cgtgtgtaaa gcctagcatt    9060
ttaaagattt ctccgtcata ggatgatgat gtatgaagct ggaaggaatc cgctcttgca    9120
acgccgagaa cgatgttgcg gttttcatct ttcggaagtt cggcttttag atcgttgatg    9180
acttttatgt gctcggcaag cttttctttt ccttcatctt ctttatttaa tgctttagca    9240
atggtcgtaa agctgtcgat cgtttcgtca tatgtcgctt cacggctttt taattcaatc    9300
gtcggggcga tttttttcag ctgtttataa atgtttttat ggcgctcagc gtcagcgatg    9360
attaaatcag gcttcaagga actgatgacc tcaagattgg gttcgctgcg tgtgcctaca    9420
gatgtgtaat caatggagct gccgacaagc ttttaatca tatctttttt gttgtcatct    9480
gcgatgccca ccggcgtaat gccgagattg tgaacggcat ccaagaatga aagctcaagc    9540
acaaccaccc gctaaggtgt gccgcttact gtcgtttttc cttcttcgtc atggatcact    9600
ctggaatcct tagactcgct tttgccgctt ccgttgttat tctggcttga tgaacagccg    9660
gatacaatga ggcaggcgag caataaaaca ctcatgatgg caatcaactt gttagaatag    9720
gtgcgcatgt cattcttcct ttttcagat ttagtaatga gaatcattat cacatgtaac    9780
actataatag catggcttat catgtcaata ttttttagt aaagaaagct gcgttttac    9840
tgcttctca tgaaagcatc atcagacaca aataagtggt atgcagcgtt accgtgtctt    9900
cgagacaaaa acgcatgggc gttggcttta gaggtttcga acatatcagc agtgacataa    9960
ggaaggagag tgctgagata accggacaat ttctttcta tttcatctgt tagtgcaaat   10020
tcaatgtcgc cgatattcat gataatcgag aaaacaaagt cgatatcgat atgaaaatgt   10080
tcctcggcaa aaaccgcaag ctcgtgaatt cctggtgaac atccggcacg cttatggaaa   10140
atctgtttga ctaaatcact cacaatccaa gcattgtatt gctgttctgg tgaaaagtat   10200
tgcattagac atacctcctg ctcgtacgga taaaggcagc gtttcatggt cgtgtgctcc   10260
gtgcagcggc ttctccttaa ttttgatttt tctgaaaata ggtcccgttc ctatcacttt   10320
accatggacg gaaaacaaat agctactacc attcctcctg ttttctctt caatgttctg   10380
gaatctgttt caggtacaga cgatcgggta tgaaagaaat atagaaaaca tgaaggagga   10440
atatcgacat gaaaccagtt gtaaaagagt atacaaatga cgaacagctc atgaaagatg   10500
tagaggaatt gcagaaaatg ggtgttgcga agaggatgt atacgtctta gctcacgacg   10560
atgacagaac ggaacgcctg gctgacaaca cgaacgccaa cacgatcgga gccaaagaaa   10620
caggttttaa gcacgcggtg ggaaatatct tcaataaaaa aggagacgag ctccgcaata   10680
aaattcacga aatcggtttt tctgaagatg aagccgctca atttgaaaaa cgcttagatg   10740
aaggaaaagt gcttctcttt gtgacagata acgaaaagt gaaagcttgg gcataaagca   10800
aggaaaaaac caaaaggcca atgtcggcct tttggttttt ttgcggtctt tgcggtggga   10860
```

```
ttttgcagaa tgccgcaata ggatagcgga acattttcgg ttctgaatgt ccctcaattt    10920
gctattatat ttttgtgata aattggaata aaatctcaca aaatagaaaa tgggggtaca    10980
tagtggatga aaaaagtgat gttagctacg gctttgtttt taggattgac tccagctggc    11040
gcgaacgcag ctgatttagg ccaccagacg ttgggatcca atgatggctg gggcgcgtac    11100
tcgaccggca cgacaggcgg atcaaaagca ccctcctcaa atgtgtatac cgtcagcaac    11160
agaaaccagc ttgtctcggc attagggaaa gaaacgaaca caacgccaaa atcatttat    11220 atcaagggaa cgattgacat gaacgtggat gacaatctga agccgcttgg cctaaatgac    11280
tataaagatc cggagtatga tttggacaaa tatttgaaag cctatgatcc tagcacatgg    11340
ggcaaaaaag agccgtcggg aacacaagaa gaagcgagag cacgctctca gaaaaaccaa    11400
aaagcacggg tcatggtgga tatccctgca aacacgacga tcgtcggttc agggactaac    11460
gctaaagtcg tgggaggaaa cttccaaatc aagagtgata acgtcattat tcgcaacatt    11520
gaattccagg atgcctatga ctattttccg caatggttgt aaaacgacgg ccagtgaatt    11580
ctgatcaaat ggttcagtga gagcgaagcg aacacttgat tttttaattt tctatctttt    11640
ataggtcatt agagtatact tatttgtcct ataaactatt tagcagcata atagatttat    11700
tgaataggtc atttaagttg agcgtattag aggaggaaaa tcttggagaa atatttgaag    11760
aacccgaacg cgtataataa agaataataa taaatctgta gacaaattgt gaaggatgt    11820 acttaaacgc taacggtcag ctttattgaa cagtaattta agtatatgtc caatctaggg    11880
taagtaaatt gagtatcaat ataaacttta tatgaacata atcaacgagg tgaaatcatg    11940
aacgagaaaa atataaaaca cagtcaaaac tttattactt caaaacataa tatagataaa    12000
ataatgacaa atataagatt aaatgaacat gataatatct ttgaaatcgg ctcaggaaaa    12060
ggccatttta cccttgaatt agtaaagagg tgtaatttcg taactgccat tgaaatagac    12120
cataaattat gcaaaactac agaaaataaa cttgttgatc acgataattt ccaagttta    12180 aacaaggata tattgcagtt taaatttcct aaaaaccaat cctataaaat atatggtaat    12240
ataccttata acataagtac ggatataata cgcaaaattg ttttgatag tatagctaat    12300 gagatttatt taatcgtgga atacggtt gctaaaagat tattaaatac aaaacgctca    12360
ttggcattac ttttaatggc agaagttgat atttctatat taagtatggt tccaagagaa    12420 tatttcatc ctaaacctaa agtgaatagc tcacttatca gattaagtag aaaaaaatca    12480
agaatatcac acaagataa acaaaagtat aattattcg ttatgaaatg ggttaacaaa    12540
gaatacaaga aaatatttac aaaaaatcaa tttaacaatt ccttaaaaca tgcaggaatt    12600
gacgatttaa acaatattag ctttgaacaa ttcttatctc ttttcaatag ctataaatta    12660
tttaataagt aggctaattt tattgcaata acaggtgctt actttttaaaa ctactgattt    12720 attgataaat attgaacaat ttttgggaag aataaagcgt cctcttgtga aattagagaa    12780
cgctttatta ctttaattta gtgaaacaat ttgtaactat tgaaaataga aagaaattgt    12840
tccttcgata gtttattaat attagtggag ctcagtgaga gcgaagcgaa cacttgattt    12900 tttaatttc tatctttat aggtcattag agtatactta tttgtcctat aaactattta    12960
gcagcataat agatttattg aataggtcat ttaagttgag catattaggg gaggaaaatc    13020
ttggagaaat atttgaagaa cccgagatct agatcaggta cctcaggatg attgatcacc    13080
cgcggtgtaa aaaataggaa taaggggggg ttgacattat tttactgata tgtataatat    13140
aatttgtata agaaaatgag agggagagga aacatgaaga agattgcaat tgcggcgatt    13200
```

```
acagcgacaa gcgtgctggc tctcagcgca tgcagcgggg gagattctga ggttgttgcg    13260
gaaacaaaag ctggaaatat tacaaaagaa gacctttatc aaacattaaa agacaatgcc    13320
ggagcggacg cactgaacat gcttgttcag caaaaagtac tcgatgataa atacgatgtc    13380
tccgacaaag aaatcgacaa aaagctgaac gagtacaaaa aatcaatggg tgaccagctc    13440
aaccagctca ttgaccaaaa aggcgaagac ttcgtcaaag aacagatcaa atacgaactt    13500
ctgatgcaaa aagccgcaaa ggataacata aaagtaaccg atgatgacgt aaaagaatat    13560
tatgacggcc tgaaaggcaa aatccactta agccacattc ttgtgaaaga aaagaaaacg    13620
gctgaagaag ttgagaaaaa gctgaaaaaa ggcgaaaaat tcgaagacct tgcaaaagag    13680
tattcaactg acggtacagc cgaaaaaggc ggcgacctcg gctgggtcgg caaagacgat    13740
aacatggaca aggatttcgt caaagcggca tttgctttga aaaccggcga atcagcgga    13800 cctgtgaaat cccaattcgg ctatcacatc attaaaaaag acgaagaacg cggcaaatat    13860
gaagacatga aaaagagct taaaaagaa gtccaagaac aaaagcaaaa tgatcaaact    13920
gaactgcaat ccgtcattga caaacttgtc aaagatgctg atttaaaagt aaaagacaaa    13980
gagttgaaaa aacaagtcga ccagcgtcaa gctcagacaa gcagcagcag ctgataaaaa    14040
aagctgtgcg gctcattgag ccgcacagct tttttatgc gatggaatgg ttttgatttt    14100
cttcttcatg ctgctgagaa ctgcgcggtt cgcgtccgga cagcacatca ccgaaatatt    14160
atggaagaaa atatcagcac catgacggcc aaacggatgc ttccaacggt gctaactata    14220
tcgcgatgtc ctacaactat tatcacgatc atgataaaag ccccattttc ggatcaagtg    14280
acagcaaaac ctccgatgac ggcaaattaa aaattacgct gcatcataac cgctataaaa    14340
atattgtcca gcgcgcgccg agagtccgct tcgggcaagt gcacgtatac aacaactatt    14400
atgaaggaag cacaagctct tcaagttatc cttttagcta tgcatgggga atcggaaagt    14460
catctaaaat ctatgcccaa aacaatgtca ttgacgtacc gggactgtca gctgctaaaa    14520
cgatcagcgt attcagcggg ggaacggctt tatatgactc cggcacgttg ctgaacggca    14580
cacagatcaa cgcatcggct gcaaacgggc tgagctcttc tgtcggctgg acgccgtctc    14640
tgcatggatc gattgatgct tctgctaatg tgaaatcaaa tgttataaat caagcgggtg    14700
cgggtaaatt aaattaagaa agtgaaaaac acaagggtg ctaacctttg tgttttttaa    14760
ttaattaaaa tgtttattaa cttagttaag gagtagaatg gaaagggga tcggaaaaca    14820 agtatatagg aggagaccta tttatggctt cagaaaaaga cgcaggaaaa cagtcagcag    14880
taaagcttgt tccattgctt attactgtcg ctgtgggact aatcatctgg tttattcccg    14940
ctccgtccgg acttgaacct aaagcttggc atttgtttgc gattttgtc gcaacaatta    15000 tcggctttat ctccaagccc ttgccaatgg gtgcaattgc aatttttgca ttggcggtta    15060
ctgcactaac tggaacacta tcaattgagg atacattaag cggattcggg aataagacca    15120
tttggcttat cgttatcgca ttcttttattt cccggggatt tatcaaaacc ggtctcggtg    15180
cgagaatttc gtatgtattc gttcagaaat tcggaaaaaa aacccttgga ctttcttatt    15240
cactgctatt cagtgattta atactttcac ctgctattcc aagtaatacg gcgcgtgcag    15300
gaggcattat atttcctatt atcagatcat tatccgaaac attcggatca agcccggcaa    15360
atggaacaga gagaaaaatc ggtgcattct tattaaaaac cggttttcag gggaatctga    15420
tcacatctgc tatgttcctg acagcgatgg cggcgaaccc gctgattgcc aagctggccc    15480
atgatgtcgc aggggtggac ttaacatgga caagctgggc aattgccgcg attgtaccgg    15540
gacttgtaag cttaatcatc acgccgcttg tgatttacaa actgtatccg ccggaaatca    15600
```

```
aagaaacacc ggatgcggcg aaaatcgcaa cagaaaaact gaaagaaatg ggaccgttca    15660
aaaaatcgga gctttccatg gttatcgtgt ttcttttggt gcttgtgctg tggattttttg   15720 gcggcagctt caacatcgac gctaccacaa ccgcattgat cggtttggcc gttctcttat    15780
tatcacaagt tctgacttgg gatgatatca agaaagaaca gggcgcttgg gatacgctca    15840
cttggtttgc ggcgcttgtc atgctcgcca acttcttgaa tgaattaggc atggtgtctt    15900
ggttcagtaa tgccatgaaa tcatccgtat cagggttctc ttggattgtg cattccatca    15960
ttttaattgt tgtgtattat tactctcact atttctttgc aagtgcgaca gcccacatca    16020
gtgcgatgta ttcagcattt ttggctgtcg tcgtggcagc gggcgcaccg ccgcttttag    16080
cagcgctgag cctcgcgttc atcagcaacc tgttcgggtc aacgactcac tacggttctg    16140
gagcggctcc ggtcttcttc ggagcaggct acatcccgca aggcaaatgg tggtccatcg    16200
gatttatcct gtcgattgtt catatcatcg tatggcttgt gatcggcgga ttatggtgga    16260
aagtactagg aatatggtag aaagaaaaag gcagacgcgg tctgcctttt tttattttca    16320
ctccttcgta agaaaatgga ttttgaaaaa tgagaaaatt ccctgtgaaa aatggtatga    16380
tctaggtaga aaggacggct ggtgctgtgg tgaaaaagcg gttccatttt tccctgcaaa    16440
caaaaataat ggggctgatt gcggctctgc tggtctttgt cattggtgtg ctgaccatta    16500
cgttagccgt tcagcataca cagggagaac ggagacaggc agagcagctg gcggttcaaa    16560
cggcgagaac catttcctat atgccgccgg ttaaagagct cattgagaga aagacggac    16620 atgcggctca gacgcaagag gtcattgaac aaatgaaaga acagactggt gcgtttgcca    16680 tttatgttttt gaacgaaaaa ggagacattc gcagcgcctc tggaaaaagc ggattaaaga    16740
aactggagcg cagcagagaa attttgtttg gcggttcgca tgtttctgaa acaaaagcgg    16800
atggacgaag agtgatcaga gggagcgcgc cgattataaa agaacagaag ggatacagcc    16860
aagtgatcgg cagcgtgtct gttgattttc tgcaaacgga gacagagcaa agcatcaaaa    16920
agcatttgag aaatttgagt gtgattgctg tgcttgtact gctgctcgga tttattggcg    16980
ccgccgtgct ggcgaaaagc atcagaaagg atacgctcgg gcttgaaccg catgagatcg    17040
cggctctata tcgtgagagg aacgcaatgc ttttcgcgat tcgagaaggg attattgcca    17100
ccaatcgtga aggcgtcgtc accatgatga acgtatcggc ggccgagatg ctgaagctgc    17160
ccgagcctgt gatccatctt cctatagatg acgtcatgcc gggagcaggg ctgatgtctg    17220
tgcttgaaaa aggagaaatg ctgccgaacc aggaagtaag cgtcaacgat caagtgttta    17280
ttatcaatac gaaagtgatg aatcaaggcg gcaggcgta tgggattgtc gtcagcttca    17340
gggagaaaac agagctgaag aagctgatcg acacattgac agaggttcgc aaatattcag    17400
aggatctcag ggcgcagact ca                                            17422
```

<210> SEQ ID NO 34
<211> LENGTH: 9518
<212> TYPE: DNA
<213> ORGANISM: Artificial Sequence
<220> FEATURE:
<223> OTHER INFORMATION: SOE PCR product for integration of a gene
      coding for AmyL of Bacillus licheniformis in amyE locus of AN2,
      AQG91

<400> SEQUENCE: 34

```
gcattaacgt gcccaatgcc attgtcatat gtgaatcgtg tccgcaggaa tggttggcgc       60
gaaatgtgcc gttaacctcc tgccacagcg cgtcaatatc agcgcgtacc gctacaacag      120
```

```
gtgagcctga gccgatttcg ccgacaaccc cggtgcagtc tgaaaacgtg cgcgtccggc      180
accctaaatc ctcaagcttt tgtttcaaaa atgaagttgt ctcatattcc ttccagctga      240
cttcagggtt cgcgtgcaga tgctcgaaga tgtccataat ggtttgtttc atttcttctg      300
aaagcttttg catggtaaga aatacctcct tctatcagaa tgaattttta ccttctttac      360
tttatttata ttgaaacagg aagataggct gtatataata tagcacatat tgctactatt      420
cagaataatt aatattttca acagaggggg atggatcgaa atatgagtat gccagcagcc      480
gaaacacagc ctaagaaaaa acgtatgaca tttaaaatgc ctgacgccta tgtcctctta      540
tttatgattg ctttcatttg cgcaatcgct tcatatattg tgccggcagg tgaatttgac      600
cgcgtgacaa aggggatgt cacgaccgct gttccgggaa gctatcattc aattgaacag       660
tctccggtca gattgatcag cttttttact tctctacagg atggaatggt tggatcagca      720
cccatcatct ttctgatttt attcacaggc ggcaccattg ctattctaga aaaacgggt       780 gccatcaatg gcctgattta caatgtcatc agcaaattcc gcacaaagca attattatgt      840
atttgtattg tcggcgcatt gttctccatt ctcggaacaa ccgggattgt cgtgaattca      900
gttatcggtt gtatccccat cggcctcatt gtggcacgat ccttaaaatg ggacgcagtc      960
gcgggagccg ctgttatata catcggctgc tacgctggat ttaactccac catattatca     1020
ccgtcaccgc tcggtttatc acaatcaatc gcggagctcc ctcttttctc aggaatcggc     1080
ctgcgagttg tgatatacat atgctttttg ctgtcttcta tatttatat ctatttgtat      1140 acgagaaaat taaaaaaatc aaaagatgcc agtgtgttag aacagattg gttccctgcg      1200 gcaggaatgg gcgaagccgg taagaagaa gatcagtcag tgccgtttac cgttcgccat      1260
aagctgattt tggctgtggc gggactctca cttgtcggat ttttatacgg cgctttgaag     1320
cttggctggt cagattccca aatggctgcg acatttattt ttatttctgt ccttgccggt     1380
ttaataggcg ggcttgcggc gaacgatatt gccaaaacct tcattacggg ctgccaaagt     1440
cttgtatacg gggcgctgat tgtcgggatg gcacgaagca tttccgttat ccttgaaaat     1500
ggaaagcttc tcgatactgt cgtcaatgct ttggcttcac ttttggatgg attcagcccg     1560
attgctgggg caatcggcat gtatatcgcc agtgcgctgc ttcattttct catctcttca     1620
ggttctggcg aagccgttgt atttattcca atcctggcgc cgctcgctga tttgatggga     1680
atcacgagac aggttgcggt tgaagcggtt atgcttggag aagggtcgt caactgtgtg      1740 aacccgacat ccggcgttct catggcggtg cttgccgcca gcggtattcc gtatgtcaag     1800
tggctgcggt ttatggtgcc gcttgctctg atttggttct tgatcgggct tgtctttatc     1860
gtgatcggag tcatgatcaa ttgggggccg ttttaacgat tgctgcccgc cggcttgtac     1920
ggcgggcttt tgagttattc attgcagaag cgcaggctgt tattgtaaca tgtaagccat     1980
aagccattcg taaaagtgcg ggaggaaggt catgaataat ctgcgtaata gactttcagg     2040
cgtgaatggg aaaataaga gagtaaaaga aaaagaacaa aaaatctggt cggagaatgg      2100
gatgatagcg ggagcagttg ctctgcctga tgtgatcatc cgcggcatta tgtttgaatt     2160
tccgtttaaa gaatggtctg caagccttgt gttttgttc atcattatct tatattactg      2220
catcagggct gcggcatccg gaatgctcat gccgagaata gacaccaaag aagaactgca     2280
aaaacgggtg aagcagcagc gaatagaatc aattgcttgc gcctttgcgg tagtggtgct     2340
tacgatgtac gacagggga ttccccatac attcttcgct tggctgaaaa tgattcttct      2400
ttttatcgtc tgcggcggcg ttctgttct gcttcggtat gtgattgtga agctggctta      2460
cagaagagcg gtaaaagaag aaataaaaaa gaaatcatct ttttgtttg gaaagcgagg      2520
```

```
gaagcgttca cagtttcggg cagcttttt tataggaaca ttgatttgta ttcactctgc    2580
caagttgttt tgatagagtg attgtgataa ttttaaatgt aagcgttaac aaaattctcc    2640
agtcttcaca tcggtttgaa aggaggaagc ggaagaatga agtaagaggg atttttgact    2700
ccgaagtaag tcttcaaaaa atcaaataag gagtgtcaag aatgtttgca aaacgattca    2760
aaacctcttt actgccgtta ttcgctggat ttttattgct gtttcatttg gttctggcag    2820
gtaatcaaat aggctgtagc tatttaatag ctacagccta tttgcaactt tctaagtttt    2880
tctcaggatg attgatcacc cgcggtgtaa aaataggaa taaagggggg ttgacattat     2940
tttactgata tgtataatat aatttgtata agaaaatgag agggagagga acatgaaac     3000 aacaaaaacg gctttacgcc cgattgctga cgctgttatt tgcgctcatc ttcttgctgc    3060
ctcattctgc agcagcggcg gcaaatctta atgggacgct gatgcagtat tttgaatggt    3120
acatgcccaa tgacggccaa cattggaggc gtttgcaaaa cgactcggca tatttggctg    3180
aacacggtat tactgccgtc tggatccccc cggcatataa gggaacgagc caagcggatg    3240
tgggctacgg tgcttacgac ctttatgatt tagggagtt tcatcaaaaa gggacggttc     3300
ggacaaagta cggcacaaaa ggagagctgc aatctgcgat caaaagtctt cattcccgcg    3360
acattaacgt ttacggggat gtggtcatca accacaaagg cggcgctgat gcgaccgaag    3420
atgtaaccgc ggttgaagtc gatcccactg accgcaaccg cgtaatttca ggagaacacc    3480
taattaaagc ctggacacat tttcattttc cggggcgcgg cagcacatac agcgatttta    3540
aatggcattg gtaccatttt gacgaaaccg attgggacga gtcccgaaag ctgaaccgca    3600
tctataagtt tcaaggaaag gcttgggatt gggaagtttc caatgaaaac ggcaactatg    3660
attatttgat gtatgccgac atcgattatg accatcctga tgtcgcagca gaaattaaga    3720 gatgggcac ttggtatgcc aatgaactgc aattggacgg tttccgtctt gatgctgtca     3780
aacacattaa atttctttt ttgcgggatt gggttaatca tgtcagggaa aaaacgggga     3840
aggaaatgtt tacggtagct gaatattggc agaatgactt gggcgcgctg gaaaactatt    3900
tgaacaaaac aaatttttaat cattcagtgt ttgacgtgcc gcttcattat cagttccatg    3960
ctgcatcgac acagggaggc ggctatgata tgaggaaatt gctgaacggt acggtcgttt    4020
ccaagcatcc gttgaaatcg gttacatttg tcgataacca tgatacacag ccggggcaat    4080
cgcttgagtc gactgtccaa acatggttta agccgcttgc ttacgctttt attctcacaa    4140
gggaatctgg ataccctcag gttttctacg gggatatgta cgggacgaaa ggagactccc    4200
agcgcgaaat tcctgccttg aaacacaaaa ttgaaccgat cttaaaagcg agaaaacagt    4260
atgcgtacgg agcacagcat gattatttcg accaccatga cattgtcggc tggacaaggg    4320
aaggcgacag ctcggttgca aattcaggtt tggcggcatt aataacagac ggacccggtg    4380
gggcaaagcg aatgtatgtc ggccggcaaa acgccggtga cattggcat gacattaccg     4440 gaaaccgttc ggagccggtt gtcatcaatt cggaaggctg gggagagttt cacgtaaacg    4500
gcgggtcggt ttcaatttat gttcaaagat agtaaggtaa taaaaaaaca cctccaagct    4560
gagtgcgggt atcagcttgg aggtgcgttt attttttcag ccgtatgaca aggtcggcat    4620
caggtgtgac aacgcgtgat ctagaccagt tccctgagct tccgtcagtc ggatcccatt    4680
gcggattttc ctcctctaat atgctcaact aaatgacct attcaataaa tctattatgc     4740
tgctaaatag tttataggac aaataagtat actctaatga cctataaaag atagaaaatt    4800
aaaaaatcaa gtgttcgctt ctctctcacg gagctgtaat ataaaaacct tcttcagcta    4860
```

```
acggggcagg ttagtgacat tagaaaaccg actgtagaaa gtacagtcgg cattatctca    4920
tattataaaa gccagtcatt aggcctatct gacaattcct gaatagagtt cataaacaat    4980
cctgcatgat aaccatcaca aacagaatga tgtacctgta aagatagcgg taaatatatt    5040
gaattacctt tattaatgaa ttttcctgct gtaataatgg gtagaaggta attactatta    5100
ttattgatat ttaagttaaa cccagtaaat gaagtccatg gaataataga aagagaaaaa    5160
gcattttcag gtataggtgt tttgggaaac aatttccccg aaccattata tttctctaca    5220
tcagaaaggt ataaatcata aaactctttg aagtcattct ttacaggagt ccaaatacca    5280
gagaatgttt tagatacacc atcaaaaatt gtataaagtg gctctaactt atcccaataa    5340
cctaactctc cgtcgctatt gtaaccagtt ctaaaagctg tatttgagtt tatcacccctt   5400 gtcactaaga aaataaatgc agggtaaaat ttatatcctt cttgttttat gtttcggtat    5460
aaaacactaa tttcaatttc tgtggttata ctaaaagtcg tttgttggtt caaataatga    5520
ttaaatatct cttttctctt ccaattgtct aaatcaattt tattaaagtt catttgatat    5580
gcctcctaaa tttttatcta aagtgaattt aggaggctta cttgtctgct ttcttcatta    5640
gaatcaatcc ttttttaaaa gtcaatatta ctgtaacata agtatatatt ttaaaaatat    5700
ccacggttct tcaaatattt ccccaagatt ttcctcctct aatatgctca acttaatgac    5760
ctattcaata aatctattat gctgctaaat agtttatagg acaaataagt atactctaat    5820
gaccctataa aagatagaag gatccataga ttaacgcgtg gtacccgggg atcctctagg    5880
ccgcgatttc caatgaggtt aagagtattc caaactggac acatggaaac acacaaatta    5940
aaaactggtc tgatcgatgg gatgtcacgc agaattcatt gctcgggctg tatgactgga    6000
atacacaaaa tacacaagta cagtcctatc tgaaacggtt cttagacagg gcattgaatg    6060
acggggcaga cggttttcga tttgatgccg ccaaacatat agagcttcca gatgatggca    6120
gttacggcag tcaatttcgg ccgaatatca caaatacatc tgcagagttc caatacggag    6180
aaatcctgca ggatagtgcc tccagagatg ctgcatatgc gaattatatg gatgtgacag    6240
cgtctaacta tgggcattcc ataaggtccg ctttaaagaa tcgtaatctg ggcgtgtcga    6300
atatctccca ctatgcatct gatgtgtctg cggacaagct agtgacatgg gtagagtcgc    6360
atgatacgta tgccaatgat gatgaagagt cgacatggat gagcgatgat gatatccgtt    6420
taggctgggc ggtgatagct tctcgttcag gcagtacgcc tcttttcttt tccagacctg    6480
agggaggcgg aaatggtgtg aggttcccgg ggaaaagcca aataggcgat cgcgggagtg    6540
ctttatttga agatcaggct atcactgcgg tcaatagatt tcacaatgtg atggctggac    6600
agcctgagga actctcgaac ccgaatggaa acaaccagat atttatgaat cagcgcggct    6660
cacatggcgt tgtgctggca aatgcaggtt catcctctgt ctctatcaat acggcaacaa    6720
aattgcctga tggcaggtat gacaataaag ctggagcggg ttcatttcaa gtgaacgatg    6780
gtaaactgac aggcacgatc aatgccaggt ctgtagctgt gctttatcct gatgatattg    6840
caaaagcgcc tcatgttttc cttgagaatt acaaaacagg tgtaacacat tctttcaatg    6900
atcaactgac gattaccttg cgtgcagatg cgaatacaac aaaagccgtt tatcaaatca    6960
ataatggacc agacgacagg cgtttaagga tggagatcaa ttcacaatcg gaaaaggaga    7020
tccaatttgg caaaacatac accatcatgt taaaaggaac gaacagtgat ggtgtaacga    7080
ggaccgagaa atacagtttt gttaaaagag atccagcgtc ggccaaaacc atcggctatc    7140
aaaatccgaa tcattggagc caggtaaatg cttatatcta taaacatgat gggagccgag    7200
taattgaatt gaccggatct tggcctggaa aaccaatgac taaaaatgca gacggaattt    7260
```

```
acacgctgac gctgcctgcg gacacggata caaccaacgc aaaagtgatt tttaataatg   7320
gcagcgccca agtgcccggt cagaatcagc ctggctttga ttacgtgcta aatggtttat   7380
ataatgactc gggcttaagc ggttctcttc cccattgagg gcaaggctag acgggactta   7440
ccgaaagaaa ccatcaatga tggtttcttt tttgttcata aatcagacaa aacttttctc   7500
ttgcaaaagt tgtgaagtg ttgcacaata taaatgtgaa atacttcaca aacaaaaaga   7560
catcaaagag aaacataccc tgcaaggatg attaatgatg aacaaacatg taaataaagt   7620
agctttaatc ggagcgggtt tgttggaag cagttatgca tttgcgttaa ttaaccaagg   7680
gatcacagat gagcttgtgg tcattgatgt aaataaagaa aaagcaatgg gcgatgtgat   7740
ggatttaccc cacggaaagg cgtttgggct acaaccggtc aaaacatctt acggaacata   7800
tgaagactgc aaggatgctg atattgtctg catttgcgcc ggagcaaacc aaaaacctgg   7860
tgagacacgc cttgaattag tagaaaagaa cttgaagatt ttcaaaggca tcgttagtga   7920
agtcatggcg agcggatttg acggcatttt cttagtcgcg acaaatccgg ttgatatcct   7980
gacttacgca acatggaaat tcagcggcct gccaaaagag cgggtgattg aagcggcac    8040
aacacttgat tctgcgagat tccgtttcat gctgagcgaa tactttggcg cagcgcctca   8100
aaacgtacac gcgcatatta tcggagagca cggcgacaca gagcttcctg tttggagcca   8160
cgcgaatgtc ggcggtgtgc cggtcagtga actcgttgag aaaaacgatg cgtacaaaca   8220
agaggagctg gaccaaattg tagatgatgt gaaaaacgca gcttaccata tcattgagaa   8280
aaaaggcgcg acttattatg gggttgcgat gagtcttgct cgcattacaa aagccattct   8340
tcataatgaa aacagcatat taactgtcag cacatatttg gacgggcaat acggtgcaga   8400
tgacgtgtac atcggtgtgc cggctgtcgt gaatcgcgga gggatcgcag gtatcactga   8460
gctgaactta aatgagaaag aaaaagaaca gttccttcac agcgccggcg tccttaaaaa   8520
catttttaaaa cctcatttttg cagaacaaaa agtcaactaa ccgcaacttt agagtaaagg   8580
gctgattgtc aatgtgggag cagttgtatg atccgtttgg aaacgagtat gtgagcgcac   8640
ttgtggcgct cactccgatt ctcttttttc ttttggcttt aactgttttg aaaatgaaag   8700
gcattcttgc ggcatttctt accctagccg tcagtttctt cgtctccgtt tgggcatttc   8760
atatgccggt tgaaaaagcg atttcttctg ttttgttagg aatcgggagc gggctgtggc   8820
ccattggcta catcgtcctg atggcggtgt ggctgtataa aatcgccgtg aaaaccggga   8880
aatttaccat tattcggtcc agcattgccg gcatttcgcc tgaccaacga ttacagctat   8940
tattaattgg ttttgtttt aacgcgtttt tagaaggcgc ggccggtttt ggtgttccga   9000
ttgcgattag tgcggcgctg ctcgtcgaac ttggttttaa accgttaaaa gcggcggcgc   9060
tctgcttgat tgcaaacgct gcctccgag ccttttgggc gattgggatt cctgtcatca   9120
caggggcgca gattggtgat tgtctgctc ttgagctgtc tcggacatta atgtggacac   9180
tgccgatgat ctcatttta ataccattcc tgcttgtatt cttattagac cgaatgaaag   9240
gaatcaaaca gacatggccc gctcttctgg ttgtgagcgg tgggtataca gcggttcaga   9300
cactgacaat ggcggtgctc gggccggaat tagcaaacat tttggcggcc ttattcagca   9360
tgggcgggct tgccttcttc ctccgcaaat ggcagccgaa agagatttac cgcgaggaag   9420
gggccggcga tgctggtgag aaaaaggcat accgtgccgc tgacattgcg agagcgtggt   9480
ctccttttcta cattttaact gcggcgatca ccatctgg                          9518
```

<210> SEQ ID NO 35

<211> LENGTH: 10158
<212> TYPE: DNA
<213> ORGANISM: Artificial Sequence
<220> FEATURE:
<223> OTHER INFORMATION: SOE PCR product for integration of the the
      PhtrA - lacZ cassette in the xyl locus of B. subtilis

<400> SEQUENCE: 35

| | | | | | |
|---|---|---|---|---|---|
| tcttggggga | cttgtcgttg | cattttttgt | tcccttactg | gctgcttatt | taagcgatac | 60 |
| ttccggcaac | gagtctcttg | gctggcaact | aaccatgggt | attttgggaa | tgataggcgg | 120 |
| gtgcctttta | atcttttgtt | ttaaaagcac | aaaagagcgg | gtcactcttc | aaaaatccga | 180 |
| agagaaaatt | aaatttacgg | atatatttga | gcagtttcgt | gttaatcgtc | cacttgttgt | 240 |
| attaagtatt | ttctttatta | ttattttttgg | agtgaattcc | atcagtaatt | cggttggcat | 300 |
| ttactacgta | acgtataact | tagaaagaga | ggatttggtg | aagtggtacg | gtttgatagg | 360 |
| aagtttaccc | gctttggtca | ttttaccgtt | tattccaagg | cttcatcaat | ttttggggaa | 420 |
| aaagaaatta | ctaaactatg | cattattact | gaatattata | ggcctcttag | ctttactgtt | 480 |
| tgttccgcca | agtaatgttt | acctcatact | tgtctgtcga | ttaatcgctg | ctgctggaag | 540 |
| tctcactgcc | gggggatata | tgtgggcgct | tattcctgaa | acaattgaat | atggagagta | 600 |
| caggactggg | aaaagaatgg | gtgggctcat | ttacgctata | atcggatttt | tctttaagtt | 660 |
| tggtatggcc | ttaggaggag | ttgttccggg | tctggttctt | gataagtttg | gatatgtagc | 720 |
| aaatcaggca | caaaccccgg | cggccttaat | ggggatttta | attacaacaa | ccattattcc | 780 |
| cgtgttcttg | cttgttctag | ctttaattga | tattaatttc | tataacttag | atgagaaaaa | 840 |
| atataaaaac | atggttcgag | aattagagaa | tagagacaaa | gtttatttgg | atcatattga | 900 |
| tgatttcaag | gcttaaaaaa | gaaaataaac | tgaggaggag | tcccaaatga | agattaccaa | 960 |
| tcccgtactt | aaaggattca | atcccgatcc | aagtatttgt | agagcaggag | aggattatta | 1020 |
| tatcgctgta | tctacatttg | agtggttttcc | gggagtccag | atacaccact | caaaagattt | 1080 |
| agtaaattgg | cacttagttg | cacatccatt | acagagagtt | tcacaattag | acatgaaagg | 1140 |
| aaacccaaat | tcaggtggag | tttgggcacc | atgtttaagc | tatagtgatg | ggaagttttg | 1200 |
| gctgatctat | acgatgtta | aggtagtaga | tggcgcatgg | aaagattgtc | acaattattt | 1260 |
| agttacttgt | gaaacgatta | atggtgattg | gagtgagccg | attaaattaa | atagctcggg | 1320 |
| gtttgatgct | tctttgttcc | atgatacgga | tggaaaaaag | tatttattaa | atatgttatg | 1380 |
| ggatcaccgt | attgatcggc | actcatttgg | aggaattgtt | atacaggaat | attctgataa | 1440 |
| agagcaaaaa | ttaatcggta | aaccaaaagt | tatatttgaa | ggaactgata | gaaaactgac | 1500 |
| agaagctccg | catctttatc | atatcgggaa | ctattattat | ttattaactg | cagaaggagg | 1560 |
| aacacggtac | gaacatgctg | ctacaattgc | tcgttctgca | aatattgagg | ggccatatga | 1620 |
| agttcatccc | gataatccaa | ttttaacgtc | atggcatgac | ccaggaaatc | cattgcaaaa | 1680 |
| atgtggtcat | gcatccattg | ttcaaacaca | tacagatgag | tggtatttag | ctcatttaac | 1740 |
| gggacgtcct | attcatcctg | acgatgattc | aatttttcag | cagagaggat | actgtccttt | 1800 |
| gggcagagaa | acagctattc | aaaaacttta | ctggaaagat | gaatggccct | atgtagtagg | 1860 |
| tggaaaagaa | ggaagcttgg | aggtagatgc | accttctata | cccgaaacaa | tatttgaagc | 1920 |
| aacgtacccg | gaagttgatg | aatttgagga | ttcaacatta | aatataaatt | ttcaaacttt | 1980 |
| aaggattcca | ttcacgaatg | aattaggttc | attgactcaa | gcgccaaatc | atttacgatt | 2040 |
| attcggtcat | gaatcattga | cctcgacatt | tactcaggca | tttgtagcca | gacgctggca | 2100 |

```
aagtctccat tttgaagccg aaactgctgt tgagttttat ccggaaaatt ttcaacaagc   2160
cgctgggttg gtgaattact acaatacaga gaactggacg gctcttcaag tcacgcatga   2220
tgaagaactt gggcgcattc ttgaattaac aatatgtgac aacttttctt tttcacagcc   2280
attaaataat aaaattgtta ttcctcgtga agtaaagtat gtatatttaa gagtaaatat   2340
tgaaaaggac aaatattatt atttctattc ttttaacaaa gaagattggc acaaaattga   2400
cattgcactg gaatcgaaaa aattatcaga tgattatatc cgtgggggag gattcttcac   2460
aggggccttt gtagggatgc aatgccaaga taccagtggt aatcatattc cggccgactt   2520
tagatatttt cgttataaag aaaaataatt gcacatgaa aaaggagatt tctattttag    2580
aactccttttt tcatatgaga aggtgccatg tcactattgc ttcagaaata ctcctagaat  2640
aaaaaaactc atctttaaag atgagctgtc cattccataa aaaattacat tgtaatcatg   2700
tccagaaaat gatcaatcac aatggaggac attcctaatg ccggtgcatt ctgtcctaag   2760
gaagatggca ataattcata gctattgcct aattgggaat aaaccttga tgatacttca    2820
cttctcattg aatttaaaac cataggatgc gattcaatta tgctatttct taaaattacg   2880
gcttgtgggt tgaaagtatt tagaatattg gtaaggccta ttcctaaata gaatccaaaa   2940
ttttgtaatg catttaaggt tccgatatca ttcagatggg cgaggtttat gatatcagca   3000
gcataataga tttattgaat aggtcattta agttgagcgt attagaggag gaaaatcttg   3060
gagaaatatt tgaagaaccc gaacgcgtat aataaagaat aataataaat ctgtagacaa   3120
attgtgaaag gatgtactta aacgctaacg gtcagcttta ttgaacagta atttaagtat   3180
atgtccaatc tagggtaagt aaattgagta tcaatataaa ctttatatga acataatcaa   3240
cgaggtgaaa tcatgagcaa tttgattaac ggaaaaatac caaatcaagc gattcaaaca   3300
ttaaaaatcg taaagatttt attttggaagt tcaatagttg gagtatatct atttggttca   3360
gcagtaaatg gtggtttacg catttacagc gatgtagatg ttctagtcgt cgtgaatcat   3420
agtttacctc aattaactcg aaaaaaacta acagaaagac taatgactat atcaggaaag   3480
attggaaata cggattctgt tagaccactt gaagttacgg ttataaatag gagtgaagtt   3540
gtcccttggc aatatcctcc aaaaagagaa tttatatacg gtgagtggct caggtgtgga   3600
tttgagaatg gacaaattca ggaaccaagc tatgatcctg atttggctat tgttttagca   3660
caagcaagaa agaatagtat ttctctattt ggtcctgatt cttcaagtat acttgtctcc   3720
gtacctttga cagatattcg aagagcaatt aaggattctt tgccagaact aattgagggg   3780
ataaaaggtg atgagcgtaa tgtaatttta accctagctc gaatgtggca aacagtgact   3840
actggtgaaa ttacctcgaa agatgtcgct gcggaatggg ctatacctct tttacctaaa   3900
gagcatgtaa ctttactgga tatagccaga aaaggctatc ggggagagtg tgatgataag   3960
tgggaaggac tatattcaaa ggtgaaagca ctcgttaagt atatgaaaaa ttctatagaa   4020
acttctctca attaggctaa ttttattgca ataacaggtg cttacttta aaactactga    4080
tttattgata aatattgaac aattttggg aagaataaag cgtcctcttg tgaaattaga    4140
gaacgccgac tcagtccttt catatacaat atgaagtgta ccgttttccg cacttttttca  4200
caatttccca taatcttttc attttttatcc cacagttttt gttatgata aactcaagtc    4260
ataaacctat caatataaat agacatgtga aaatagagaa acggagtgaa catgatgacc   4320
atgattacgg attcactggc cgtcgtttta acgtcgtg actgggaaaa ccctggcgtt    4380
acccaactta atcgccttgc agcacatccc cctttcgcca gctggcgtaa tagcgaagag   4440
gcccgcaccg atcgcccttc ccaacagttg cgcagcctga atggcgaatg gcgctttgcc   4500
```

```
tggtttccgg caccagaagc ggtgccggaa agctggctgg agtgcgatct tcctgaggcc   4560
gatactgtcg tcgtcccctc aaactggcag atgcacggtt acgatgcgcc catctacacc   4620
aacgtgacct atcccattac ggtcaatccg ccgtttgttc ccacggagaa tccgacgggt   4680
tgttactcgc tcacatttaa tgttgatgaa agctggctac aggaaggcca gacgcgaatt   4740 attttgatg gcgttaactc ggcgtttcat ctgtggtgca acgggcgctg ggtcggttac    4800
ggccaggaca gtcgtttgcc gtctgaattt gacctgagcg cattttttacg cgccggagaa  4860 aaccgcctcg cggtgatggt gctgcgctgg agtgacggca gttatctgga agatcaggat   4920
atgtggcgga tgagcggcat tttccgtgac gtctcgttgc tgcataaacc gactacacaa   4980
atcagcgatt tccatgttgc cactcgcttt aatgatgatt tcagccgcgc tgtactggag   5040
gctgaagttc agatgtgcgg cgagttgcgt gactacctac gggtaacagt ttctttatgg   5100
cagggtgaaa cgcaggtcgc cagcggcacc gcgcctttcg gcggtgaaat tatcgatgag   5160
cgtggtggtt atgccgatcg cgtcacacta cgtctgaacg tcgaaaaccc gaaactgtgg   5220
agcgccgaaa tcccgaatct ctatcgtgcg gtggttgaac tgcacaccgc cgacggcacg   5280
ctgattgaag cagaagcctg cgatgtcggt ttccgcgagg tgcggattga aaatggtctg   5340
ctgctgctga acggcaagcc gttgctgatt cgaggcgtta accgtcacga gcatcatcct   5400
ctgcatggtc aggtcatgga tgagcagacg atggtgcagg atatcctgct gatgaagcag   5460
aacaacttta cgccgtgcg ctgttcgcat tatccgaacc atccgctgtg gtacacgctg    5520
tgcgaccgct acgcctgta tgtggtggat gaagccaata ttgaaaccca cggcatggtg   5580
ccaatgaatc gtctgaccga tgatccgcgc tggctaccgg cgatgagcga acgcgtaacg   5640
cgaatggtgc agcgcgatcg taatcacccg agtgtgatca tctggtcgct ggggaatgaa   5700
tcaggccacg gcgctaatca cgacgcgctg tatcgctgga tcaaatctgt cgatccttcc   5760
cgcccggtgc agtatgaagg cggcggagcc gacaccacgg ccaccgatat tatttgcccg   5820
atgtacgcgc gcgtggatga agaccagccc ttcccggctg tgccgaaatg gtccatcaaa   5880
aaatggcttt cgctacctgg agagacgcgc ccgctgatcc tttgcgaata cgcccacgcg   5940
atgggtaaca gtcttggcgg tttcgctaaa tactggcagg cgtttcgtca gtatccccgt   6000
ttacagggcg gcttcgtctg ggactgggtg atcagtcgc tgattaaata tgatgaaaac    6060
ggcaacccgt ggtcggctta cggcggtgat tttggcgata cgccgaacga tcgccagttc   6120
tgtatgaacg gtctggtctt tgccgaccgc acgccgcatc cagcgctgac ggaagcaaaa   6180
caccagcagc agtttttcca gttccgttta tccgggcaaa ccatcgaagt gaccagcgaa   6240
tacctgttcc gtcatagcga taacgagctc ctgcactgga tggtggcgct ggatggtaag   6300
ccgctggcaa gcggtgaagt gcctctggat gtcgctccac aaggtaaaca gttgattgaa   6360
ctgcctgaac taccgcagcc ggagagcgcc gggcaactct ggctcacagt acgcgtagtg   6420
caaccgaacg cgaccgcatg gtcagaagcc gggcacatca gcgcctggca gcagtggcgt   6480
ctggcggaaa acctcagtgt gacgctcccc gccgcgtccc acgccatccc gcatctgacc   6540
accagcgaaa tggatttttg catcgagctg ggtaataagc gttggcaatt taaccgccag   6600
tcaggctttc tttcacagat gtggattggc gataaaaaac aactgctgac gccgctgcgc   6660
gatcagttca cccgtgcacc gctggataac gacattggcg taagtgaagc gacccgcatt   6720
gaccctaacg cctgggtcga acgctggaag cggcgggcc attaccaggc cgaagcagcg   6780
ttgttgcagt gcacggcaga tacacttgct gatgcggtgc tgattacgac cgctcacgcg   6840
```

```
tggcagcatc aggggaaaac cttatttatc agccggaaaa cctaccggat tgatggtagt    6900
ggtcaaatgg cgattaccgt tgatgttgaa gtggcgagcg ataccgca tccggcgcgg      6960 attggcctga actgccagct ggcgcaggta gcagagcggg taaactggct cggattaggg    7020
ccgcaagaaa actatcccga ccgccttact gccgcctgtt ttgaccgctg ggatctgcca    7080
ttgtcagaca tgtataccc gtacgtcttc ccgagcgaaa acggtctgcg ctgcgggacg     7140
cgcgaattga attatggccc acaccagtgg cgcggcgact tccagttcaa catcagccgc    7200
tacagtcaac agcaactgat ggaaaccagc catcgccatc tgctgcacgc ggaagaaggc    7260
acatggctga atatcgacgg tttccatatg gggattggtg cgacgactc ctggagcccg     7320 tcagtatcgg cggaattcca gctgagcgcc ggtcgctacc attaccagtt ggtctggtgt    7380
caaaaataat tttttatgga atggacagct cgaagatcgt gtgtttgaag atgtgattca    7440
acatcgttac cgcagcttta ctgaagggat tggtcttgaa attatagaag gaagagctaa    7500
tttccacaca cttgagcaat atgcgctaaa tcataaatca attaaaaacg aatctggaag    7560
acaggagaaa ttaaaagcga tattgaacca atacatttta gaagtataac aggataagct    7620
ccagatcctg ctatcaatac caagtcactg aattacccgt catgattcct ttcctattgc    7680
ttgttgttat gacgggtaac ttctataatt aggatttatt tagagtgaat ggttttttaa    7740
aagggcaagg agtgaaaaaa tgaagtatgt cattggaata gatcttggaa cgagtgctgt    7800 taaaccatt ttagttaacc aaaacggcaa ggtttgtgca gaaacgtcca aaaggtatcc     7860
gctcatccaa gagaaggcgg gatatagtga gcaaaatcct gaagactggg ttcagcaaac    7920
aattgaagca ttggctgaat tggtttctat atccaatgtt caagccaagg atattgacgg    7980
gataagctat tcgggacaaa tgcatggatt agtactgctt gaccaagatc gtcaggtgtt    8040
acgtaatgca attctttgga atgataccag aacaacgcct caatgtataa ggatgaccga    8100
gaaatttggc gatcatcttc ttgacatcac aaaaaaccgt gttttagaag ggtttacatt    8160
acctaaaatg ttatgggtaa aggaacatga acctgaactt tttaaaaaaa ctgctgtgtt    8220
tttgcttccg aaagactacg tgcgattccg tatgaccggt gtcattcaca ccgaatactc    8280
cgatgcagca ggaactttac ttttacatat tactcgcaag gagtggagca atgatatttg    8340
caatcaaatt ggtatttctg cagatatttg tcctccgctt gttgaatctc atgattgtgt    8400
aggatcgctg cttccgcacg ttgccgcgaa gaccgggcta ttagaaaaaa caaaagtgta    8460
cgctggggga gcagataatg cttgcggcgc tattggagca ggtatccttt cttccggaaa    8520
aacattatgc agtattggga cgtcaggggt catactttcc tacgaagaag aaaaagaaag    8580
agactttaaa gggaaagtcc acttttttaa tcatggaaaa aaggattctt tttatacgat    8640
gggcgtcacg ctcgctgcag gatacagctt ggactggttt aaaagaacgt ttgcaccaaa    8700
cgaatcgttt gagcaattat tgcaggggt ggaagctatt ccgataggag ccaatggact     8760
gctatacact ccttatttgg ttggtgaaag aacgccgcat gctgattctt ctattcgggg    8820
aagcttgatc ggaatggatg gagcccataa tagaaagcat tttttgaggg caataatgga    8880
aggtatcaca ttctctttac atgaatcaat tgagctattc cgcgaagcgg gaaaatcagt    8940
tcatactgtt gtttctattg gtgggggagc taaaaatgat acgtggctgc aaatgcaagc    9000
tgatattttc aatacgaggg taattaagtt agaaaatgaa caagggccag ctatgggggc    9060
tgcaatgctg gctgcctttg gaagcggttg gtttgaatca cttgaagaat gtgcagagca    9120
gttcattcgt gaggctgctg cattttatcc aaaggcgcaa aatgttcaaa atataaaac     9180 actatttgat ttgtataaga acatttacac tcacacaaag gatctcaata cagctttgaa    9240
```

```
gagctttcga aaaaactaat gatgttattg tctggagatc aaccgaagaa caattaatga   9300
tcaatcatca tcaaaggcct ttgataacat ggctgccttc ttttgaaaag atggtgagaa   9360
taaggtatcg caacctttaa acagtattgg agtatccagc agacaaaacg aacgagtgga   9420
accgtatttt gtcagcgaac acttcaagaa gtggggaagc ttaggaatgc caatgggtaa   9480
gatgtatgaa accgcgctaa cgacggtaga gggatctctt gatttatgaa gaaataggaa   9540
ggatgttaac acacaaataa cccctcacat tgacgtgaag gggtgttttt tattgttact   9600
atacagcgga aattttacag gctagttgca tgattttagc ttgttaagca gaatggaact   9660
agactctcca tcatctcttt ctcattcttt ggaaactgca ttctgctagg tttgctgctt   9720
tttttaacaa acagtgtttt tctatttcac acagccatta aatcctctgt tcgtcacata   9780
accgctctta ctccaaattg acagtttatc tgattttgct tcttgctcat ctagtctgaa   9840
ttggtctatg tattttgtgt taggctcata tacatatgct actctggcca atccctcttt   9900
caataatgtc tcttgaacag atttgccgtc aacataaacg tatgctaaca gtcttccata   9960
cttatctctg cgatcgcctt tatcaaattc cagctgtagc ttaccgctgt tgaccaattc  10020
tttatttcgt ttcgacgcat cctcaccgta tggttgaaca caagaatttg gtttcttcgt  10080
ctcaggtgta tcaacgagca agtagcgaac tgtgtctttc tttccgttgt aaataacctt  10140
aatcgtatct ccatctat                                                10158
```